(12) United States Patent
Ardo et al.

(10) Patent No.: US 11,673,100 B2
(45) Date of Patent: *Jun. 13, 2023

(54) SYSTEMS AND METHODS FOR INTEGRATED SOLAR PHOTODIALYSIS

(71) Applicants: The Regents of the University of California, Oakland, CA (US); New York University, New York, NY (US)

(72) Inventors: Shane Ardo, Irvine, CA (US); Eric Schwartz, Irvine, CA (US); Jingyuan Liu, Irvine, CA (US); Joseph M. Cardon, Irvine, CA (US); William White, Irvine, CA (US); Kevin Tkacz, Irvine, CA (US); Lawrence A. Renna, Irvine, CA (US); Miguel A. Modestino, Brooklyn, NY (US); Daniela Blanco, Brooklyn, NY (US); Leanna Schulte, Irvine, CA (US); Rohit Bhide, Irvine, CA (US); Ronald Reiter, Irvine, CA (US); Christopher D. Sanborn, Irvine, CA (US)

(73) Assignees: THE REGENTS OF THE UNIVERSITY OF CALIFORNIA, Oakland, CA (US); NEW YORK UNIVERSITY, New York, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 16/367,102

(22) Filed: Mar. 27, 2019

(65) Prior Publication Data
US 2019/0217255 A1 Jul. 18, 2019

Related U.S. Application Data

(63) Continuation-in-part of application No. 15/698,324, filed on Sep. 7, 2017, now Pat. No. 11,318,424.
(Continued)

(51) Int. Cl.
*B01D 71/82* (2006.01)
*B01D 61/44* (2006.01)
(Continued)

(52) U.S. Cl.
CPC .......... *B01D 71/82* (2013.01); *B01D 61/422* (2013.01); *B01D 61/44* (2013.01); *B01D 61/445* (2013.01);
(Continued)

(58) Field of Classification Search
CPC .... B01D 71/82; B01D 61/422; B01D 61/445; B01D 69/02; B01D 69/12;
(Continued)

(56) References Cited

U.S. PATENT DOCUMENTS 3,784,457 A * 1/1974 Mizutani ................ B01D 61/44
204/529
6,274,806 B1 * 8/2001 Sugihara ............. C07F 15/0093
136/252
(Continued)

FOREIGN PATENT DOCUMENTS

CN 1443091 A 9/2003
CN 109937462 A 6/2019
(Continued)

OTHER PUBLICATIONS

Matthew B. Chambers, Daniel A. Kurtz, Catherine L. Pitman, M. Kyle Brennaman, and Alexander J. M. Miller. "Efficient Photochemical Dihydrogen Generation Initiated by a Bimetallic Self-Quenching Mechanism" J. Am. Chem. Soc. 2016, 138, 13509-13512.
(Continued)

*Primary Examiner* — Nicholas A Smith
(74) *Attorney, Agent, or Firm* — Nguyen Tarbet LLC

(57) ABSTRACT

A photodialysis device that can desalinate saline streams is described herein. The device can have a desalination rate
(Continued)

that is significantly faster than current solar thermal desalination technology. Salt is removed from water by passing ionic current derived from sunlight through this water using dye-sensitized membranes. The device can serve as a distributed, low-cost technology that can efficiently and effectively desalinate low salinity sources of water, which is particularly useful for agriculture and drinking water applications.

20 Claims, 12 Drawing Sheets
(12 of 12 Drawing Sheet(s) Filed in Color)

Related U.S. Application Data

(60) Provisional application No. 62/648,823, filed on Mar. 27, 2018, provisional application No. 62/384,503, filed on Sep. 7, 2016.

(51) Int. Cl.
| | |
|---|---|
| B01D 61/42 | (2006.01) |
| B01D 61/46 | (2006.01) |
| B01D 69/02 | (2006.01) |
| B01D 69/12 | (2006.01) |
| C02F 1/30 | (2023.01) |
| C02F 1/469 | (2023.01) |
| C02F 103/08 | (2006.01) |

(52) U.S. Cl.
CPC ............ *B01D 61/46* (2013.01); *B01D 69/02* (2013.01); *B01D 69/12* (2013.01); *C02F 1/30* (2013.01); *C02F 1/4693* (2013.01); *B01D 2311/2611* (2013.01); *B01D 2325/26* (2013.01); *B01D 2325/42* (2013.01); *C02F 2103/08* (2013.01); *C02F 2201/46165* (2013.01)

(58) Field of Classification Search
CPC ........ B01D 2311/2611; B01D 2325/26; B01D 2325/42; B01D 61/24; B01D 61/243; B01D 61/44; B01D 61/46; C02F 1/30; C02F 1/4693; C02F 2201/46165; C02F 2103/08
See application file for complete search history.

(56) References Cited

U.S. PATENT DOCUMENTS

| 6,878,287 | B1* | 4/2005 | Marais ................ A61C 1/0076 |
| | | | 204/554 |
| 8,764,957 | B2 | 7/2014 | Sui et al. |
| 2007/0099055 | A1 | 5/2007 | Lee et al. |
| 2008/0213641 | A1 | 9/2008 | Ostermann et al. |
| 2010/0143811 | A1* | 6/2010 | Brimblecombe ...... B01J 35/004 |
| | | | 205/340 |
| 2011/0088757 | A1 | 4/2011 | Highgate et al. |
| 2012/0097541 | A1 | 4/2012 | Yazdanbod |
| 2012/0309045 | A1 | 12/2012 | Knutson et al. |
| 2012/0312737 | A1 | 12/2012 | Miller |
| 2013/0041353 | A1 | 2/2013 | Shin et al. |
| 2013/0168228 | A1 | 7/2013 | Ozin et al. |
| 2015/0298100 | A1* | 10/2015 | Hill .......................... B01J 23/75 |
| | | | 205/632 |
| 2016/0067669 | A1* | 3/2016 | Willey .................. B01J 19/127 |
| | | | 422/186.3 |
| 2016/0158690 | A1* | 6/2016 | Puxty ................ B01D 53/1487 |
| | | | 423/228 |
| 2016/0310899 | A1 | 10/2016 | Bordain et al. |
| 2017/0320053 | A1 | 11/2017 | Moon et al. |
| 2018/0065095 | A1 | 3/2018 | Ardo et al. |
| 2018/0145271 | A1 | 5/2018 | Kedem et al. |
| 2019/0134570 | A1 | 5/2019 | Pintauro et al. |

FOREIGN PATENT DOCUMENTS

| JP | H07241443 A | 9/1995 |
| JP | 2001247546 A | 9/2001 |
| JP | 2009234934 A | 10/2009 |
| JP | 2015530238 A | 10/2015 |
| WO | WO 2018049061 A1 | 3/2018 |
| WO | WO2018049061 A1 | 3/2018 |
| WO | WO0205933 A1 | 1/2022 |

OTHER PUBLICATIONS

David J. Stewart, Javier J. Concepcion, M. Kyle Brennaman, Robert A. Binstead, and Thomas J. Meyer. "Accelerating slow excited state proton transfer" PNAS. 2013, vol. 110, No. 3, 876-880.
Helmut Tributsch. "Light Driven Proton Pumps" Ionics. 2000, 6, 161-171.
Gali Steinberg-Yfrach, Paul A. Liddell, Su-Chun Hung, Ana L. Moore, Devens Gust & Thomas A. Moore. "Conversion of light energy to proton potential in liposomes by artificial photosynthetic reaction centres" Nature. 1997, 385, 239-241.
Xiaojiang Xie, Gasto'N A. Crespo, Gunter Mistlberger and Eric Bakker. "Photocurrent generation based on a light-driven proton pump in an artificial liquid membrane" Nature Chemistry. Published Online: Feb. 2, 2014 | DOI: 10.1038/NCHEM.1858.
Kai Sun and David Mauzerall. "A simple light-driven transmembrane proton pump" Proc. Natl. Acad. Sci. USA, vol. 93, pp. 10758-10762, Oct. 1996.
G. W. Murphy. "Model Systems in Photoelectrochemical Energy Conversion" Solar Energy, 1978, vol. 21, pp. 403-407.
Christopher D. Sanborn and Shane Ardo. "Photoelectrochemical Ion Pumping with Dye- Functionalized Polymer Membranes" in Electrochemical Society (ECS), Spring National Meeting, Chicago, IL, May 27, 2015.
William White, Ronald S. Reiter, Claudia P. Ramirez, Christopher D. Sanborn and Shane Ardo. "Sunlight-Driven Ionic Power Generation from Bipolar Ion-Exchange Membranes Functionalized with Photoacids" in Electrochemical Society (ECS), Spring National Meeting, San Diego, CA, May 29, 2016.
William White, Christopher D. Sanborn, Ronald S. Reiter, David M. Fabian, and Shane Ardo. "Observation of Photovoltaic Action from Photoacid-Modified Nafion Due to Light-Driven Ion Transport" J. Am. Chem. Soc., 2017, 139 (34), pp. 11726-11733.
Li, N.; Yan, T.; Li, Z; Thurn-Albrecht, T.; Binder, W. H. Energy Environ. Sci. 2012, 5, 7888-7892.
Wang, Z.; Parrondo, J.; Ramani, V. J. Electrochem. Soc. 2016, 163 (8), F824-F831.
Lashkaryov, V. E. Investigations of a Barrier Layer by the Thermoprobe Method. Izv. Akad. Nauk SSSR, Ser. Fiz. 1941, 5 (4 5), 442-446.
Fuller, C. S. Some Analogies Between Semiconductors and Electrolyte Solutions. Rec. Chem. Prog. 1956, 17 (2), 75-93.
Chapin, D. M.; Fuller, C. S.; Pearson, G. L. A New Silicon P-n Junction Photocell for Converting Solar Radiation into Electrical Power. J. Appl. Phys. 1954, 25 (5), 676-677.
Lovrecek, B.; Despic, A.; Bockris, J. O. Electrolytic Junctions with Rectifying Properties. J. Phys. Chem. 1959, 33, 750.
Maslov, V.; Zotov, Y. Water as a Semiconductor. Russ. Chem. Rev. 1968, 37 (4), 310-315.
Pearson, G. L.; Bardeen, J. Electrical Properties of Pure Silicon and Silicon Alloys Containing Boron and Phosporus. Phys. Rev. 1949, 75 (5), 865.
Rosés, M.; Ràfols, C.; Bosch, E. Autoprotolysis in Aqueous Organic Solvent Mixtures. Anal. Chem. 1993, 1003 (23), 2294-2299.
Rondinini, S.; Longhi, P.; Mussini, P. R.; Mussini, T. Autoprotolysis Constants in Nonaqueous Solvents and Aqueous Organic Solvent Mixtures. Pure Appl. Chem. 1987, 59 (12), 1693-1702.
Würfel, P. Physics of Solar Cells: From Principles to New Concepts; Wiley-VCH, 2005.

(56) References Cited

OTHER PUBLICATIONS

Battaglia, C.; Cuevas, A.; De Wolf, S. High-Efficiency Crystalline Silicon Solar Cells: Status and Perspectives. Energy Environ. Sci. 2016, 9 (5), 1552-1576.

Shockley, W.; Queisser, H. J. Detailed Balance Limit of Efficiency of P-N Junction Solar Cells. J. Appl. Phys. 1961, 32 (3), 510-519.

Würthner, F.; Kaiser, T. E.; Saha-Möller, C. R. J-Aggregates: From Serendipitous Discovery to Supramolecular Engineering of Functional Dye Materials. Angew. Chemie Int. Ed. 2011, 50 (15), 3376-3410.

Ardo, S.; Sun, Y.; Castellano, F. N.; Meyer, G. J. Excited-State Electron Transfer from Ruthenium-Polypyridyl Compounds to Anatase TiO2 Nanocrystallites: Evidence for a Stark Effect. J. Phys. Chem. B 2010, 114 (45), 14596-14604.

Ardo, S.; Sun, Y.; Staniszewski, A.; Castellano, F. N.; Meyer, G. J. Stark Effects after Excited-State Interfacial Electron Transfer at Sensitized TiO2 Nanocrystallites. J. Am. Chem. Soc. 2010, 132 (19), 6696-6709.

Pensack, R. D.; Banyas, K. M.; Barbour, L. W.; Hegadorn, M.; Asbury, J. B. Ultrafast Vibrational Spectroscopy of Charge-Carrier Dynamics in Organic Photovoltaic Materials. Phys. Chem. Chem. Phys. 2009, 11 (15), 2575.

Zhang, F.; Zhang, H.; Qu, C. Imidazolium Functionalized Polysulfone Anion Exchange Membrane for Fuel Cell Application. J. Mater. Chem. 2011, 21 (34), 12744.

Wang, G.; Weng, Y.; Chu, D.; Xie, D.; Chen, R. Preparation of Alkaline Anion Exchange Membranes Based on Functional Poly(ether-Imide) Polymers for Potential Fuel Cell Applications. J. Memb. Sci. 2009, 326, 4-8.

Luo, J.; Wu, C.; Wu, Y.; Xu, T. Diffusion Dialysis of Hydrochloride Acid at Different Temperatures Using PPO-SiO2 Hybrid Anion Exchange Membranes. J. Memb. Sci. 2010, 347, 240-249.

Khan, M. I.; Mondal, A. N.; Tong, B.; Jiang, C.; Emmanuel, K.; Yang, Z.; Wu, L.; Xu, T. Development of BPPO-Based Anion Exchange Membranes for Electrodialysis Desalination Applications. Desalination 2016, 391, 61-68.

Merle, G.; Wessling, M.; Nijmeijer, K. Anion Exchange Membranes for Alkaline Fuel Cells: A Review. J. Memb. Sci. 2011, 377 (1-2), 1-35.

Reiter, R. S.; White, W.; Ardo, S. Electrochemical Characterization of Commercial Bipolar Membranes under Electrolyte Conditions Relevant to Solar Fuels Technologies J. Electrochem. Soc. 2016, 163 (4), H3132-H3134.

Ünlü, M.; Zhou, J.; Kohl, P. A. Hybrid Anion and Proton Exchange Membrane Fuel Cells. J. Phys. Chem. C 2009, 113(26), 11416-11423.

Grew, K. N.; McClure, J. P.; Chu, D.; Kohl, P. A.; Ahlfield, J. M. Understanding Transport at the Acid-Alkaline Interface of Bipolar Membranes. J. Electrochem. Soc. 2016, 163 (14), F1572-F1587.

Warrick, P.; Auborn, J. J.; Eyring, E. M. Viscosity Effects on Ion-Recombination Kinetics. Bromocresol Green in Water-Glycerol Mixtures. J. Phys. Chem. 1972, 76 (8), 1184-1191.

Hegedus, L.; Kirschner, N.; Wittmann, M.; Noszticzius, Z. Electrolyte Transistors: Ionic Reaction-Diffusion Systems with Amplifying Properties. J. Phys. Chem. A 1998, 102 (32), 6491-6497.

Spry, D. B.; Fayer, M. D. Proton Transfer and Proton Concentrations in Protonated Nation Fuel Cell Membranes. J. Phys. Chem. B 2009, 113 (30), 10210-10221.

Eames, C.; Frost, J. M.; Barnes, P. R. F.; O'Regan, B. C.; Walsh, A.; Islam, M. S. Ionic Transport in Hybrid Lead Iodide Perovskite Solar Cells. Nat. Commun. 2015, 6, 7497.

Bag, M.; Renna, L. A.; Adhikari, R. Y.; Karak, S.; Liu, F.; Lahti, P. M.; Russell, T. P.; Tuominen, M. T.; Venkataraman, D. Kinetics of Ion Transport in Perovskite Active Layers and Its Implications for Active Layer Stability. J. Am. Chem. Soc. 2015, 137 (40), 13130-13137.

Fabian, D. M.; Ardo, S.; An, C. Y.; Pepe, I.; Oliveira, N. B. De; Silva, A. V. B. Da; Gray-Weale, A.; Bach, J.; Cheng, Y.-B.; Spiccia, L.; et al. Hybrid Organic-inorganic Solar Cells Based on Bismuth Iodide and 1,6-Hexanediammonium Dication. J. Mater. Chem. A 2016, 4 (18), 6837-6841.

Chen, H.; Gratton, E.; Digman, M. A. Spectral Properties and Dynamics of Gold Nanorods Revealed by EMCCD-Based Spectral Phasor Method. Microsc. Res. Tech. 2015, 78 (4), 283-293.

Ramírez, P.; Rapp, H. J.; Reichle, S.; Strathmann, H.; Mafé, S. Current-Voltage Curves of Bipolar Membranes. J. Appl. Phys. 1992, 72 (1), 259-264.

Mafé, S.; Ramírez, P.; Alcaraz, A. Electric Field-Assisted Proton Transfer and Water Dissociation at the Junction of a Fixed-Charge Bipolar Membrane. Chem. Phys. Lett. 1998, 294 (4-5), 406-412.

Mafé, S.; Ramírez, P. Electrochemical Characterization of Polymer Ion-Exchange Bipolar Membranes. Acta Polym. 1997, 48, 234-250.

Kolbe, M. Science. 2000, 288, 1390-1396.

White, W. et al. Joule, 2018. 2, 94-109.

Reiter, R. Electrochemical evaluation of bipolar ion-exchange membranes for fuel cells . University of California, Irvine. M.S. Thesis. 2015. [Retrieved from the internet on Oct. 12, 2017]. <URL: http://escholarship.org/contentlqt3pc416c6/qt3pc416c6.pdf>; pp. 3, 25-27, 32.

International Search Report for PCT Application No. PCT/US17/50532 dated Nov. 3, 2017.

International Search Report Issued for PCT Application No. PCT/US19/24424 dated Jun. 14, 2019.

Tributsch, Helmut. "Light driven proton pumps." Ionics 6.3 (2000): 161-171.

Steinberg-Yfrach, et al. "Conversion of light energy to proton potential in liposomes by artificial photosynthetic reaction centres." Nature 385.6613 (1997): 239-241.

Xie et al. "Photocurrent generation based on a light-driven proton pump in an artificial liquid membrane." Nature chemistry 6.3 (2014): 202-207.

Xie et al. "Supplementary Information, Photocurrent generation based on a light-driven proton pump in an artificial liquid membrane." Nature chemistry 6.3 (2014): 15 pages.

Sun et al. "A simple light-driven transmembrane proton pump." Proceedings of the National Academy of Sciences 93.20 (1996): 10758-10762.

Kolbe, Michael, et al. "Structure of the light-driven chloride pump halorhodopsin at 1.8 Å resolution." Science 288.5470 (2000): 1390-1396.

White et al. "Conversion of visible light into ionic power using photoacid-dye-sensitized bipolar ion-exchange membranes." Joule 2.1 (2018): 94-109.

Reiter, Ronald. Electrochemical Evaluation of Bipolar Ion-Exchange Membranes for Solar Fuels. Diss. UC Irvine, 2015.

Chambers et al. "Efficient photochemical dihydrogen generation initiated by a bimetallic self-quenching mechanism." Journal of the American Chemical Society 138.41 (2016): 13509-13512.

Stewart et al. "Accelerating slow excited state proton transfer." Proceedings of the National Academy of Sciences 110.3 (2013): 876-880.

Mauzerall et al. "A simple light-driven transmembrane proton pump." Proceedings of the National Academy of Sciences 93.20 (1996): 10758-10762.

Murphy, "Model systems in photoelectrochemical energy conversion." Solar Energy 21.5 (1978): 403-407.

Sanborn et al. "Photoelectrochemical Ion Pumping with Dye-Functionalized Polymer Membranes." ECS Meeting Abstracts. No. 37. IOP Publishing, 2015.

White et al. "Sunlight-Driven Ionic Power Generation from Bipolar Ion-Exchange Membranes Functionalized with Photoacids." ECS Meeting Abstracts. No. 38. IOP Publishing, 2016.

White et al. "Observation of photovoltaic action from photoacid-modified nation due to light-driven ion transport." Journal of the American Chemical Society 139.34 (2017): 11726-11733.

Li et al. "Comb-shaped polymers to enhance hydroxide transport in anion exchange membranes." Energy & Environmental Science 5.7 (2012): 7888-7892.

Wang et al. "Alkaline stability of poly (phenylene oxide) based anion exchange membranes containing imidazolium cations." Journal of The Electrochemical Society 163.8 (2016): F824.

(56) References Cited

OTHER PUBLICATIONS

Lashkaryov,. "Investigations of a barrier layer by the thermoprobe method." Izv. Akad. Nauk SSSR, Ser. Fiz 5.4-5 (1941): 442-446.
Fuller, "Some analogies between semiconductors and electrolyte solutions." Rec. Chem. Prog 17.2 (1956): 75-93.
Chapin et al. "A new silicon pn junction photocell for converting solar radiation into electrical power." Semiconductor Devices: Pioneering Papers. 1991. 969-970.
Lovrecek et al. "Electrolytic junctions with rectifying properties." The Journal of Physical Chemistry 63.5 (1959): 750-751.
Maslov et al. "Water as a Semiconductor." Russian Chemical Reviews 37.4 (1968): 310.
Pearson et al. "Electrical properties of pure silicon and silicon alloys containing boron and phosphorus." Physical Review 75.5 (1949): 865.
Roses et al. "Autoprotolysis in aqueous organic solvent mixtures." Analytical Chemistry 65.17 (1993): 2294-2299.
Rondinini et al. "Autoprotolysis constants in nonaqueous solvents and aqueous organic solvent mixtures." Pure and Applied Chemistry 59.12 (1987): 1693-1702.
Würfel, P. "Physics of solar cells: From principles to new concepts. Verlag GmbH & Co KGaA." (2005), 188 pages.
Battaglia et al. "High-efficiency crystalline silicon solar cells: status and perspectives." Energy & Environmental Science 9.5 (2016): 1552-1576.
Shockley et al. "Detailed balance limit of efficiency of p-n junction solar cells." Journal of applied physics 32.3 (1961): 510-519.
Würthner et al. "J-aggregates: from serendipitous discovery to supramolecular engineering of functional dye materials." Angewandte Chemie International Edition 50.15 (2011): 3376-3410.
Ardo, et al. "Excited-state electron transfer from ruthenium-polypyridyl compounds to anatase TiO2 nanocrystallites evidence for a stark effect." The Journal of Physical Chemistry B 114.45 (2010): 14596-14604.
Ardo et al. "Stark effects after excited-state interfacial electron transfer at sensitized TiO2 nanocrystallites." Journal of the American Chemical Society 132.19 (2010): 6696-6709.9.
Pensack et al. "Ultrafast vibrational spectroscopy of charge-carrier dynamics in organic photovoltaic materials." Physical Chemistry Chemical Physics 11.15 (2009): 2575-2591.
Zhang et al. "Imidazolium functionalized polysulfone anion exchange membrane for fuel cell application." Journal of Materials Chemistry 21.34 (2011): 12744-12752.
Wang et al. "Preparation of alkaline anion exchange membranes based on functional poly (ether-imide) polymers for potential fuel cell applications." Journal of Membrane Science 326.1 (2009): 4-8.
Luo et al. "Diffusion dialysis of hydrochloride acid at different temperatures using PPO—SiO2 hybrid anion exchange membranes." Journal of Membrane Science 347.1-2 (2010): 240-249.
Khan et al. "Development of BPPO-based anion exchange membranes for electrodialysis desalination applications." Desalination 391 (2016): 61-68.
Merle et al. "Anion exchange membranes for alkaline fuel cells: A review." Journal of Membrane Science 377.1-2 (2011): 1-35.
Reiter et al. "Communication—electrochemical characterization of commercial bipolar membranes under electrolyte conditions relevant to solar fuels technologies." Journal of The Electrochemical Society 163.4 (2016): H3132.
Ünlü et al. "Hybrid anion and proton exchange membrane fuel cells." The Journal of Physical Chemistry C 113.26 (2009): 11416-11423.
Grew et al. "Understanding transport at the acid-alkaline interface of bipolar membranes." Journal of The Electrochemical Society 163.14 (2016): F1572.
Warrick et al. "Viscosity effects on ion-recombination kinetics. Bromocresol green in water-glycerol mixtures." The Journal of Physical Chemistry 76.8 (1972): 1184-1191.
Hegedus et al. "Electrolyte transistors: ionic reaction—diffusion systems with amplifying properties." The Journal of Physical Chemistry A 102.32 (1998): 6491-6497.
Spry et al. "Proton transfer and proton concentrations in protonated Nation fuel cell membranes." The Journal of Physical Chemistry B 113.30 (2009): 10210-10221.
Eames et al. "Ionic transport in hybrid lead iodide perovskite solar cells." Nature communications 6.1 (2015): 1-8.
Bag et al. "Kinetics of ion transport in perovskite active layers and its implications for active layer stability." Journal of the American Chemical Society 137.40 (2015): 13130-13137.
Fabian et al. "Hybrid organic-inorganic solar cells based on bismuth iodide and 1, 6-hexanediammonium dication." Journal of Materials Chemistry A 4.18 (2016): 6837-6841.
Chen et al. "Spectral properties and dynamics of gold nanorods revealed by EMCCD-based spectral phasor method." Microscopy research and technique 78.4 (2015): 283-293.
Piprek et al. "Electroluminescent cooling mechanism in InGaN/GaN light-emitting diodes." Optical and Quantum Electronics 48.10 (2016): 1-7.
J. Luo et al. "Water photolysis at 12.3% efficiency via perovskite photovoltaics and Earth-abundant catalysts", Science 345 (2014) 1593-1596, https://doi. org/10.1126/science.1258307.
Miller et al. "Strong internal and external luminescence as solar cells approach the Shockley-Queisser limit." IEEE Journal of Photovoltaics 2.3 (2012): 303-311.
Man et al. "Universality in oxygen evolution electrocatalysis on oxide surfaces." ChemCatChem 3.7 (2011): 1159-1165.
Sanehira et al. "Enhanced mobility CsPbI3 quantum dot arrays for record-efficiency, high-voltage photovoltaic cells." Science advances 3.10 (2017): eaao4204.
Protesescu et al. "Nanocrystals of cesium lead halide perovskites (CsPbX3, X= Cl, Br, and I): novel optoelectronic materials showing bright emission with wide color gamut." Nano letters 15.6 (2015): 3692-3696.
Fountaine et al. "Efficiency limits for photoelectrochemical water-splitting." Nature communications 7.1 (2016): 1-9.
Ramirez et al. "Current-voltage curves of bipolar membranes." Journal of applied physics 72.1 (1992): 259-264.
Mafé et al. "Electric field-assisted proton transfer and water dissociation at the junction of a fixed-charge bipolar membrane." Chemical Physics Letters 294.4-5 (1998): 406-412.
Mafe et al. "Electrochemical characterization of polymer ion-exchange bipolar membranes." Acta polymerica 48.7 (1997): 234-250.
Email communication from ProQuest, Nov. 3, 2020 (Year: 2020) 1 page.
Gopidas et al. "Photochemistry in polymers: photoinduced electron transfer between phenosafranine and triethylamine in perfluorosulfonate membrane." Journal of Physical Chemistry 94.11 (1990): 4723-4727.
Johns et al. "Visible light activated ion sensing using a photoacid polymer for calcium detection." Analytical chemistry 86.13 (2014): 6184-6187.
Mohan et al. "Photochemical behaviour of rhodamine 6G in Nation membrane." Journal of the Chemical Society, Faraday Transactions 88.1 (1992): 41-45.
Krishnan et al. "Integrated chemical systems: photocatalysis at semiconductors incorporated into polymer (Nation)/mediator systems." Journal of the American Chemical Society 105.23 (1983): 7002-7003.
Mistlberger et al. "Photoresponsive ion extraction/release systems: dynamic ion optodes for calcium and sodium based on photochromic spiropyran." Analytical chemistry 85.5 (2013): 2983-2990.
O'Donnell et al. "Photoacidic and photobasic behavior of transition metal compounds with carboxylic acid group (s)." Journal of the American Chemical Society 138.11 (2016): 3891-3903.
Murphy, G. W. "Model systems in photoelectrochemical energy conversion." Solar Energy 21.5 (1978): 403-407.
Astom Corporation, "Comparison table for detailed specification of Cation/Anion Exchange Membrane". 2013, 1 page; http://www.astom-corp.jp/en/product/images/astom_hyo.pdf.
Tran et al. "The United Nations World Water Development Report, 2016: Water and Jobs: Facts and Figures." 2016, 12 pages.
WorldBank, "Water Overview" 2017, 3 pages; http://www.worldbank.org/en/topic/water/overview.

(56) References Cited

OTHER PUBLICATIONS

Ardo, S. Development of a Plastic Water Bottle for Sunlight-Driven Desalination. Distinctive Voices☐Lecture Series; National Academy of Sciences, 2017, 1 page; https://www.youtube.com/watch?v=F3h41nPljXY.
World Health Organization, "Total Dissolved Solids in Drinking-Water" Heal, criteria other Support. Inf. (1996) 8 pages.
Bell System Solar Battery Converts Sun's Ray into Electricity! Look Magazine. 1956, 1 page.
Haussener et al. "Modeling, simulation, and design criteria for photoelectrochemical water-splitting systems." Energy & Environmental Science 5.12 (2012): 9922-9935.
Hu et al. "An analysis of the optimal band gaps of light absorbers in integrated tandem photoelectrochemical water-splitting systems." Energy & Environmental Science 6.10 (2013): 2984-2993.
Xiang et al. "Modeling, simulation, and implementation of solar-driven water-splitting devices." Angewandte Chemie International Edition 55.42 (2016): 12974-12988.
Chandran et al. "Evaluating particle-suspension reactor designs for Z-scheme solar water splitting via transport and kinetic modeling." Energy & Environmental Science 11.1 (2018): 115-135.
Keene et al. "Calculations of theoretical efficiencies for electrochemically-mediated tandem solar water splitting as a function of bandgap energies and redox shuttle potential." Energy & Environmental Science 12.1 (2019): 261-272.
Wang et al. "Scalable water splitting on particulate photocatalyst sheets with a solar-to-hydrogen energy conversion efficiency exceeding 1%." Nature materials 15.6 (2016): 611-615.
Fabian et al. "Particle suspension reactors and materials for solar-driven water splitting." Energy & Environmental Science 8.10 (2015): 2825-2850.
Goto et al. "A particulate photocatalyst water-splitting panel for large-scale solar hydrogen generation." Joule 2.3 (2018): 509-520.
Eisler et al. "Multijunction solar cell efficiencies: effect of spectral window, optical environment and radiative coupling." Energy & Environmental Science 7.11 (2014): 3600-3605.
Tiedje et al. "Limiting efficiency of silicon solar cells." IEEE Transactions on electron devices 31.5 (1984): 711-716.
Chuang et al. "Open-circuit voltage deficit, radiative sub-bandgap states, and prospects in quantum dot solar cells." Nano letters 15.5 (2015): 3286-3294.
Swarnkar et al. "Quantum dot-induced phase stabilization of $\alpha$-CsPbI3 perovskite for high-efficiency photovoltaics." Science 354.6308 (2016): 92-95.
Yang et al. "High-performance photovoltaic perovskite layers fabricated through intramolecular exchange." Science 348.6240 (2015): 1234-1237.
Kulkarn et al. "Band-gap tuning of lead halide perovskites using a sequential deposition process." Journal of Materials Chemistry A 2.24 (2014): 9221-9225.
Wikipedia, "Silicon". Oct. 28, 2018, . p. 1-3.
Balster et al. "Tailoring the interface layer of the bipolar membrane." Journal of membrane science 365.1-2 (2010): 389-398.
Wilhelm, Friedrich G. "Bipolar membrane electrodialysis." University of Twente (2001) 242 pages.
Zhang et al. ""Uphill" cation transport: a bioinspired photo-driven ion pump." Science advances 2.10 (2016): e1600689.
Mei et al. "Gate modulation of proton transport in a nanopore." Physical Chemistry Chemical Physics 18.10 (2016): 7449-7458.
James et al. "Voltage-gated ion transport through semiconducting conical nanopores formed by metal nanoparticle-assisted plasma etching." Nano letters 12.7 (2012): 3437-3442.
Guan et al. "Field-effect reconfigurable nanofluidic ionic diodes." Nature communications 2.1 (2011): 1-8.
Guan et al. "Voltage gated ion and molecule transport in engineered nanochannels: theory, fabrication and applications." Nanotechnology 25.12 (2014): 122001.
Ardo et al. "Systems and methods for integrated solar photodialysis." U.S. Appl. No. 16/367,102.
Xiao et al. "Artificial light-driven ion pump for photoelectric energy conversion." Nature communications 10.1 (2019): 1-7.
Siwy et al. "Fabrication of a synthetic nanopore ion pump." Physical Review Letters 89.19 (2002): 198103.
Siwy et al. "A nanodevice for rectification and pumping ions." American Journal of Physics 72.5 (2004): 567-574.
Sanborn et al. "Interfacial and nanoconfinement effects decrease the excited-state acidity of polymer-bound photoacids." Chem 5.6 (2019): 1648-1670.
Kedem et al. "How to drive a flashing electron ratchet to maximize current." Nano letters 17.9 (2017): 5848-5854.
Tarlie et al. "Optimal modulation of a Brownian ratchet and enhanced sensitivity to a weak external force." Proceedings of the National Academy of Sciences 95.5 (1998): 2039-2043.
Kedem et al. "Mechanisms of Symmetry Breaking in a Multidimensional Flashing Particle Ratchet." ACS nano 11.7 (2017): 7148-7155.
Kedem et al. "Light-responsive organic flashing electron ratchet." Proceedings of the National Academy of Sciences 114.33 (2017): 8698-8703.
Yan et al. "The balance of electric field and interfacial catalysis in promoting water dissociation in bipolar membranes." Energy & Environmental Science 11.8 (2018): 2235-2245.
Lau et al. "An introduction to ratchets in chemistry and biology." Materials Horizons 4.3 (2017): 310-318.
Lehmann, V. "The physics of macropore formation in low doped n-type silicon." Journal of the Electrochemical Society 140.10 (1993): 8 pages.
Kedem et al. "Cooperative Transport in a Multi-Particle, Multi-Dimensional Flashing Ratchet." The Journal of Physical Chemistry C 123.11 (2019): 6913-6921.
United Nations, "Water Scarcity", accessed Mar. 31, 2022; 5 pages.
Li et al. "Solar assisted sea water desalination: A review." Renewable and Sustainable Energy Reviews 19 (2013): 136-163.
Liu et al. "Experimental analysis of a portable atmospheric water generator by thermoelectric cooling method." Energy Procedia 142 (2017): 1609-1614.
Swiss Water Tech Research & Development, "Atmosphere Water Generator (AWG)" accessed Mar. 31, 2022, 6 pages.
U.S. Energy Information Administration, "Use of energy explained Energy use in homes" (2021) 5 pages.
U.S. Energy Information Administration, "Space heating and water heating account for nearly two thirds of U.S. home energy use" (2018) 3 pages.
U.S. Energy Information Administration, "Heating and cooling no longer majority of U.S. home energy use" (2013) 2 pages.
Nemova et al. "Laser cooling of solids." Reports on Progress in Physics 73.8 (2010): 086501.
Sheik-Bahae et al. "Optical refrigeration." nature photonics 1.12 (2007): 693-699.
Zhang et al. "Laser cooling of a semiconductor by 40 kelvin." Nature 493.7433 (2013): 504-508.
Seletskiy et al. "Laser cooling of solids to cryogenic temperatures." Nature Photonics 4.3 (2010): 161-164.
Santhanam et al. "Thermoelectrically pumped light-emitting diodes operating above unity efficiency." Physical Review Letters 108.9 (2012): 097403.
Chen et al. "High-performance near-field electroluminescent refrigeration device consisting of a Gas light emitting diode and a Si photovoltaic cell." Journal of Applied Physics 122.14 (2017): 143104.
Xiao et al. "Electroluminescent refrigeration by ultra-efficient GaAs light-emitting diodes." Journal of Applied Physics 123.17 (2018): 173104.
Zhao et al. "Self-sustaining thermophotonic circuits." Proceedings of the National Academy of Sciences 116.24 (2019): 11596-11601.
Lin et al. "Near-field enhancement of thermoradiative devices." Journal of Applied Physics 122.14 (2017): 143102.
U.S. Environmental Protection Agency, "How We Use Water" accessed Mar. 31, 2022, 9 pages.
SunPower Corporation, "Solar Panels Based on Maxeon Solar Cell Technology" accessed Mar. 31, 2022, 7 pages.
Brackmann, "Laser Dyes" 3rd edition, (2000) 294 pages.

(56) References Cited

OTHER PUBLICATIONS

Luxottica / Exciton, "Laser Dyes" accessed Mar. 31, 2022, 11 pages.
Li et al. "Combined theoretical and experimental study of band-edge control of Si through surface functionalization." The Journal of Physical Chemistry C 117.10 (2013): 5188-5194.
Mongin et al. "Thermally activated delayed photoluminescence from pyrenyl-functionalized CdSe quantum dots." Nature Chemistry 10.2 (2018): 225-230.
Lewis, Nathan S. "A Quantitative Investigation of the Open-Circuit Photovoltage at the Semiconductor/Liquid Interface." Journal of The Electrochemical Society 131.11 (1984): 2496.
Grimm et al. "Comparison of the photoelectrochemical behavior of H-terminated and methyl-terminated Si (111) surfaces in contact with a series of one-electron, outer-sphere redox couples in CH3CN." The Journal of Physical Chemistry C 116.44 (2012): 23569-23576.
Optical Properties of Silicon. Pveducation, May 25, 2018 {May 25, 2018). p. 1-3. [retrieved 27 4.9 Mar. 2, 2020 (Mar. 27, 2020) from<https:web.archive.org web/20 180525182157/https:Www.pveducation .org/pvcdrom/.
Seletskiy et al. "Local laser cooling of Yb: YLF to 110 K." Optics express 19.19 (2011): 18229-18236.
Yu et al. "Fundamental mechanisms of electroluminescence refrigeration in heterostructure light-emitting diodes." Light-Emitting Diodes: Research, Manufacturing, and Applications XI. vol. 6486. SPIE, 2007.

\* cited by examiner

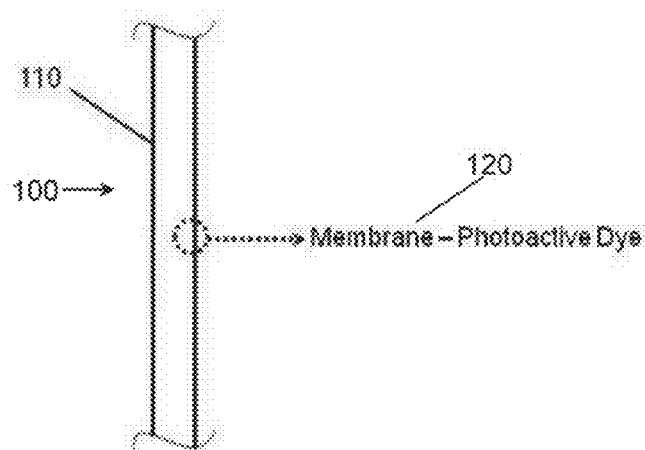
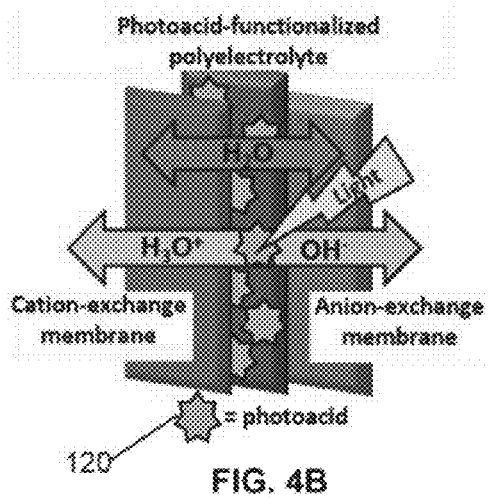
FIG. 4A
FIG. 4B
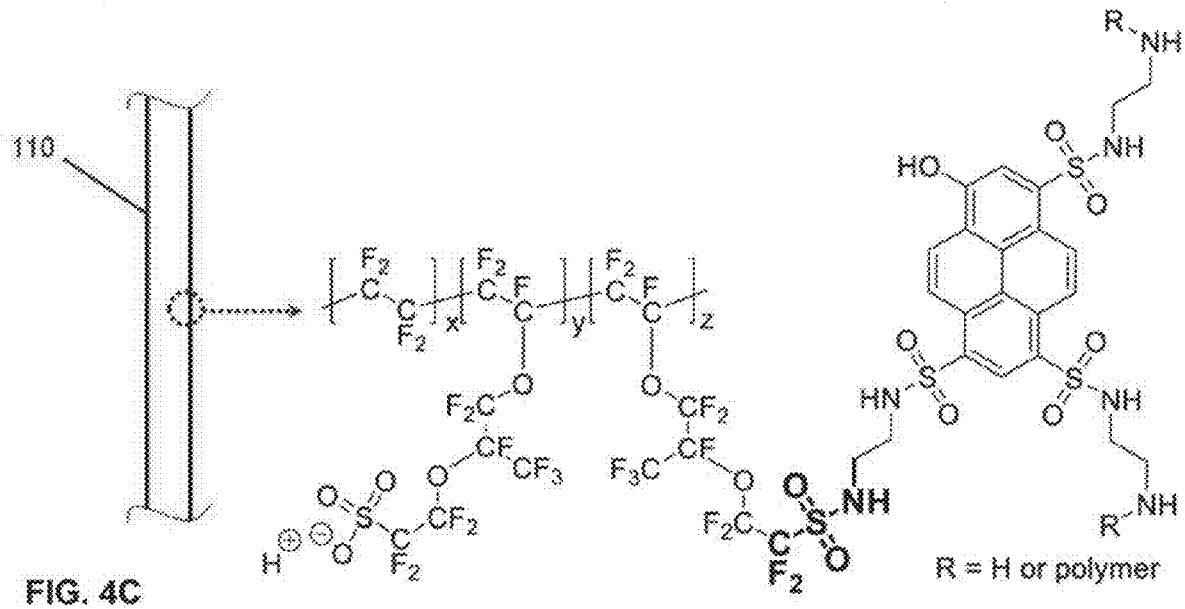
FIG. 4C
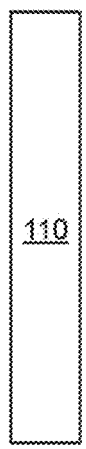
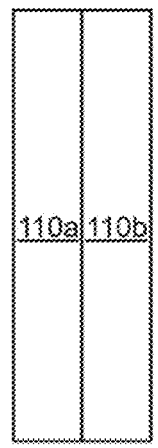
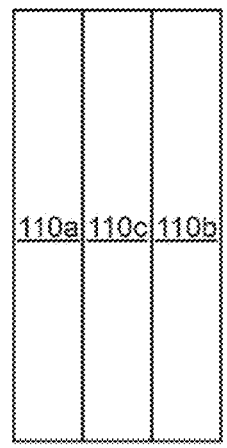
FIG. 5A
FIG. 5B
FIG. 5C

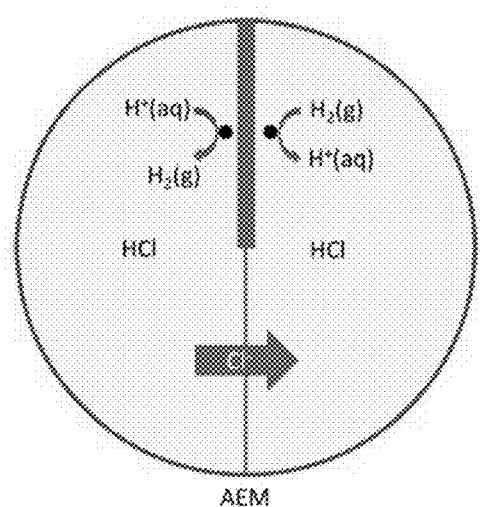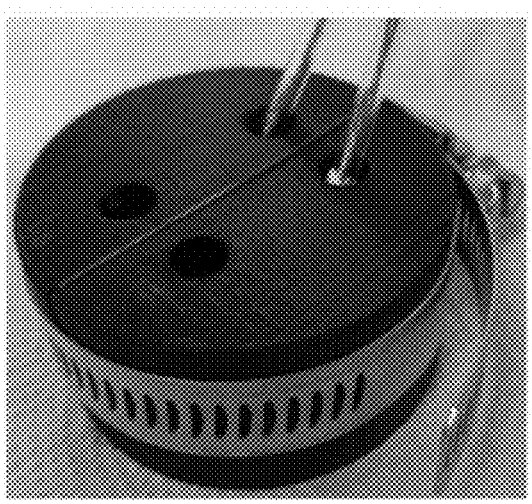
FIG. 7A
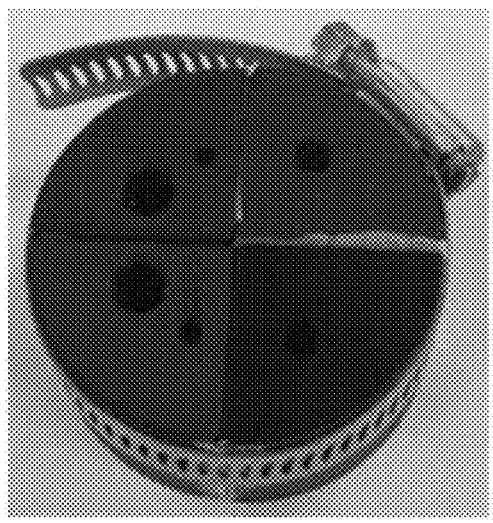
FIG. 7B
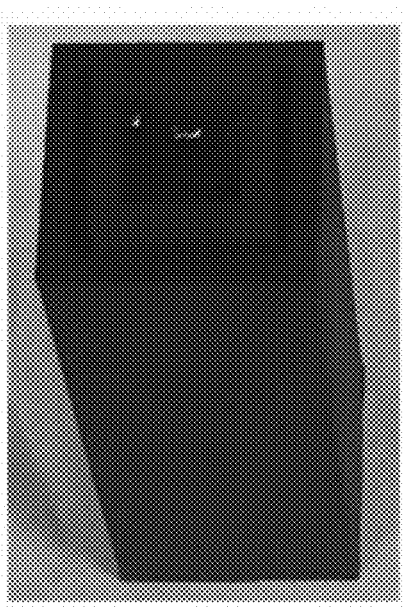
FIG. 7C

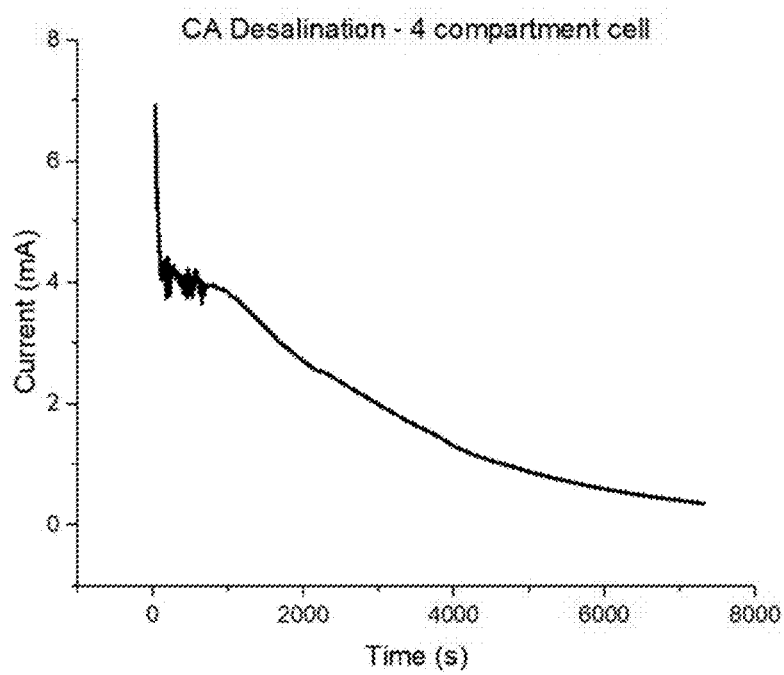
FIG. 8
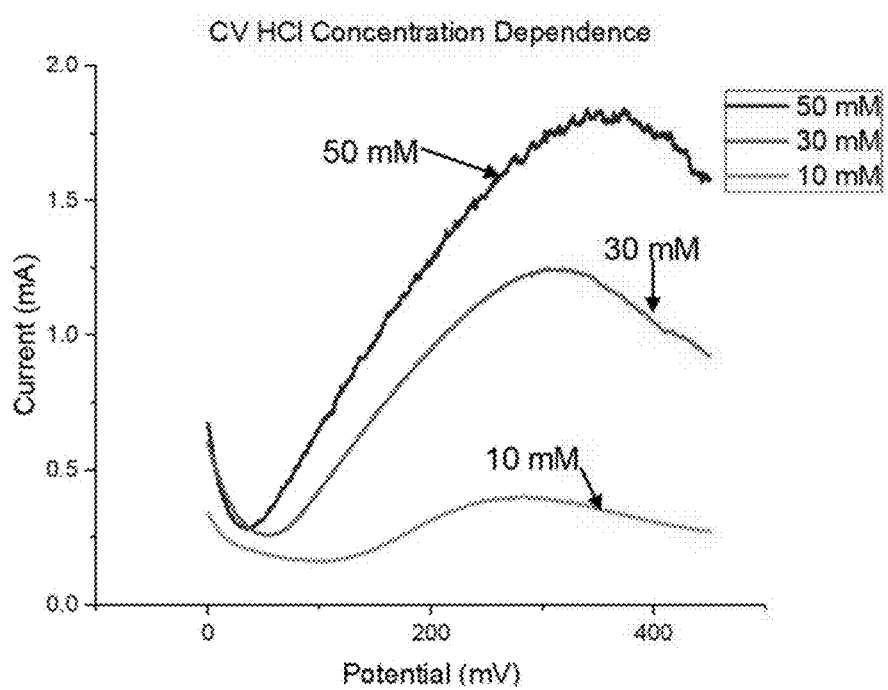 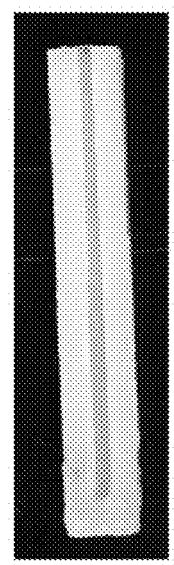
FIG. 9A  FIG. 9B

SYSTEMS AND METHODS FOR INTEGRATED SOLAR PHOTODIALYSIS

CROSS-REFERENCES TO RELATED APPLICATIONS

This application is a Non-Provisional and claims benefit of U.S. Provisional Application No. 62/648,823, filed Mar. 27, 2018, the specification(s) of which is/are incorporated herein in their entirety by reference.

This application is a Continuation-In-Part of U.S. patent application Ser. No. 15/698,324, filed Sep. 7, 2017, which is a non-provisional and claims benefit of U.S. Provisional Application 62/384,503, filed Sep. 7, 2016, the specification(s) of which is/are incorporated herein in their entirety by reference.

BACKGROUND OF THE INVENTION

Field of the Invention

The present invention relates to systems or devices and methods that can remove salt from water by passing ionic current derived from sunlight through said water. In particular, the present invention relates to systems and methods using ion-pumping membranes and separators modified with a photoactive dye for use in ion-exchange and ion-transport (IX) applications. The devices can serve as an easily distributed, low-cost technology that can efficiently and effectively desalinate saline sources of water. This may be particularly useful for water for agriculture and drinking.

Background Art

Many crops require a water source whose ion concentration is below a certain value, depending on the crop variety. While freshwater sources are available that are below the threshold for all plants, these sources are not abundant. Therefore, it is of interest to develop a technology that can produce water at a level of salinity that is commensurate with crop requirements, and can do so both quickly and at a low cost. The use of diffuse sunlight may be especially appropriate for agricultural purposes because the land resources are already in use and they can be adapted to include systems that produce desalinated water for the crops. There are many low salinity water sources, many of which are located in remote locations, including agricultural runoff, well water, and brackish streams, that after demineralization can be used for agriculture and drinking water. However, demineralization of low salinity water sources cannot be achieved with an easily distributed technology at a low cost and in a short period of time.

In one aspect, the current state-of-the-art means for sunlight to desalinate water is solar thermal distillation, which uses the energy in sunlight to vaporize/evaporate water. These vapors are then collected via condensation, which provides a distillate as a source of clean water. Ideal solar thermal distillation utilizes all incident solar energy in order to provide heat that offsets heat losses due to evaporation of the saline water. Solar irradiance on a sunny day under standard air mass 1.5 conditions radiates $10^{-4}$ kJ/cm$^2$-s at the surface of the Earth. Since the enthalpy of water vaporization is 40.35 kJ/mol, and is a lower bound to the value when salt is present in the water, and the concentration of water as 55 mol/L, it therefore takes at least ~22,000 seconds (6.2 hours) to produce 1 mL of pure water from any source, when using a 1 cm$^2$ active solar surface. Said another way, if the light absorbing area is a face of a 1 mL (cm$^3$) cube of water, this means that it takes at least 6.2 hours to desalinate the 1 cm tall cube of water. This calculation assumes an ideal heat management process where heat from condensation is rapidly transported away from the region of condensation. Because many targeted applications do not require pure water, and in fact some cannot tolerate water with zero salt ions present, the feed water stream can be mixed with the distilled pure water to effectively increase the volume of produced water that is less saline. For example, converting aqueous 50 mM NaCl into aqueous 10 mM NaCl only requires that 0.8 mL of desalinated now-pure water be mixed with 0.2 mL of feed water to produce 1.0 mL of aqueous 10 mM NaCl. Thus, only 80% of the time above is required in order to produce 1 mL of aqueous 10 mM NaCl from aqueous 50 mM NaCl, which is at least ~18,000 seconds (4.9 hours). Thus, while solar thermal distillation is a rather simple process to desalinate water, it is a very slow and inefficient process.

In another aspect, reverse osmosis (RO) can demineralize saline water sources. However, RO is not cost competitive at smaller scales, and at lower levels of salinity requires that a large amount of water be pumped in order to remove a small amount of salt. Furthermore, RO pumps do not run automatically or directly from renewable solar energy, thus requiring a solar photovoltaic cell or other solar energy conversion device in order to be powered by sunlight. In yet another aspect, electrodialysis is a technology where a DC current drives ions between aqueous electrolyte solutions in several compartments (for example, see FIG. 6B) where a feed solution is provided to each compartment. As current flows, semipermeable IX membranes allow specific ions to flow in specified directions. In FIG. 6B, the membrane on the left side of the diluate chamber selectively passes anions while the membrane on the right selectively passes cations. Based on the direction of current flow, cations and anions are forced out of the diluate chamber. This requires a voltage of at least 1.23 V under standard-state conditions to perform water electrolysis at the electrodes, which generates $H_2$ and $O_2$ that are allowed to escape and therefore do not poison the water streams, plus an additional 60 mV per ion for each order-of-magnitude difference in concentration of salt ions being transported across the membrane. This means that in order to transport the ions from originally aqueous 50 mM brackish salt water to aqueous 5 mM potable water requires at least 1.35 V.

Similar to an electrodialysis system, integrated solar photodialysis (ISPD) uses dye-sensitized IX membranes to drive current through an ionic circuit to desalinate water, as shown in FIG. 6A; however, ISPD directly utilizes renewable, distributed, and abundant solar energy as the power source. Traditional electrodialysis can be driven by a traditional solar photovoltaic cell or other solar energy conversion device but energy is wasted in the conversion of electronic power into ionic power. In an IX process, dissolved ions are transported from one solution to another with or without replacement by other similarly charged ions from the external circuit. Applications of the IX process include, but are not limited to, desalination, salt production, acid and alkali production, and ionic charge neutralization during operation in, for example, fuel cells, electrolyzers, the chloralkali process. IX membranes are membranes that are selectively permeable to specific ions and are divided into two general categories: cation-exchange membranes and anion-exchange membranes. Cation-exchange membranes contain fixed negatively charged groups and are selective to cations based on several physical processes including, but not limited to, Donnan exclusion and charge repulsion. Positively-charged cations permeate through the cation-exchange membranes well. Similarly, anion-exchange membranes contain fixed positively charged groups, follow the same physical processes for ion selectivity, and therefore anions, which have a negative charge, permeate through anion-exchange membranes well.

These selective permeations are carried out by passing an ionic current, typically originating as electronic current, through anion-exchange membranes and/or cation-exchange membranes arranged in specific patterns depending on the ultimate application and desired IX processes. The typical means of transducing electronic current into ionic current in IX processes, such as in etectrodialysis devices, fuel cells, electrolyzers, often relies on Faradaic reactions, such as water or brine electrolysis that each require a potential >1 V. While many IX processes require substantially less potential, a large amount of energy is wasted as heat and/or used to drive processes other than IX processes.

Currently, there are no distributed technologies that can overcome these large energy expenditures. The prior art (i.e. RO, distillation, and electrodialysis technologies, which together all constitute the state-of-the-art for large-scale desalination) typically use mostly non-renewable sources of electricity and are expensive. If said technologies are wired to a solar photovoltaic cell or a wind system to utilize renewable sources of electricity, the expense of the system remains high. Handheld RO technologies, such as the manually pumped Katadyn Survivor handheld RO device, are also costly; while solar stills are the state-of-the-art distributed and directly integrated renewable desalination technology, they are very inefficient on the small and portable scale and limited by the thermodynamics of the distillation process. Comparable solar-driven electrodialysis in a distributed handheld technology still requires large amounts of energy. For example, US20070099055 of Lee discloses a polymer electrolyte membrane including an ionic conducting polymer and a light-irradiated product of a photoacid generator (PAG) dye, which is irreversible such that after the PAG dye absorbs one photon and makes one proton, it is unable to do so again. Hence, there is a need for technologies that allow for IX processes to occur without wasting much energy or consuming dyes.

The present invention features devices or systems and methods that utilize these practical and optimal power-producing dye-sensitized IX membranes that can produce desalinated brackish or potable water (aqueous 10 mM salt) at a rate that is significantly faster than the theoretical best single-pass solar thermal distillation device. These dye-sensitized membranes that use light to drive ion transport, also allow said membranes to play an active role in photo-electrochemical processes/technologies, such as electrodialysis and electrolytic generation of acid and base, by supplementing the power demands of these processes/technologies with renewable sunlight-driven ion transport.

Solar thermal distillation is the process that is most comparable to and a director competitor of ISPD. The results presented herein represent the first demonstration of the feasibility of an ISPD device through experimental data obtained using model electrochemical circuits and numerical models and simulations. Further still, by using a tight-powered ion-pumping membrane for ISPD (FIG. 4B), which produces mobile ions upon solar excitation, a three-compartment design desalinates water by similar processes to electrodialysis (FIGS. 2A, 2B, 2C, and 2D). However, and importantly, this process does not require the 1.23 V to perform water electrolysis. There is an additional thermo-dynamic loss associated with net water dissociation required to produce HCl and NaOH from NaCl. This equals 0.83 V in the presence of aqueous 1 M HCl and aqueous 1 M NaOH. Assuming that desalination of aqueous 50 mM NaCl to aqueous 5 mM NaCl generates aqueous 45 mM HCl and aqueous 45 mM NaOH, the Nernst equation predicts that the thermodynamic requirement for moving the last ions in this cell up its concentration gradient and to produce acid and base is 0.87 V, which includes 0.12 V for the ion gradient and 0.75 V for water dissociation. This value is about 65% of that required to drive electrodialysis via water electrolysis, but >7 times the minimum required energy to unmix salt and move it across a membrane(s) (i.e. 0.12 V).

BRIEF SUMMARY OF THE INVENTION

It is an objective of the invention to provide systems and methods that use practical and optimal power-producing dye-sensitized IX membranes that allow for effective and rapid deionization of fluids, as specified in the independent claims. Embodiments of the invention are given in the dependent claims. Embodiments of the invention can be freely combined with each other if they are not mutually exclusive.

In some aspects, the present invention comprises an ISPD device having a specialized membrane that uses an innovative mechanism for light-to-ionic energy conversion where absorption of sunlight energizes and releases, or binds, ions which directly drives the IX process, such as desalination. A regenerative/reversible photoactive dye is covalently-bonded to the membrane in an arrangement with other IX membranes, which serve as selective contacts to allow for photovoltaic action and therefore a power-producing ion pump for use in driving the IX process. Two important features of all efficient solar photovoltaic power-producing technologies are sunlight absorption that results in a change in the number of mobile charge carriers, and rectifying current-voltage behavior which indicates directionality in charge transport. These are also properties desired in the present invention.

In some aspects, the present invention features a deionization system for deionizing a fluid. Deionization is a general class of ion transport, where desalination of salt water is a subset thereof. The system may comprise a chamber for containing the fluid, and one or more IX membranes arranged in the chamber so as to partition the chamber into two or more chambered compartments. In some embodiments, at least one of the IX membranes may contain a photoactive dye covalently bound to the IX membrane. The photoactive dye may, for example, be an organic photoacid, a photoacidic quantum dot, a photoacidic inorganic or organometallic metal complex, an organic photobase, a photobasic quantum dot, a photobasic inorganic or organometallic metal complex, or an analogous dye where any ion is released or bound due to photoexcitation. Upon exposure to a photon source, the photoactive dye is configured to undergo a regenerative light-driven dissociation reaction or light-driven association reaction to generate or remove a positively-charged mobile ion and/or a negatively-charged mobile ion, e.g. an ion (positive or negative) associates or dissociates an ion that is mobile. The process can either be reversible such that the opposite reaction occurs upon regeneration of the ground-state dye to its initial state or not strictly reversible if a different reaction occurs upon regeneration of the ground-state dye to its initial state. For example, the photoactive dye may be a photoacid that is regenerative such that upon exposure to the photon source, the photoacid undergoes the light-driven dissociation reaction to release a proton for use in the IX process, and wherein after returning to the ground state the photoacid is regenerated reversibly via association of a proton or not strictly reversibly via deprotonation of water to generate a hydroxide ion. As another example, the photoactive dye can be regenerative and reversible such that upon exposure to the photon source, it undergoes a light-driven dissociation reaction or light-driven association reaction to release or bind a mobile ion, and after returning to the ground state the dye binds or releases an ion of the same charge and/or type. To illustrate, the photoactive dye can release a $Na^+$ ion and after returning to the ground state the dye binds a $Na^+$ ion. Depending on the arrangement of the IX membranes, ions in the fluid are transported between chamber compartments to affect deionization of the fluid in at least one of the compartments.

One of the unique and inventive technical features of the present invention is the ISPD device having dye-sensitized IX membranes to drive ionic current through a circuit to desalinate water. Without wishing to limit the invention to any theory or mechanism, it is believed that this technical feature advantageously desalinates low salinity streams using renewable solar energy at a rate that is significantly faster than the current state-of-the-art small-scale solar thermal desalination technology.

Uniquely, the present invention allows for an electrochemical system that uses energizing ions to directly afford current and voltage, and not a system requiring the use of electrons that drives chemistry involving oxidation and reduction. Light absorption by the photoactive dye covalently bound to the membrane alters the chemical potential of the dye system so that the ion, such as $H^+$, $OH^-$, $Na^+$, or $Cl^-$, is more likely to dissociate from or associate to the dye and therefore ions, such as a proton and/or a hydroxide ion, are generated or removed locally by sunlight absorption. The properties responsible for the diode-like membrane behavior then drive ions, such as $H^+$, $OH^-$, $Na^+$, or $Cl^-$, in directions based on the sign of their charge. For example, positive ions move in one direction and negative ions move in the opposite direction. In some cases, predominantly positive ions move, or predominantly negative ions move, and in other oases, both ion charge types move in opposite directions. In the case of protons, if reprotonation of the ground-state dyes occurs by water or protonated buffers then the process generates negatively-charged hydroxide ions, or more negatively charged buffer species, that are then transported in the opposite direction. Measurement of a photovoltage and/or photocurrent indicates that light has been converted into ionic power.

Without wishing to limit the invention to any theory or mechanism, it is believed that this sensitization process advantageously allows for regenerative reactions of the photoactive dye, thereby allowing for the photoactive dye to be reused, by absorbing another photon of light, until it degrades due to side reactions. In addition, covalently bonding of the photoactive dye to the membrane can prevent leaching of the photoactive dye to allow for long-term use of the membrane. Since the membrane directly generates ionic power from sunlight, this can be used to supplement the power required by any device that moves ions with electric bias, thus reducing the power requirements of that device. None of the presently known prior references or work has this unique technical feature of the present invention, where mobile ions carry the energy, and not mobile electrons.

In contrast to other solar-energy conversion devices that operate as photovoltaics or photoelectrochemical devices that use electronic semiconductors, such as Si, GaAs, CdTe, $BiVO_4$, $WO_3$, $TiO_2$, or the like, the present invention does not implement a traditional electronic semiconductor. The present invention uses water as a "protonic" semiconductor, e.g., dope water like a semiconductor and make a protonic diode using hydrated IX membranes. Specific dyes can engender dye-sensitization of the ion generation and pumping processes. However, using water as a protonic semiconductor is counter-intuitive since experts in the solar energy, electrochemistry, and desalination fields believe $H^+ + OH^- \rightarrow H_2O$ is a fast reaction and desalination is an energy-intensive process, which would limit the ability for $H^+$ and $OH^-$ to generate a large enough photovoltade to drive desalination. Contrary to this belief, this reaction in the present invention is relatively slow enough and desalination requires relatively low enough energy, thus enabling sufficient photovoltages to effect photodialysis.

In some embodiments, the IX membranes may be comprised of one or more layers, in which at least one of the layers is photoactive for light-driven ion pumping of $H^+$, $OH^-$, $Na^+$, $Cl^-$, or other ions. In some embodiments, the layers are stacked optically in series to create a tandem membrane structure that results in larger photovoltages. In other embodiments, the IX membranes are annealed or chemically bound to one or more additional membranes, or fabricated as a monolithic structure with analogous spatially variant membrane properties, to enable a light-driven ion-pumping membrane that operates with symmetric ion distributions, meaning that there is no initial difference in the concentration of ions in the solutions that wet the membrane (i.e. no acid, base, or salt gradient). In one embodiment, the IX membranes may comprise a cation-exchange membrane, an anion-exchange membrane, a dye-sensitized polymer membrane, or a combination thereof. In other embodiments, the IX membrane comprises a photoactive ion pumping membrane that transports only positively-charged ions or only negatively-charged ions, or operates with symmetric ion distributions.

In other embodiments, the present invention features a device architecture incorporating the light-driven ion-pumping membrane for deionization of electrolytes. The architecture may comprise one or more chambers separated by IX membranes that enable transport of ions from one compartment to other(s) to affect deionization of the first compartment. In preferred embodiments, from a voltage loss standpoint, a design that is small (e.g. tubes that are 1-2 mm in diameter) is better than one that is large (e.g. tubes that are 1-2 cm in diameter) due to smaller ohmic ionic voltage losses. In one embodiment, the IX membranes can divide the chamber into two, three, or four chamber compartments. For example, a three-layer bipolar membrane structure comprising a custom photoactive dye-functionalized membrane, such as containing a photoacid, laminated between an anion-exchange membrane, such as Neosepta® AHA or Sustainion X37, and a cation-exchange membrane, such as Nafion® 112 or 212. The IX membranes can transport photogenerated ions out of the bipolar membrane and do not transport other ions to replace those that are lost. In another embodiment, the IX membranes can divide the chamber into two-compartments such that an inner compartment is configured to be deionized, and an outer compartment is configured to be concentrated with ions.

In other embodiments, the present invention features a photodialysis device that comprises the membranes and architecture described above. In a non-limiting embodiment, the device may be a tube in which the membranes can drive ions into or out of the tube depending on the arrangement of the membranes and therefore polarization of the device. In one embodiment, an inner diameter of the tube may be about 2 mm, from which the device can exhibit solar-relevant current densities (e.g., 10 mA/cm$^2$) at a voltage loss that could be generated from a hydrated light-driven ion pump, assuming that the hydrating water exhibits the properties of bulk water. In some embodiments, the chamber may be tubular chamber, such as cylinder or rectangular tube. The chamber can have an inner diameter, or inner dimensions, ranging from about 1 mm to about 1 cm with a surface area dictated by the area of the walls of a cylinder, πdh with d as the diameter and h as the height/length of the tube, to effect lower ohmic ionic voltage losses than that of smaller planar surfaces.

According to other aspects, the present invention features a method of deionizing a fluid stream containing ions. The method may comprise adding said fluid stream to a deionization system, where the fluid is disposed in the chamber of said system and is contacting the IX membranes, and exposing the IX membranes to a photon source. The photon source may be sunlight, ultraviolet light, visible light, and/or near-infrared light. Without wishing to limit the invention to any theory or mechanism, exposing the IX membranes to the photon source can causes the photoactive dye in the membrane to undergo a regenerative light-driven dissociation reaction or light-driven association reaction to generate or remove a positively-charged mobile ion and/or a negatively-charged mobile on that results in transport of ions into or out of the fluid, thereby altering the ion content of the fluid.

In some embodiments, the fluid may be pumped through the deionization system. In one embodiment, the present invention features a configuration of the IX membranes resembling that of a typical electrodialysis device except the materials that generate and/or remove ions (i.e. the electrodes in an electrodialysis device) are positioned back-to-back yet not in electrical contact with each other. The light-absorbing power supply takes the place of the back-to-back electrodes, while the other membranes serve as filters that selectively shuttle Na$^+$ and Cl$^-$ out of a saltwater compartment, ultimately resulting in potable water. In one example, the light-driven ion-pumping membrane is a two-layer bipolar membrane that can be positioned near a monopolar cation-exchange membrane and monopolar anion-exchange membrane. These configurations can be used to desalinate salt water that initially resides between the two monopolar membranes.

The electrochemical process starts with energized ions to move electrons or other ions. While one previous process utilized traditional electrochemical technologies via intermediate redox processes, there is always a loss of energy in doing redox, and typically it is quite large. The present invention features a critical technology in which by energizing ions directly affords current and voltage to be used to drive non-redox processes such as salt transport and generation of acid/base. The chemistry does not involve oxidation and reduction.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIGS. 1A, 1B, 1C, and 1D show device arrangements of a two compartment-chambered system for photodialysis.

FIGS. 2A, 2B, 2C, and 2D show device arrangements for photodialysis using a three compartment-chambered system. FIG. 2D shows a plurality of capillary tubes in a bundle, each capillary tube having a cation-exchange membrane, an anion-exchange membrane, and an intervening dye-sensitized polymer membrane transecting the tube, as a non-limiting example. Photovoltaic action occurs upon photoexcitation of the dye-sensitized membrane, which causes salt ions to move from outside of the tube to inside the tube. Note on FIG. 2C, the black dots represent platinized electrodes and the redox reactions shown only to be used and occur in the prototypes.

FIG. 4A shows a non-limiting schematic of a photoacid-modified bipolar IX membrane utilized in the present invention.

FIG. 4B shows integrated solar photodialysis desalination using the membrane in FIG. 4A.

FIG. 4C shows an example the membrane modified with a hydroxypyrene derivative, 8-hydroxypyrene-1,3,6-tris(2-aminoethylsulfonamide).

FIGS. 5A, 5B, and 5C depict non-limiting examples of possible membrane configurations.

Figure 6A:
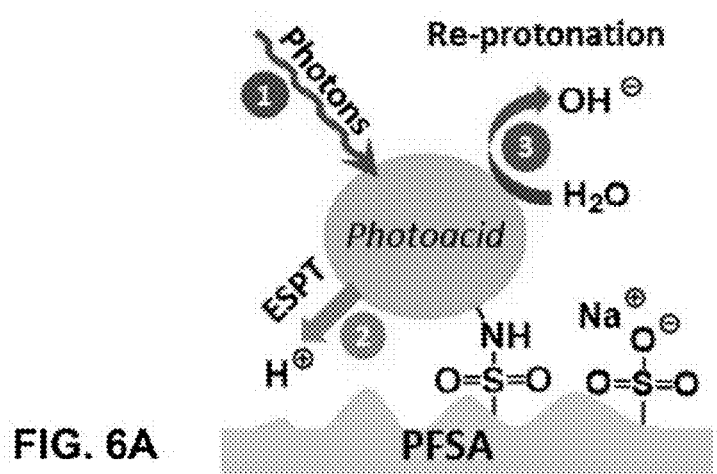

FIG. 6A shows a non-limiting schematic of a photoacid dye sensitization cycle using a photoacid-dye-sensitized ion-exchange membrane.

Figure 6B:
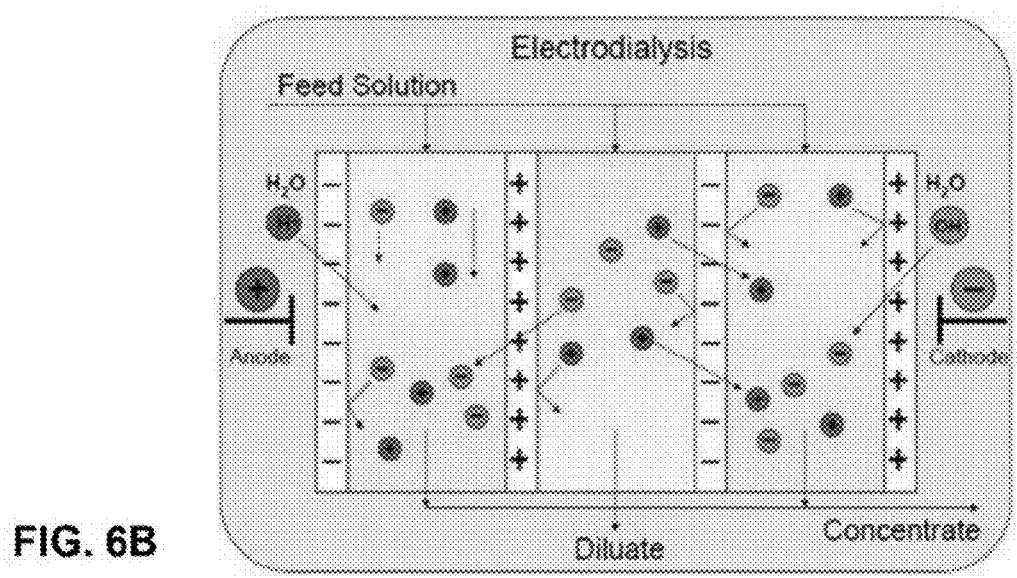

FIG. 6B shows a prior art schematic of desalination by traditional electrodialysis.

Figure 6C:
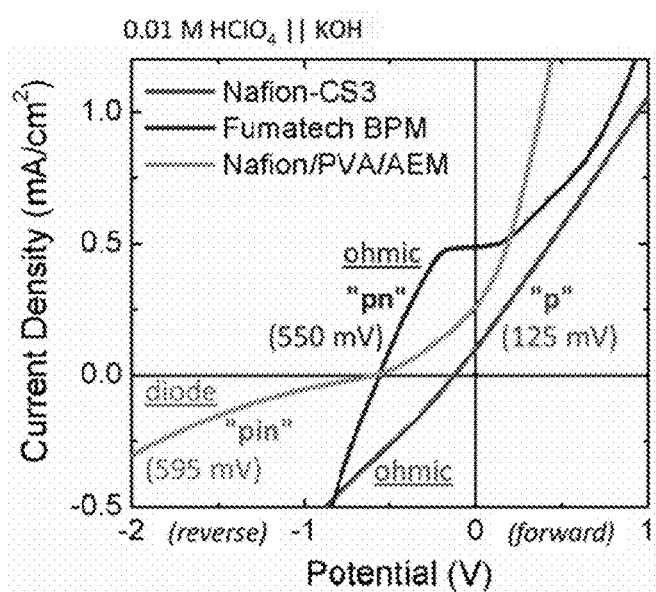

FIG. 6C shows current density vs. potential curves for three membranes: Nafion-CS3 single layer, commercial Fumatech FBM, and Nafion/PVA/AEM three layer, each separating aqueous 10 mM $HClO_4$ and aqueous 10 mM KOH.

Figure 3A:
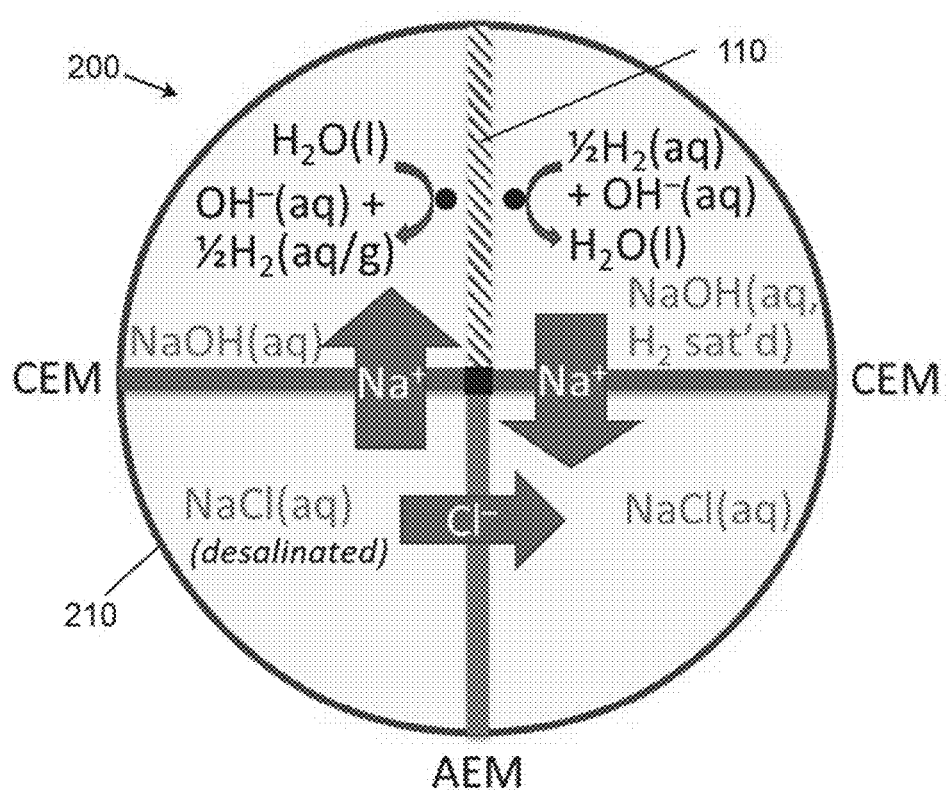
FIGS. 3A and 3B show device arrangements for photodialysis using four compartments.
Figure 3B:
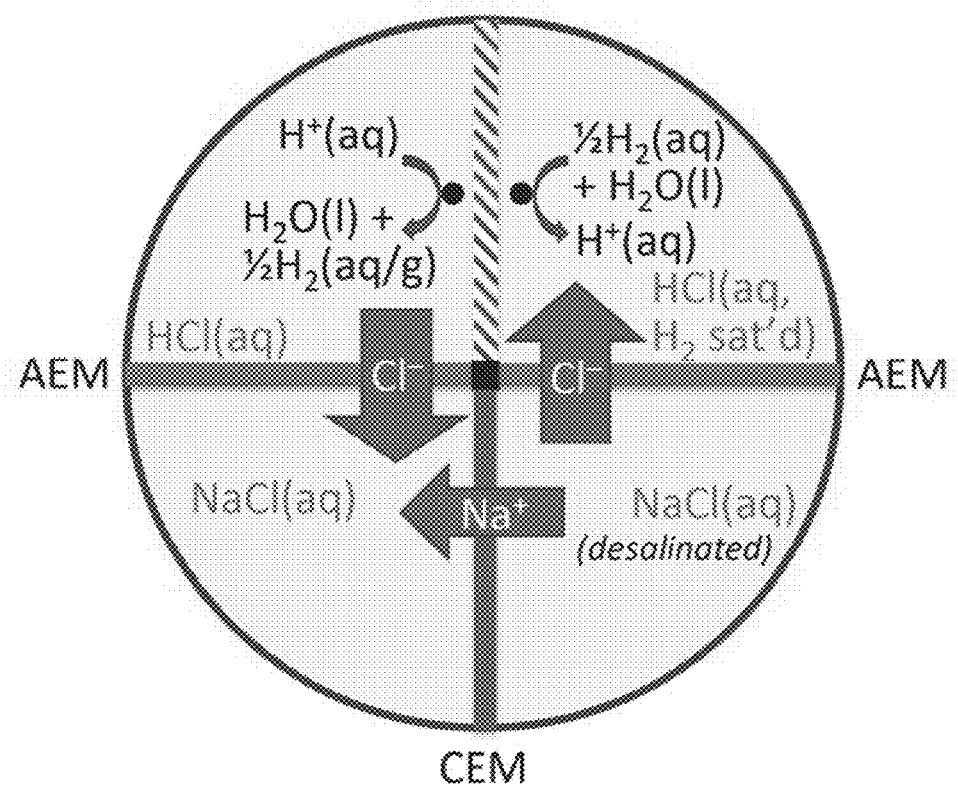

FIG. 7A is a photodialysis prototype of a two compartment system, FIG. 7B shows a photodialysis prototype using a four compartment system is accordance with FIG. 3A.

Figure 1A:
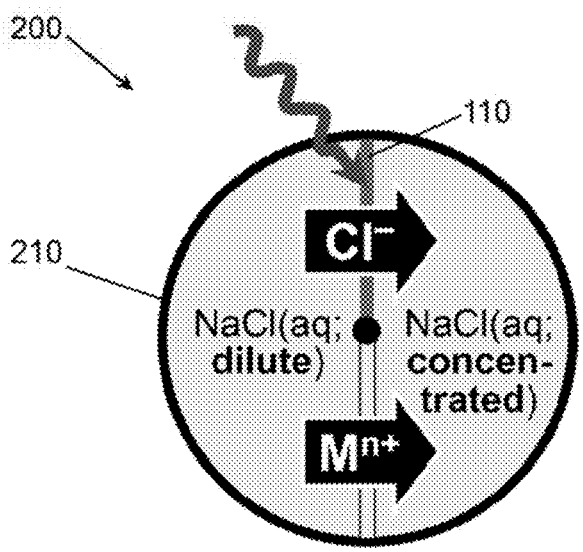
Figure 1B:
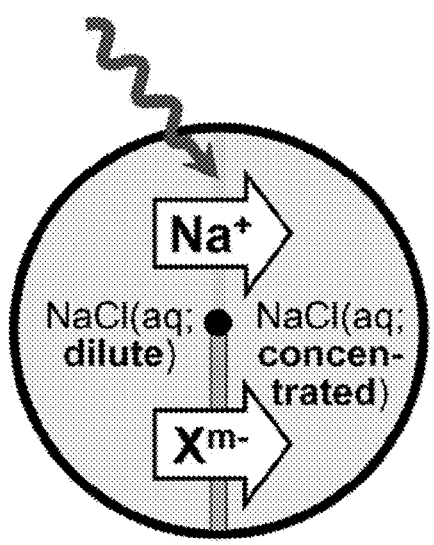
Figure 1C:
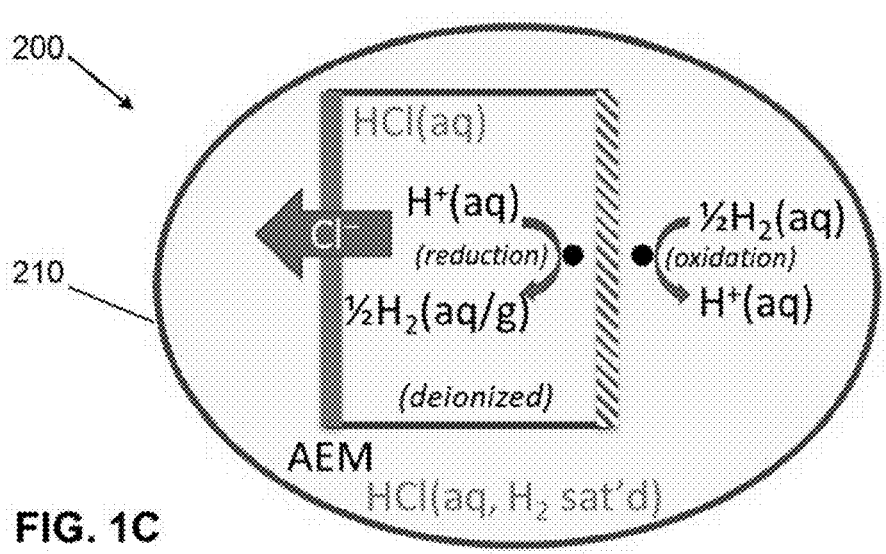

FIG. 7C shows a two-compartment cell-in-a-container device is accordance with FIG. 1C, wherein the inner compartment is desalinated. This prototype mimics the ion-pumping behavior of an optimal solar-powered sodium pump by using two reversible hydrogen electrodes with low catalytic overpotential to generate ionic current.

FIG. 8 shows potentiostatic chronoamperometry data for desalination using a four-compartment cell arrangement.

FIG. 9A shows a cyclic voltammogram of the two-compartment straw device of FIG. 7C at different concentrations of aqueous HCl to mimic different stages of deionization. The ability of this device to desalinate water at voltages relevant to a theoretical light-driven ion pumping membrane was tested and the results thereof are shown.

FIG. 9B shows an image of the inner compartment for a device like that in FIG. 7C, which here is a miniaturized version of that in FIG. 7C to minimize resistive losses.

Figure 10A:
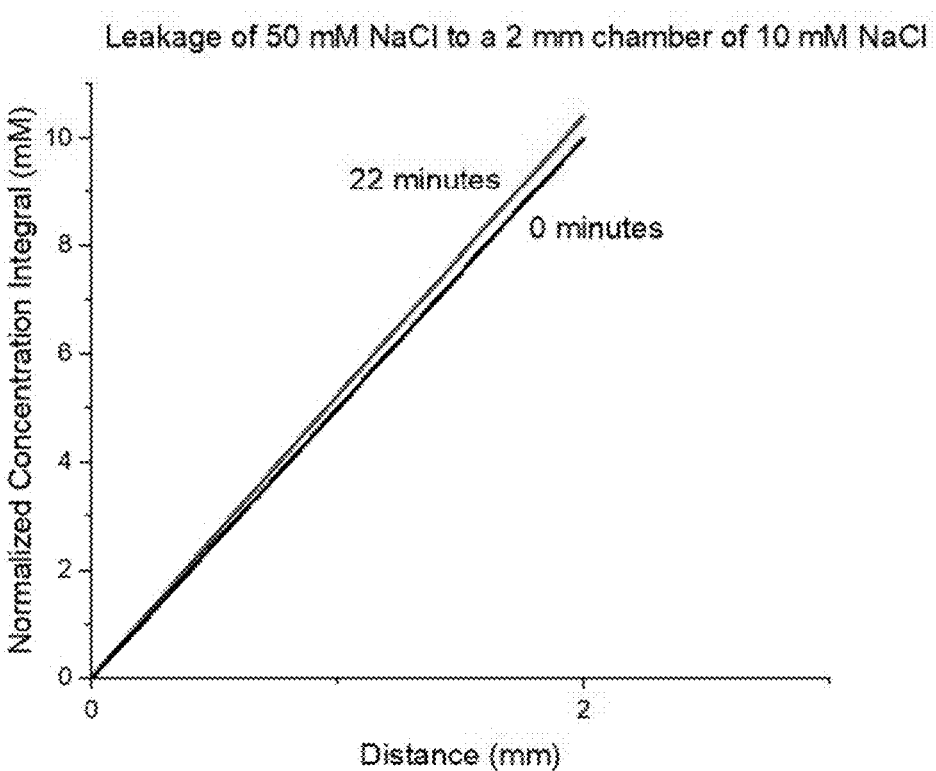
Figure 10B:
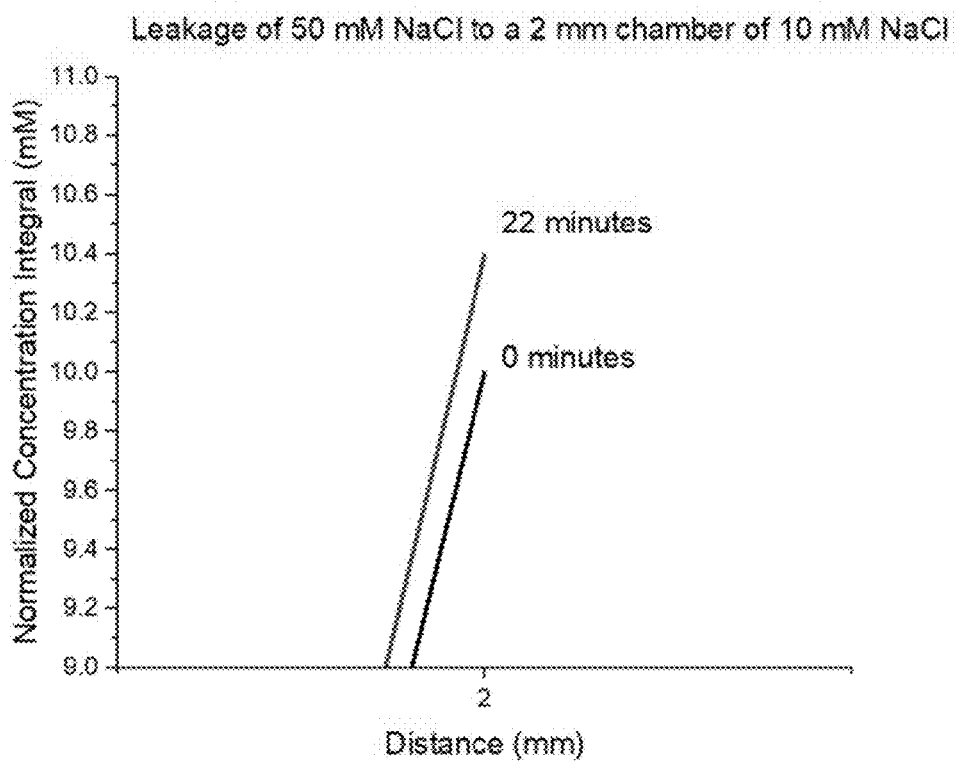

FIGS. 10A and 10B show numerical modeling results for NaCl leakage during desalination using the device of FIG. 7C.

Figure 11A:
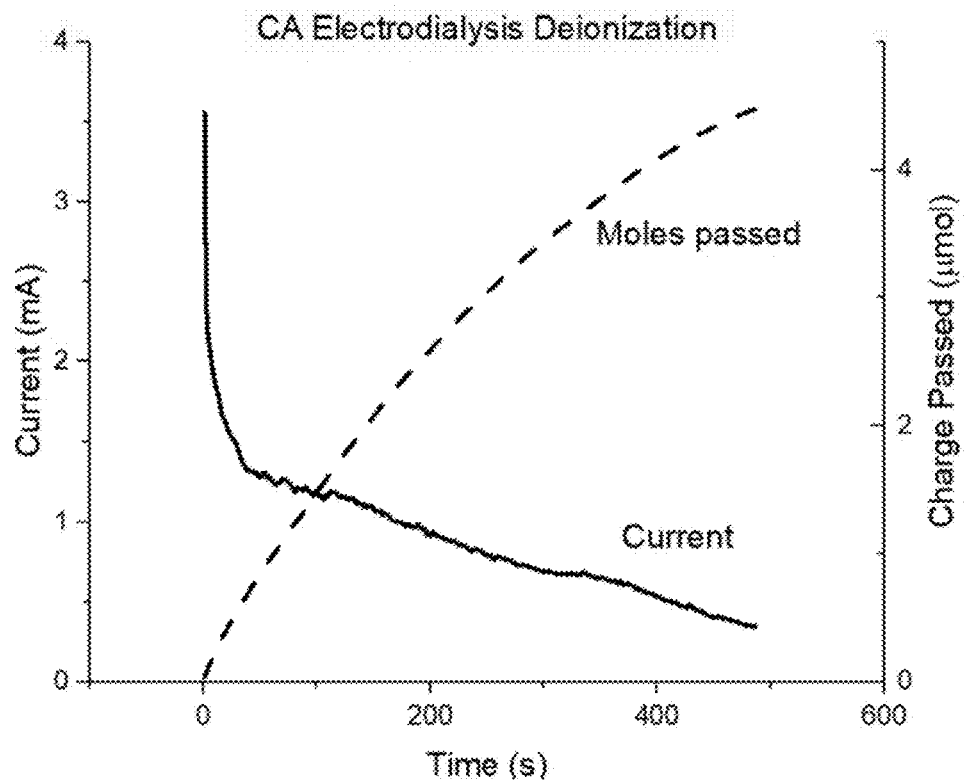

FIG. 11A shows potentiostatic chronoamperometry data for deionization of aqueous 50 mM HCl in the two-compartment tube setup.

Figure 11B:
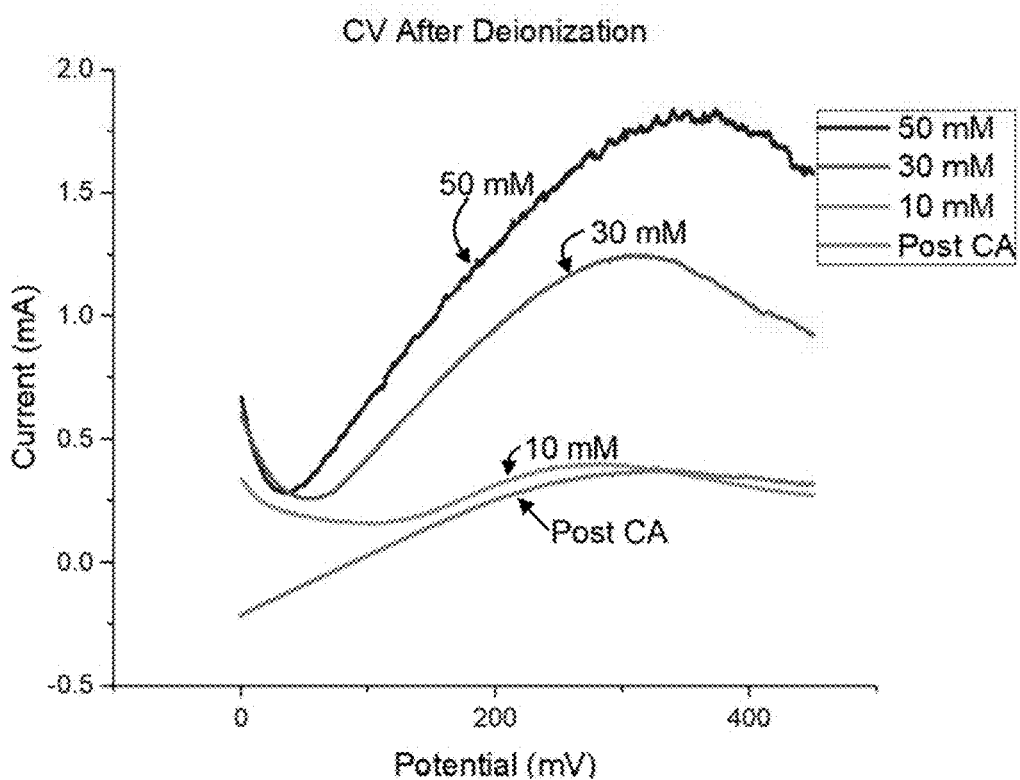

FIG. 11B shows a cyclic voltammogram of the system after chronoamperometry indicating deionization of the inner compartment to aqueous 10 mM HCl. Curves were transferred to the first quadrant to make interpretation easier.

Figure 12A:
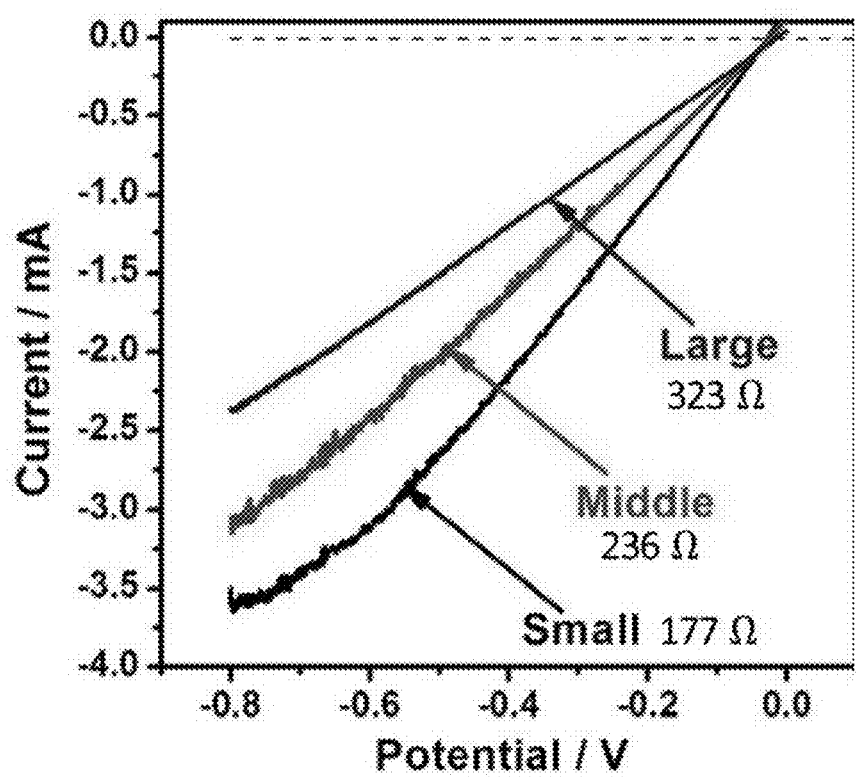

FIG. 12A shows a cyclic voltammogram using different-sized chambers with labeled resistance in aqueous 50 mM HCl.

Figure 12B:
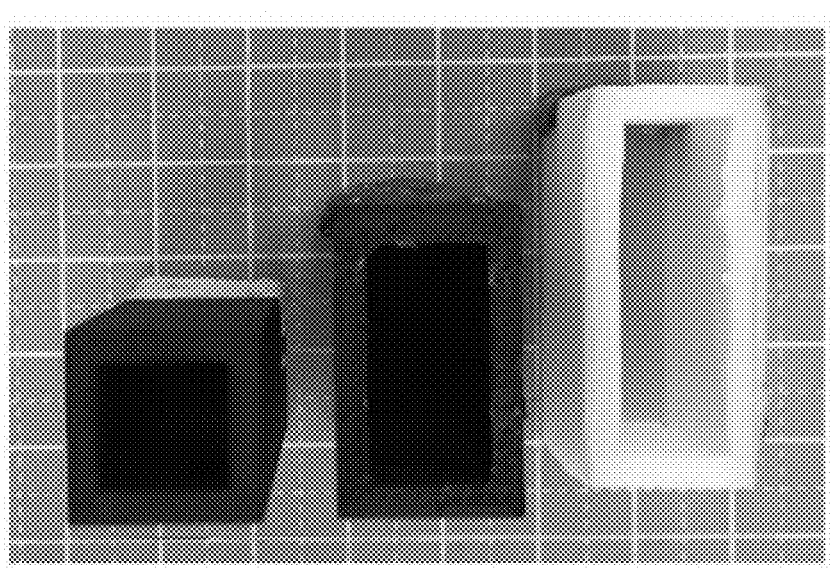

FIG. 12B shows images of chambers with approximate ion transport path lengths for the entire cell.

Figure 13A:
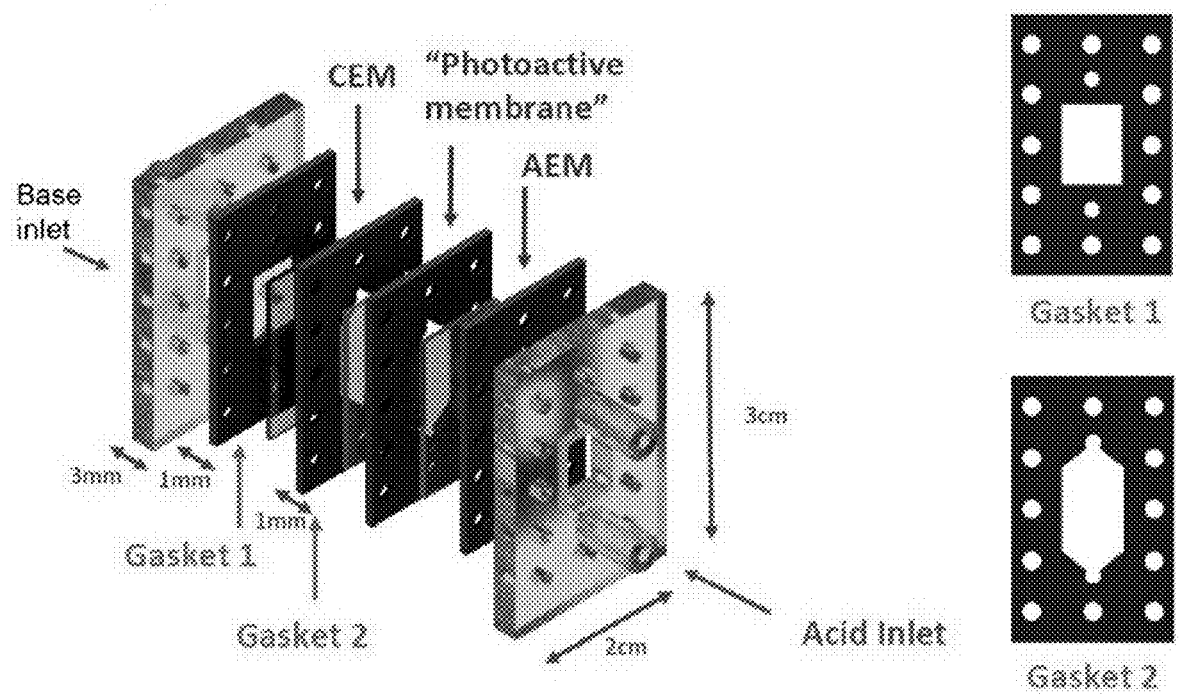

FIG. 13A shows a non-limiting design of a multiple-compartment cell with pumping.

Figure 13B:
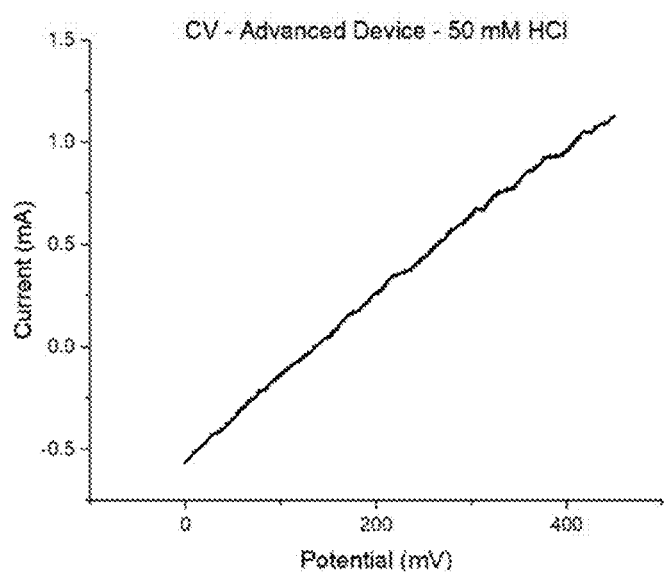

FIG. 13B shows a cyclic voltammogram using the flow device with pumping and containing aqueous 50 mM HCl inside and outside of the device.

Figure 13C:
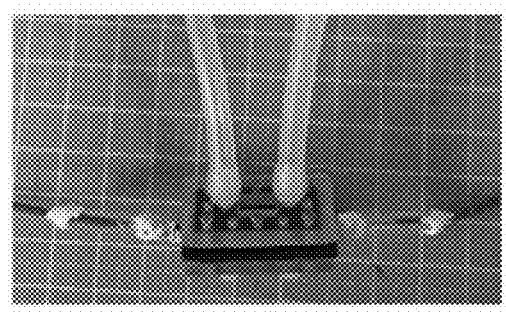

FIG. 13C shows a non-limiting embodiment of a multiple-compartment cell with pumping via tubes connected to said device.

Figure 14A:
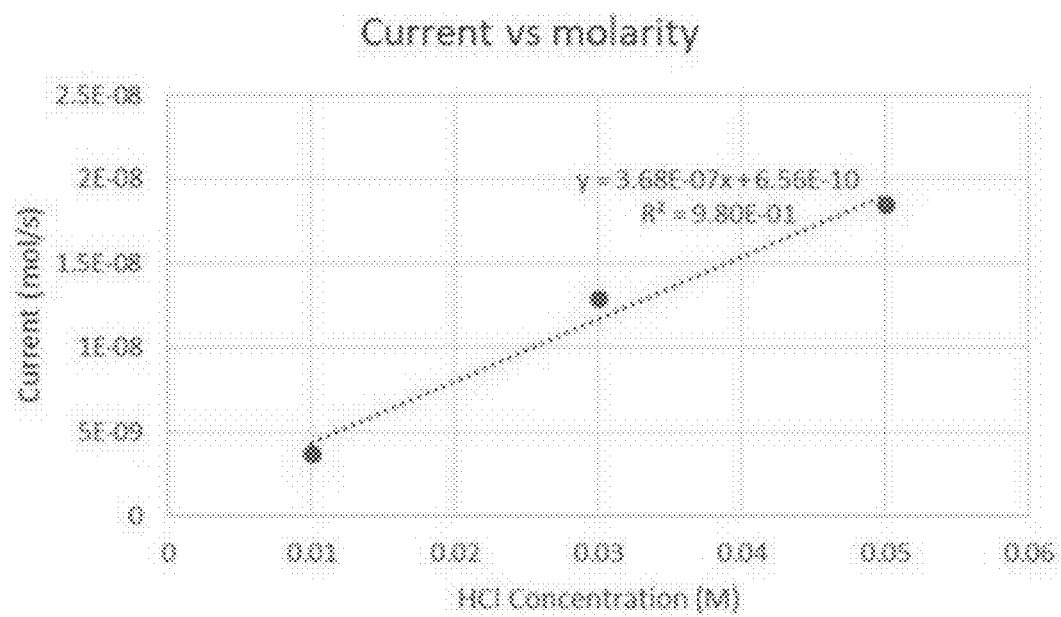

FIG. 14A shows a plot of the effective current (mol/s) as a function of the concentration of aqueous HCl and best-fit line.

Figure 15A:
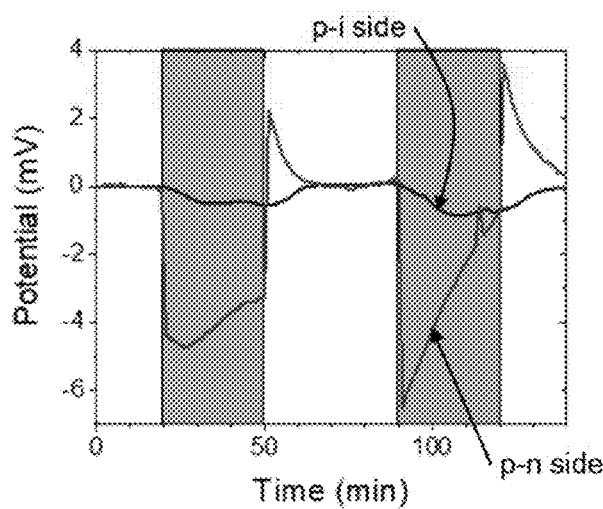

FIG. 15A shows a 4-layer PINP membrane photovoltage under 405 nm illumination (shaded regions) wetted by aqueous 10 mM HClO$_4$ on both sides and measured using four-electrode chronopotentiometry at zero applied current. The two current-carrying electrodes were platinum meshes and the two potential-sensing electrodes were KCl-saturated calomel reference electrodes. Illumination was from the PN side or the PI side.

Figure 15B:
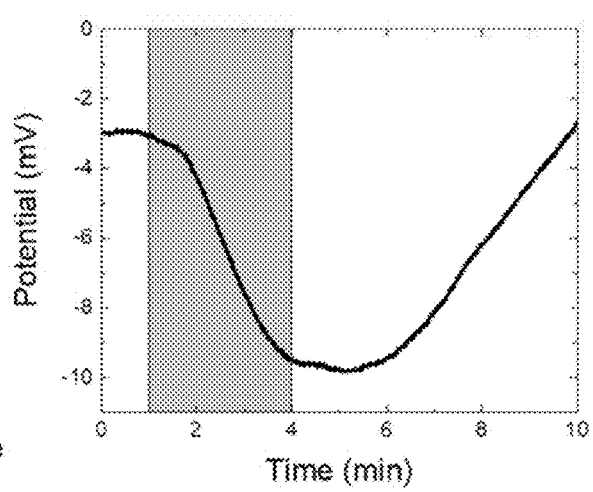

FIG. 15B shows a 4-layer PINP membrane photovoltage under 405 nm illumination (shaded regions) wetted by aqueous 10 mM HCl saturated with forming gas (5% H$_2$ in N$_2$) on both sides and measured using four-electrode chronopotentiometry at zero applied current. The two current-carrying electrodes were carbon rods and the two potential-sensing electrodes were platinized platinum mesh reversible hydrogen reference electrodes, with illumination from the PN side.

DETAILED DESCRIPTION OF THE INVENTION

Following is a list of elements corresponding to a particular element referred to herein:

| | |
|---|---|
| 100 | ion-pumping membrane system |
| 110 | membrane |
| 120 | photoactive dye |
| 200 | deionization system |
| 210 | chamber for containing fluids |

ABBREVIATIONS bpy, 2,2'-bipyridine
bq, biquinoline
AEM, anion-exchange membrane
BPM, bipolar membrane
CEM, cation-exchange membrane
IX, Ion-Exchange
ISPD, integrated solar photodialysis
PINP, refers to a 4-layer ion pump as cation-exchange membrane (Nafion 212; 50 µm thick), poly(p-phenylene oxide) with covalently-bound aminopyrene photoacid dye, anion-exchange membrane (Sustainion X37; 50 µm thick), and then another cation-exchange membrane (Nafion 212; 50 µm thick).

RO, reverse osmosis

As used herein, the term "Ion-pumping", when used in conjunction with membranes, processes, applications, and the like, encompasses the terms "ion-exchange", "ion-transpory", "ion-conductive", and "ion-selective", and may be used interchangeably. The term "IX" refers to both ion-exchange and ion-transport and is defined as the transport of ions from one solution to another with (exchange) or without replacement by other similarly charged ions. IX membranes such as anion-exchange membranes or cation-exchange membranes predominantly transport ions of a single charge.

As defined herein, the term "photoactive dye" is a compound that can undergo a regenerative light-driven dissociation reaction or light-driven association reaction to generate or remove a positively-charged mobile on and/or a negatively-charged mobile ion. Referring to FIG. 6A, one of ordinary skill in the art would understand that the photoactive dye can generate a positively-charged on or a negatively-charged ion upon photoexcitation, and then remove the same charge-type of ion from solution, thus regenerating itself. In some embodiments, the process is not strictly reversible and the photogenerated positively-charged ion is a proton and there is a photogenerated negatively-charged hydroxide ion. In other alternative embodiments, other ions may be generated or removed with light, including, but not limited to Na$^+$, potassium ion (K$^+$), magnesium ion (Mg$^{2+}$), calcium ion (Ca$^{2+}$), Cl$^-$. These ions may also be responsible for generating transient power, similar to the H$^+$ and OH$^-$ processes, and may be reversibly released and bound during the sensitization process.

As defined herein, a bipolar membrane is an IX membrane composed of an anion-exchange layer and a cation-exchange layer. For the most common uses of conventional bipolar membranes, applying an electric bias helps facilitate rapid and efficient water dissociation inside the membrane to generate additional protons (H$^+$) and hydroxide ions (OH$^-$). Traditional electrodialysis cells must convert electronic power into ionic power. The present invention utilizes photoactive dyes to generate or remove positively-charged and/or negatively-charged ions using solar energy, and upon transport of these ions and regeneration of the dyes, the solution or membrane has a change in net charge. The light-driven ion pumping membrane of the present invention bypasses the step of applying an external electric bias and converting electronic power into ionic power and will therefore thermodynamically save about 85% of the energy required by an electrodialysis cell that performs water electrolysis to drive ionic current, which in some embodiments, also drive electrodialysis of seawater to potable water.

Any of the modified IX membranes or bipolar membranes described herein may be used in an IX process such as desalination for treating wastewater, salt water, or any electrolyte solution. Desalination is an IX application known to one of ordinary skill in the art. Examples of which are disclosed in, but not limited to, U.S. Pat. No. 8,764,957, the specification of which is incorporated herein by reference. These membranes can be arranged in specific patterns and in desired quantities depending on the ultimate application and desired ion-transport processes. Additional details and principles of said IX membranes may be found in co-owned and co-pending U.S. application Ser. No. 15/698,324, which published as US2018-0065095A1, the specification(s) of which is/are incorporated herein in their entirety by reference. Briefly, the IX membrane features regenerative photoactive dyes that are covalently-bonded to a membrane or separator for ion-pumping. The photoactive dye-functionalized membranes can be arranged with other IX membranes, which serve as selective contacts to afford photovoltaic action and therefore form a power-producing membrane that pumps ions for use in driving an IX process, such as desalination and electrodialysis. The photoactive dye is regenerative such that upon exposure to a photon source, the photoactive dye undergoes a light-driven dissociation reaction or light-driven association reaction to generate or remove a positively-charged mobile ion and/or a negatively-charged mobile ion for use in the IX process, and a second mobile ion is generated or removed upon regeneration of the ground-state dye to its initial state also for use in the IX process. In preferred embodiments, the photoactive dye may, for example, be an organic photoacid, a photoacidic quantum dot, a photoacidic inorganic or organometallic metal complex, an organic photobase, a photobasic quantum dot, a photobasic inorganic or organometallic metal complex, or an analogous dye where any ion is released or bound due to photoexcitation.

Referring to FIGS. 1A-15B, the present invention features ISPO devices equipped with ion-pumping, photoactive-dye-sensitized IX membranes and methods for deionizing a fluid. In some embodiments, the present invention features a deionization system (200) for deionizing a fluid. As shown in FIGS. 1A and 1B, in one embodiment, the present invention features a deionization system for deionizing a fluid using a two-compartment chambered system. The system may comprise a chamber (210) for containing a fluid to be de-ionized and two IX membranes (110) arranged in the chamber so as to partition the chamber into two or more chamber compartments. At least one of the IX membranes has a photoactive dye (120) covalently bound to itself (referred to as a dye-sensitized IX membrane). Upon exposure to a photon source, the photoactive dye is configured to undergo a regenerative light-driven dissociation reaction or light-driven association reaction. This reaction generates or removes a positively-charged mobile ion and/or a negatively-charged mobile ion causing the ions in the fluid to be transported between chamber compartments to affect deionization of the fluid in one of the compartments. The photon source may be sunlight, ultraviolet light, visible light, near-infrared light, or a combination thereof. Non-limiting embodiments of two compartment systems are shown in FIGS. 1A-1D. In these embodiments, two membranes are required with at least one being photoactive: one to pump an ion and the other to allow the oppositely charged ion to be pulled by the energy of the pumped ion, thus net transporting a neutral species, such as NaCl.

In another embodiment, the deionization system (200) for deionizing a fluid uses a four-compartment chambered system (FIGS. 3A and 38). The system comprises a chamber (210) for containing the fluid and a plurality of ion-exchange (IX) membranes (110) arranged in the chamber so as to partition the chamber into a four-compartment chamber. At least one of the IX membranes comprises a photoactive dye covalently bound to the IX membrane (referred to as a dye-sensitized IX membrane). Upon exposure to a photon source, the photoactive dye is configured to undergo a regenerative light-driven dissociation reaction or light-driven association reaction to generate or remove a positively-charged mobile ion or a negatively-charged mobile ion causing the ions in the fluid to be transported between chamber compartments to affect deionization of the fluid in at least one of the compartments. For instance, one compartment is configured to be deionized, another compartment is configured to be concentrated with salt, and the other two compartments are configured to be either acidic or basic.

In other embodiments, the present invention features a method of deionizing a fluid stream containing ions. The method uses a deionization system that includes chambers for containing the fluid and IX membranes for deionizing a fluid as described above. After adding the fluid stream to the deionization, system, the fluid is disposed in the chamber of the system and is in contact with the IX membranes. The membrane that has the covalently-bound photoactive dye is then exposed to a photon source, which causes the photoactive dye in the membrane to undergo a regenerative light-driven dissociation reaction or light-driven association reaction to generate or remove a positively-charged mobile ion or a negatively-charged mobile ion. This enables transport of the ions into or out of the fluid, thereby changing the ion content of the fluid.

Referring to FIGS. 4A-4C, in some embodiments, the present invention features a system that uses an ion-pumping membrane system (100) in an IX process. The system may comprise an IX membrane (110) having a photoactive dye (120) covalently bound to said membrane (110). Without wishing to be bound by a particular theory or mechanism, upon exposure to a photon source, such as sunlight, ultraviolet, visible or near-infrared light, the photoactive dye is configured to undergo a regenerative light-driven dissociation reaction or light-driven association reaction to generate or remove a positively-charged mobile ion and/or a negatively-charged mobile ion. In some embodiments, the photoactive dye (120) may be covalently bound to at least a surface of the IX membrane (110) as shown in FIG. 4C. In other embodiments, the IX membrane (110) may be modified throughout their thickness with the dye.

In some embodiments, the system may further comprise a second membrane juxtaposed or attached to the IX membrane, thus forming a membrane system (100) that is a bipolar membrane as shown in FIG. 5B. For example, the IX membrane may be a cation-exchange membrane (110a) and the second membrane may be an anion-exchange membrane (110b).

In some embodiments, the present invention may feature a desalination system comprising a desalination chamber, the two-layer membrane system described above, a second cation-exchange membrane, and a second anion-exchange membrane. In one embodiment, the membrane system, the second cation-exchange membrane, and the second anion-exchange membrane may be disposed in the desalination chamber such that the membranes partition the desalination chamber into three chamber sectors, as shown in FIGS. 2A-2D. Further still, the cation-exchange membranes and the anion-exchange membranes may be arranged in an alternating pattern. During the IX process, fluids containing salt ions may be disposed within the desalination chamber, and photoexcitation of the photoactive dye in the dye-sensitized membrane causes the regenerative light-driven dissociation reaction or light-driven association reaction to generate or remove a positively-charged mobile ion and/or a negatively-charged mobile ion, which enables transport of the salt ions in the chamber sector disposed between the second cation-exchange membrane and the second anion-exchange membrane to cross the respective membrane, thereby changing the salt ion content from the fluids in said chamber sector.

In other embodiments, the IX membrane (110) may comprise a polymer membrane (110c) to which the photoactive dye is covalently bound. In some embodiments, the membrane system may further comprise a cation-exchange membrane (110a) and an anion-exchange membrane (110b), in addition to the polymer IX membrane (110c).

In one embodiment, the polymer IX membrane (110) (membrane (110c)) may be juxtaposed or attached to the cation-exchange membrane (110a) and the anion-exchange membrane (110b), thus forming a membrane system (100) that is a three-layer bipolar membrane as shown in FIG. 5C. A desalination system comprising a desalination chamber, the aforementioned membrane system, a second cation-exchange membrane, and a second anion-exchange membrane is also provided herein. Similar to the embodiments shown in FIGS. 2A-2D, the membrane system, the second cation-exchange membrane, and the second anion-exchange membrane may be disposed in the desalination chamber such that the membranes partition the desalination chamber into three chamber sectors, and where the IX process occurs as previously described. Preferably, the cation-exchange membranes and the anion-exchange membranes may also be arranged in an alternating pattern.

In other embodiments, the IX membrane (110c) may be disposed between the cation-exchange membrane (110a) and the anion-exchange membrane (110b), but not necessarily juxtaposed in between. According to another embodiment, the desalination system of the present invention may comprise a desalination chamber, the IX membrane (110c), the cation-exchange membrane (110a), and the anion-exchange membrane (110b). Similar to the embodiments shown in FIGS. 2A-2D, the membranes may be disposed in the desalination chamber such that the membranes partition the desalination chamber into three chamber sectors, and where the IX process occurs as previously described.

In further embodiments, the cation-exchange membrane (110a) may be connected edgewise to the anion-exchange membrane (110b) so as to form a cylindrical IX tube. The diameter of the IX tube can vary greatly, but to desalinate seawater to potable water using sunlight likely requires that the diameter of the IX tube be less than about 5 mm. This configuration of the desalination system may improve device efficiency by minimizing ohmic ionic voltage losses. In some embodiments, the IX membrane (110c) may be disposed within the IX tube such that the IX membrane (110c) transects the cation-exchange membrane (110a) and the anion-exchange membrane (110b) at the edge connections, as shown in FIG. 2D. Without wishing to be bound by a particular theory or mechanism, photoexcitation of the dye-sensitized membrane (110c) can enable transport of salt ions into or out of the IX tube by crossing the respective cation-exchange membrane (110a) or anion-exchange membrane (110b). This overall design is analogous to that described above with the general design strategy of connecting one side of the IX membrane to the other side of the IX membrane by a continuous fluid that has at least one intervening IX membrane. In other embodiments, at least two intervening IX membranes may be used.

In some embodiments, for any of the designs or number of compartments, the cross-sectional shapes of the compartments can be a circle, oval, square, rectangle, triangle, or any shape. In other embodiments, for any of the designs or number of compartments, the compartments can be nested or not. The black dots in the Figures represent platinized electrodes and the redox reactions shown only occur in the prototypes. In some embodiments, the light-driven ion pump can pump ions across the dye-sensitized membrane and no electrodes or redox chemistry will be driven. There is an additional voltage loss required to drive the redox reactions and thus, a device running on a solar photovoltaic cell wired to electrodes to drive redox reactions that drive desalination is even more wasteful of energy.

Another embodiment of the desalination system may comprise a desalination chamber and a plurality of the IX tubes as shown in FIG. 2D. The plurality of IX tubes may be bundled together such that the IX tubes are parallel to each other. The bundle of IX tubes may be disposed within the desalination chamber. During the IX process, fluids containing salt ions are disposed within the desalination chamber, and photoexcitation of the photoactive dye in the dye-sensitized membrane (110c) of each IX tube causes the regenerative light-driven dissociation reaction or light-driven association reaction to generate or remove a positively-charged mobile ion and/or a negatively-charged mobile ion, which enables transport of the salt ions into or out of the IX tubes by crossing the respective CEM (110a) or AEM (110b), thereby changing the salt ion content of the fluids between each IX tube.

According to other embodiments, the present invention may feature a method of desalinating a fluid containing salt ions. The method may comprise adding said fluid to any of the desalination systems described herein, such that the fluid is disposed in a desalination chamber of said system and contacts the membranes. The method further comprises exposing the dye-sensitized membrane to a photon source, which causes the photoactive dye in the dye-sensitized membrane to undergo a regenerative light-driven dissociation reaction or light-driven association reaction to generate or remove a positively-charged mobile ion and/or a negatively-charged mobile ion that enable transport of the salt ions into or out of the fluid, thereby changing the salt ion content of the fluid.

PHOTOACTIVE DYES

Consistent with previous embodiments, the membranes of the desalination systems and ISPD devices utilizes a photoactive dye for generating ions upon exposure to a photon source. Without wishing to be bound to a particular theory or mechanism, the photoactive dye is configured to undergo a regenerative light-driven dissociation reaction or light-driven association reaction to generate or remove a positively-charged mobile ion and/or a negatively-charged mobile ion. Preferably, the photoactive dye is capable of being covalently bound to a substrate, such as a polymer or IX membrane. Consistent with previous embodiments, the photoactive dye may be a photoacid, a photobase, or a dye capable of performing light-driven ion release or capture. The following examples of photoactive dyes and syntheses thereof are not intended to limit the invention in any way. Equivalents or substitutes are within the scope of the invention.

PHOTOACIDS

As defined herein, a photoacid is a molecule that becomes more acidic when it undergoes a regenerative light-driven dissociation reaction upon absorbing photons. Photoacids differ from photoacid generators (PAGs) in that PAGs undergo photodissociation irreversibly.

In one embodiment, a visible-light-absorbing photoacid dye molecule that resembles hydroxypyrene with free amine groups that can be bound to polymers (FIG. 4C) was synthesized. Specifically, a congener of the state-of-the-art visible-light-absorbing organic photoacid, pyranine, was synthesized by appending three amine groups to its hydroxypyrene core to allow for covalent attachment to polymers. As illustrated in Scheme 1, first, the alcohol group of the tris(sulfonato)hydroxypyrene (pyranine) starting material is protected, then the three sulfonates were activated to sulfonyl chlorides, and then converted to sulfonamide groups using N-Boc-ethylenediamine followed by deprotection using trifluoroacetic acid.

Scheme 1:

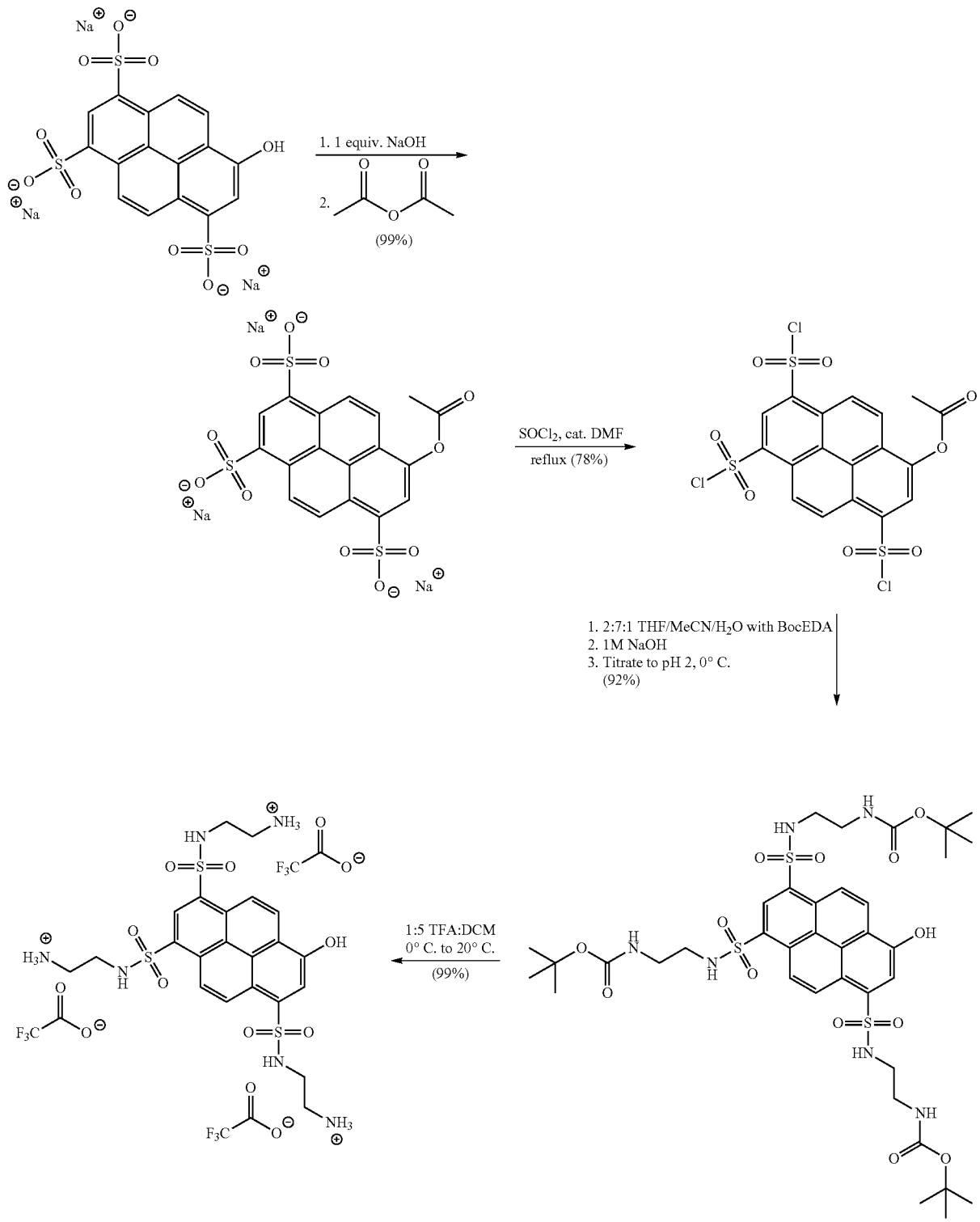

In some embodiments, the photoacid dye molecule may comprise an 8-Aminopyrene-1,3,6-trisulfonic acid trisodium. A non-limiting reaction scheme of synthesizing said photoacid may be according to Scheme 2:

Scheme 2:

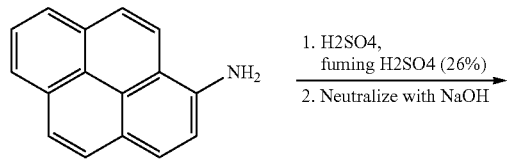

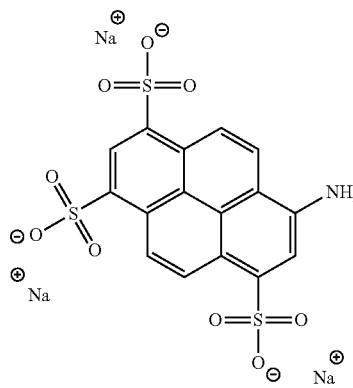

In other embodiments, the photoactive dye may be a strong photoacid comprising a "Donor-pi-Acceptor" structure or the plurality of any of these groups. Non-limiting example of acceptors include the following:

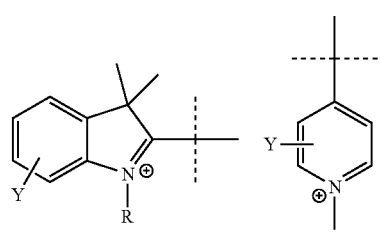

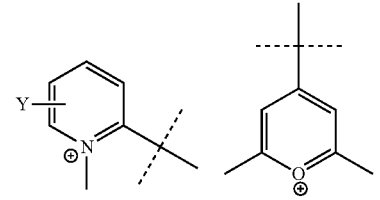

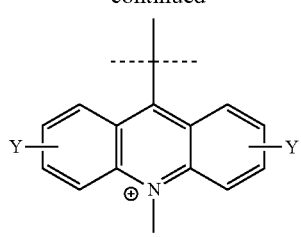

where

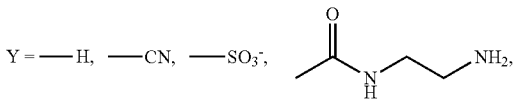

$Y = $ —H, —CN, —SO$_3^-$,

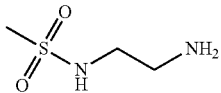

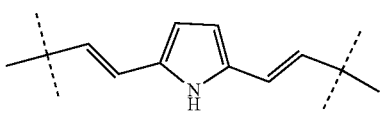

Examples of donors include, but are not limited to, the following:

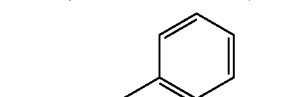

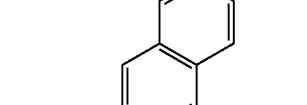

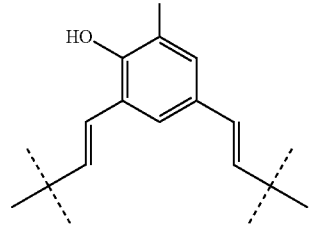

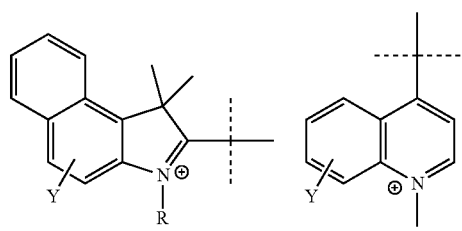

where
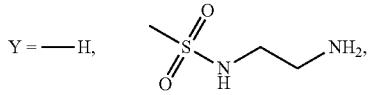
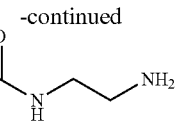
In one embodiment, an acceptor-donor-acceptor photoacid with a phenol donor core may be synthesized according to Scheme 3.
Scheme 3:
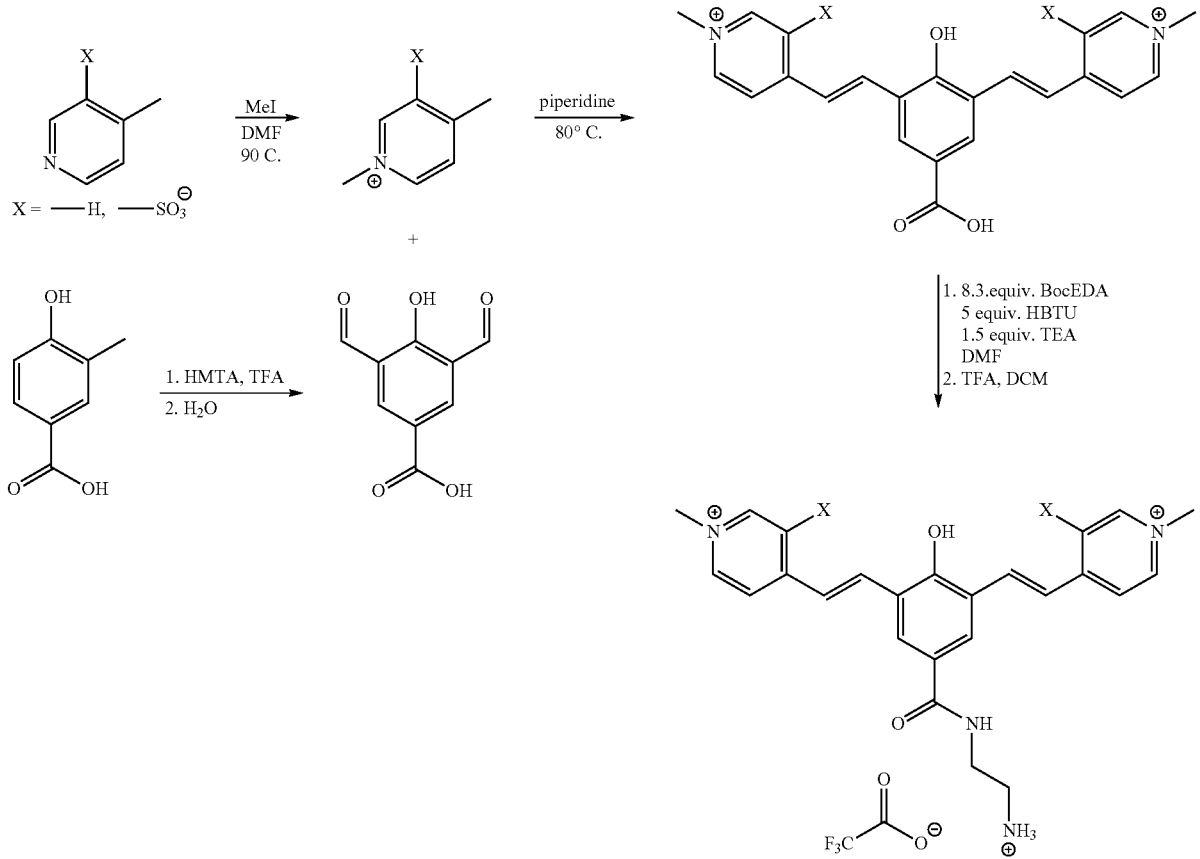
In another embodiment, an acceptor-donor-acceptor photoacid with a pyrrole donor core may be synthesized according to Scheme 4.
Scheme 4:
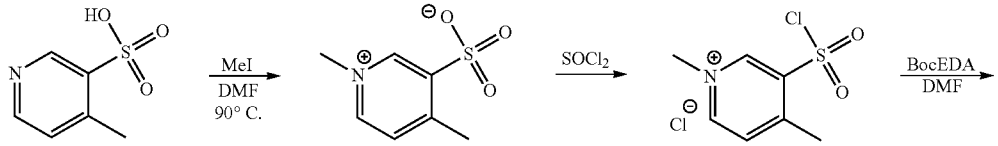

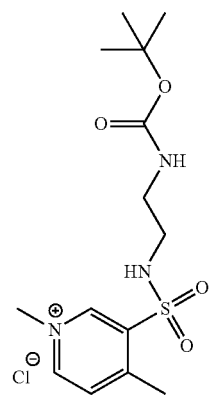
+
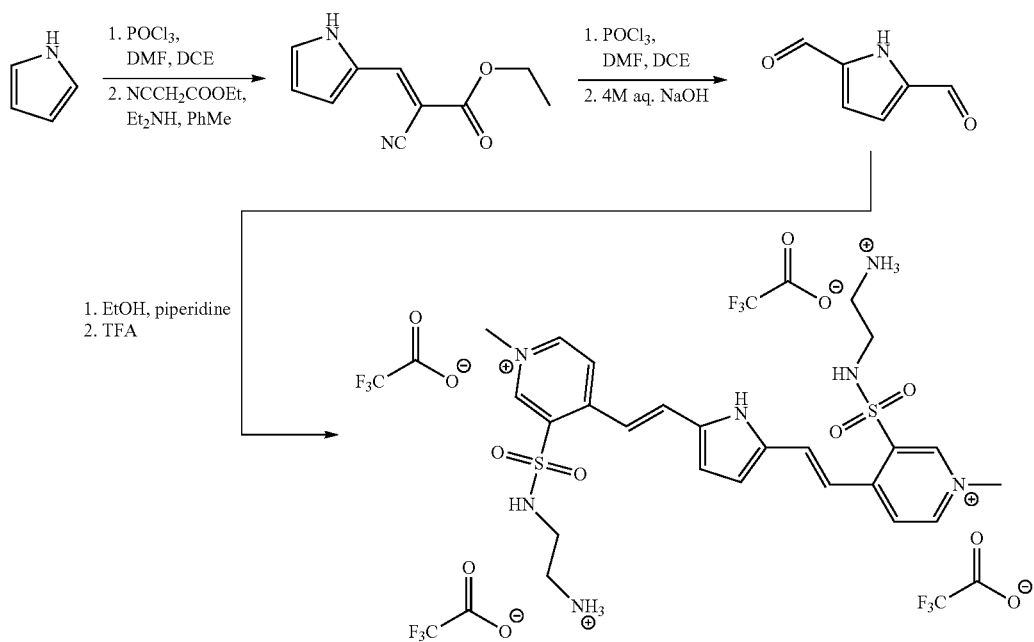
In other embodiments, the photoacid dye molecule may have a long half-life in the photodissociated state. A non-limiting reaction scheme of synthesizing said photoacid may be according to Scheme 5:

Scheme 5:
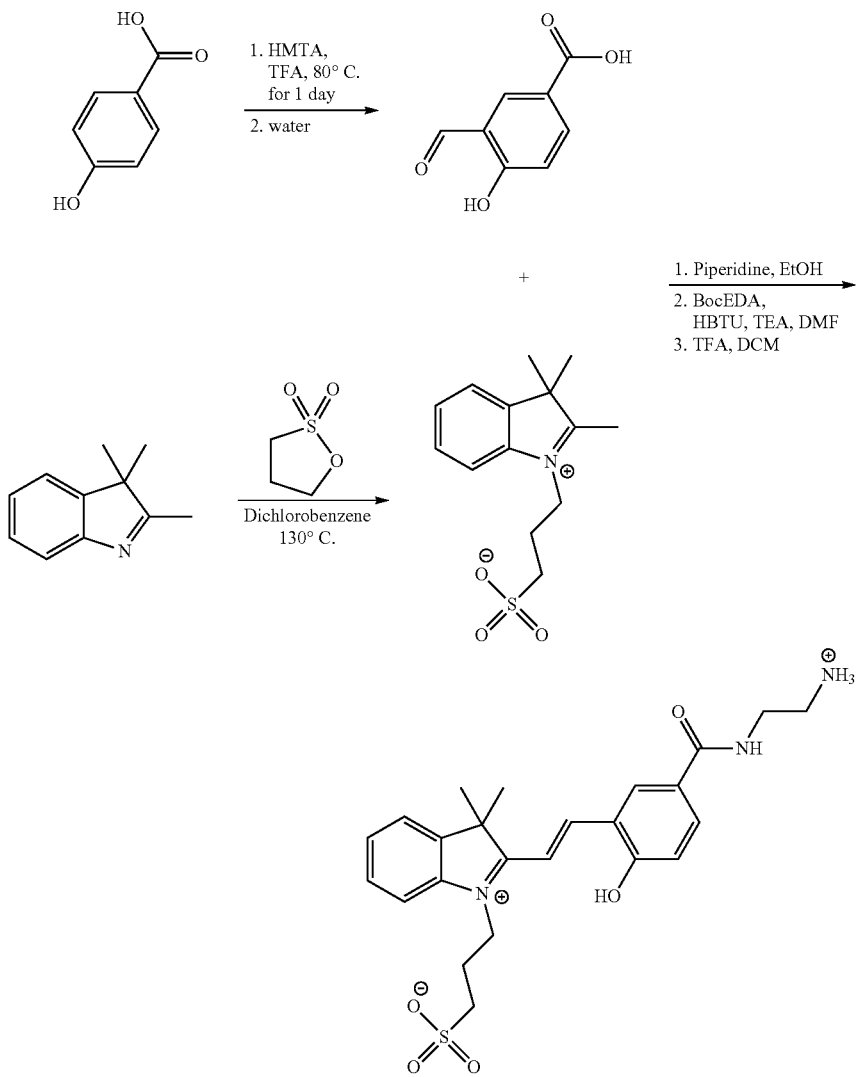
In further embodiments, the photoacid may be according to any of the following structures:
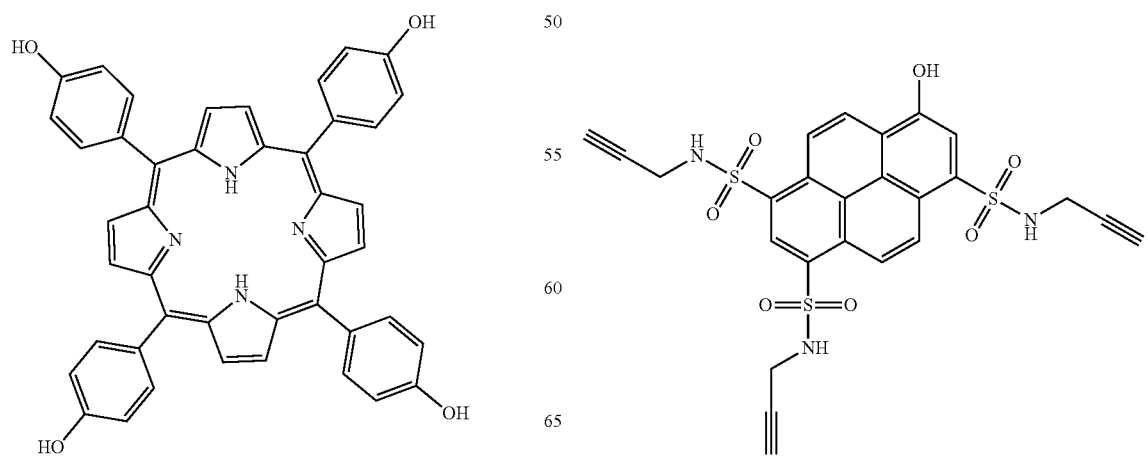
-continued 25
-continued
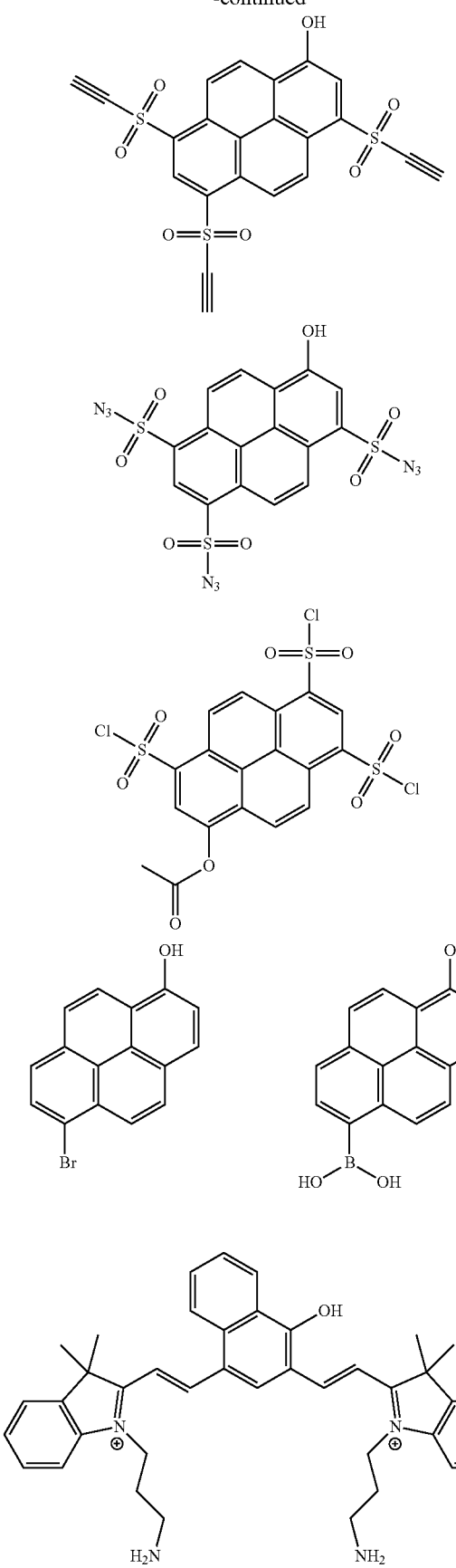
26
-continued
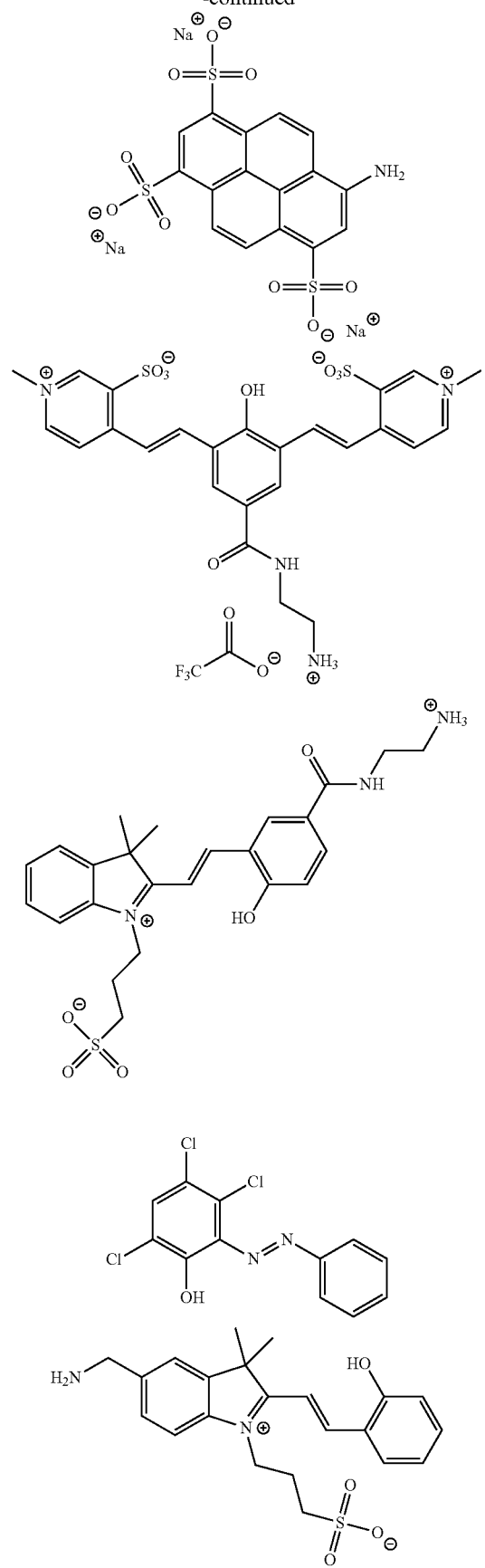

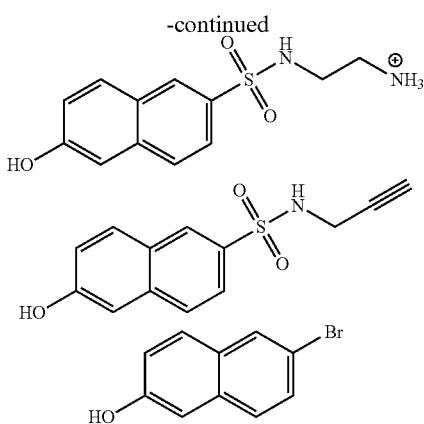

In alternative embodiments the photoacid may comprise compounds such as quantum dots. A non-limiting example of a quantum dot photoacid is as follows:

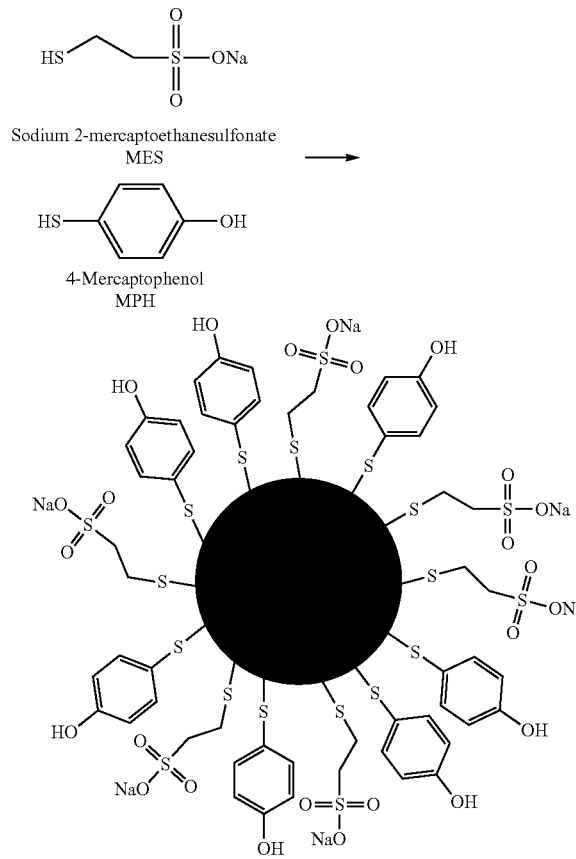

In other alternative embodiments, the photoacid may comprise compounds such as inorganic coordination compounds. Without wishing to be bound by a particular theory or mechanism, the use of inorganic compounds as a photoacid, and alternatively as a photobase, is enabled by a photoreaction where the inorganic compound absorbs light, an electron moves from or to a metal of the inorganic compound and to or from a ligand of the inorganic compound. The end location of the electron will most likely be a more basic site and the initial location of the electron will most likely be a more acidic site. For instance, phenanthroline can have an $NH_2$ group that receives an electron where $-NH_2 + H^+ \rightarrow -NH_3^+$. Other examples of common acceptor ligands include bpy or bq, which also have a series of energies. In some embodiments, the electron can often originate on the metal and thus, the functional group that loses a proton should be bound to the metal. In other embodiments, if a coordination compound is insoluble in water, then said compound can be made water soluble by adding an $-SO_3$ group, or the compound can be bound to a polymer and immersed in water as an insoluble film.

In some embodiments, the photoacidic inorganic compounds may be according to the following:

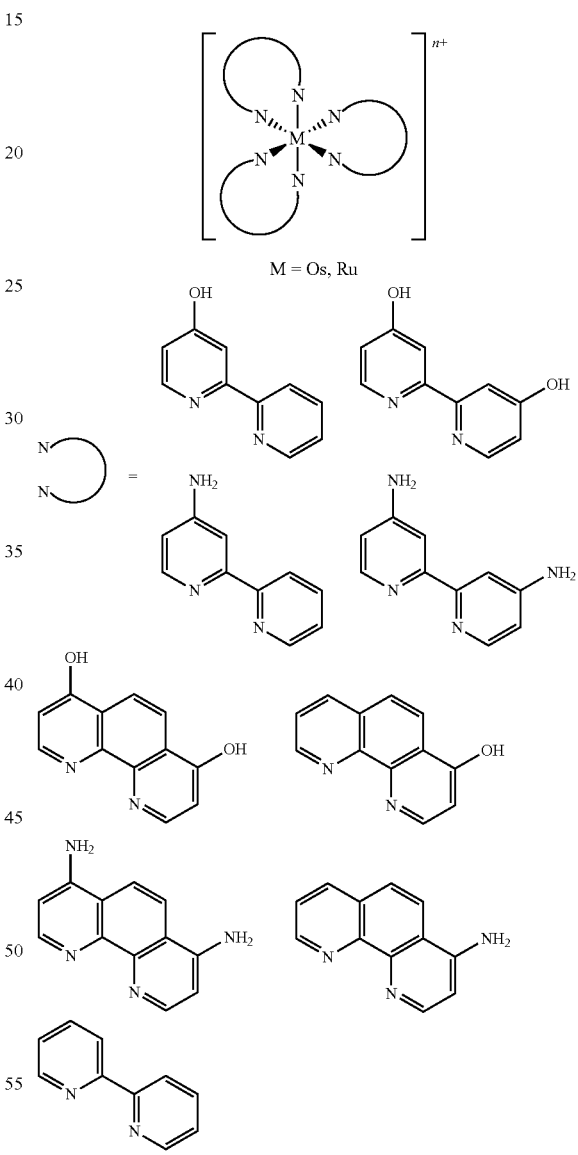

In other embodiments, the photoacidic inorganic compounds may comprise a hydride bound to a metal, such as Ir or Ru. The photoacidic inorganic compounds may compose a ligand that can donate electron density to the metal so that photoexcitation results in more oxidation of the ligand than the metal. In one embodiment, the inorganic compounds having ligands that can donate electron density may be according to the following:

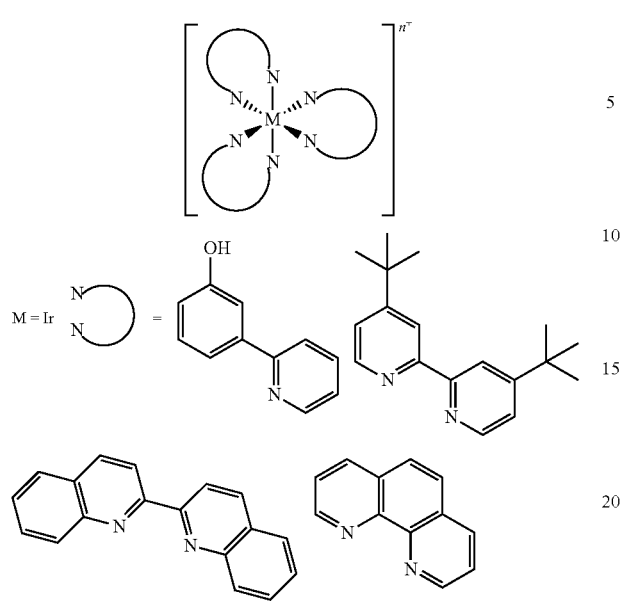
Non-limiting examples of photoacidic inorganic compounds include the following:
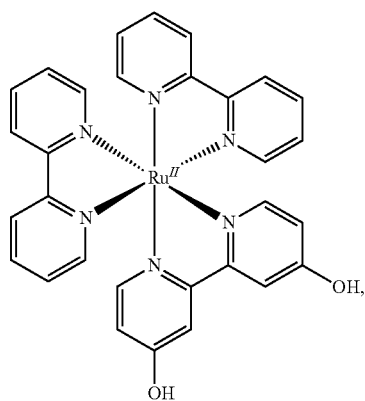
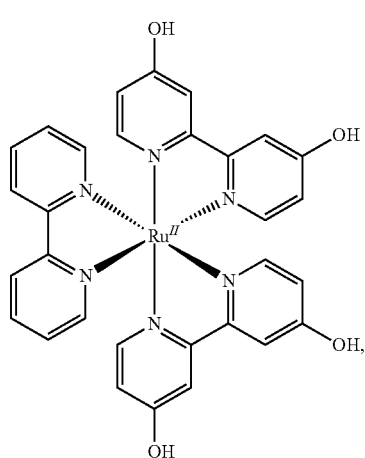
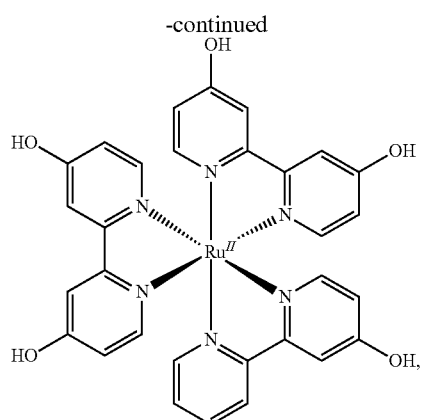
[Ir(ppyOH)₂phen
[Ir(ppyOH)₂bq
According to further embodiments, the photoacidic inorganic compounds may comprise a metal complex having a metal group, such as Pt, Pd, and Ni, and a dithiol (S-containing) ligand modified with a protonated group, such as —OH or —NH$_3^+$. Non-limiting examples of metal complexes that may be modified with a protonated group (not shown) include the following:

1

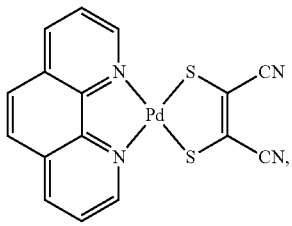

Pd(phen)(mnt)

2

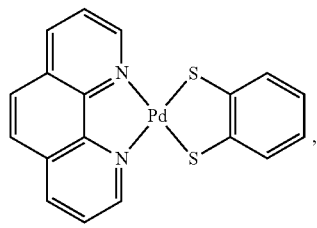

Pd(phen)(bdt)

3

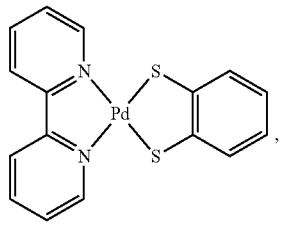

Pd(bpy)(bdt)

4

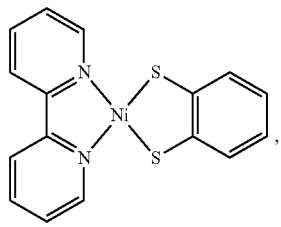

Ni(bpy)(bdt)

5

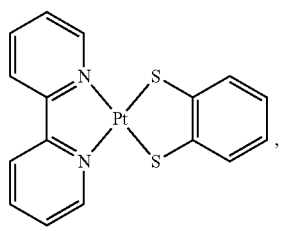

Pt(bpy)(bdt)

6

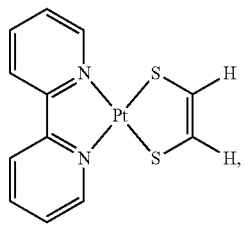

Pt(bpy)(edt)

7

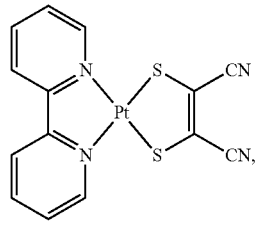

Pt(bpy)(mnt)

In an exemplary embodiment, the inorganic metal complex may be synthesized to be water soluble and exhibit full charge transfer after photoexcitation, resulting in formal oxidation and reduction of two ligands, as shown in Scheme 6.

Scheme 6: Synthesis of water soluble Re-tyrosine complex.

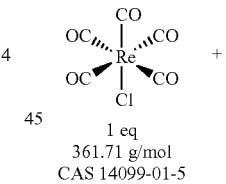

1 eq
361.71 g/mol
CAS 14099-01-5

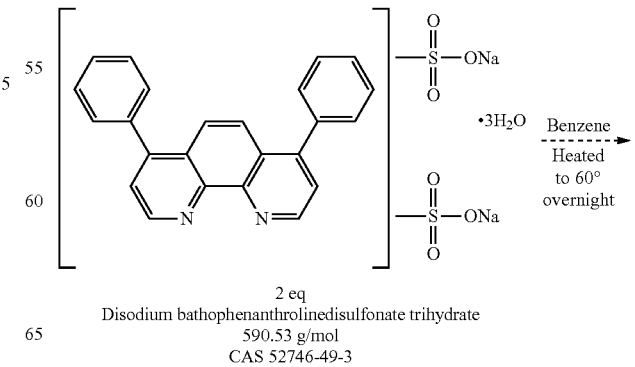

2 eq
Disodium bathophenanthrolinedisulfonate trihydrate
590.53 g/mol
CAS 52746-49-3

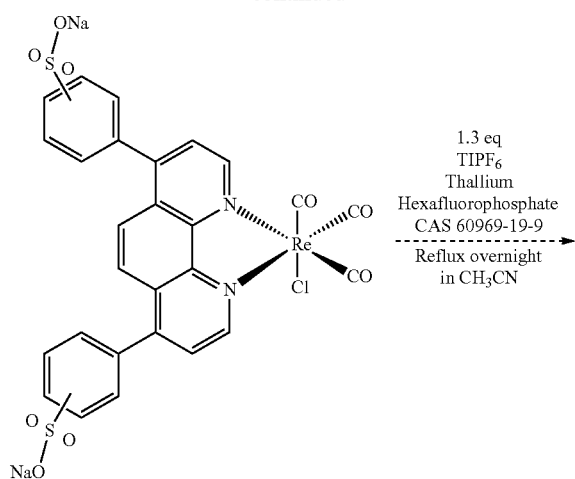
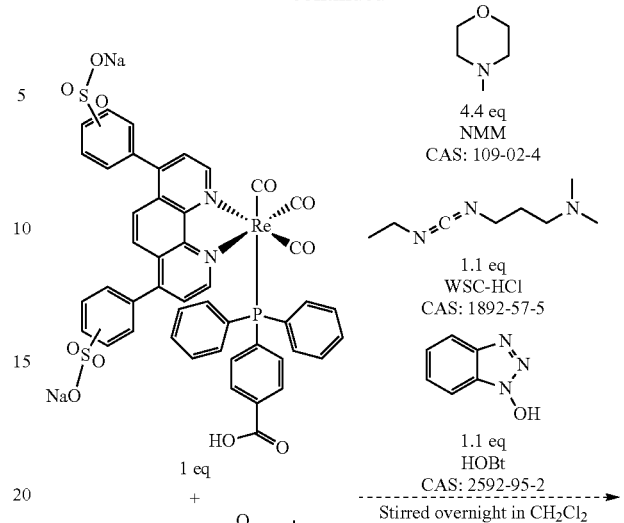
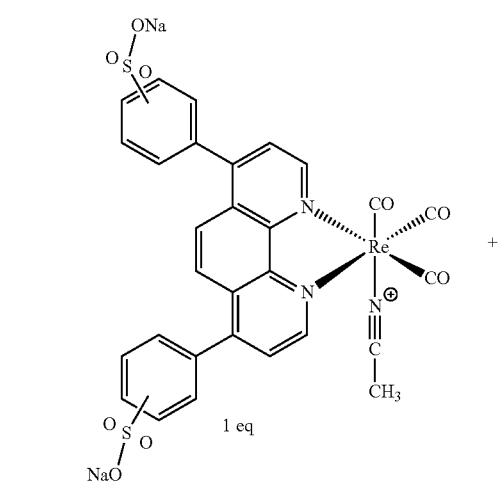
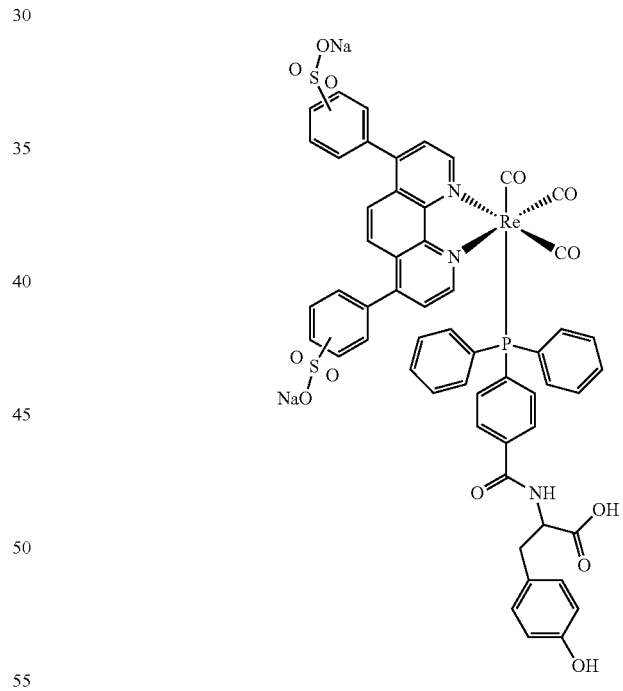
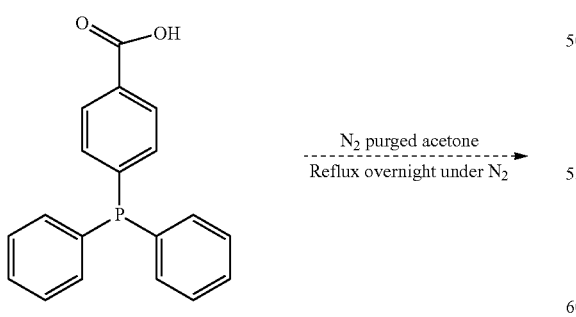

PHOTOBASES

According to some embodiments, the photoactive dye may be a photobase, which can covalently bind to the membranes described herein. Upon light absorption, the photobase can generate an $OH^-$, instead of $H^+$ as in the case of photoacids, and net form an $H^+$ during the regeneration process, as opposed to $OH^-$ for the photoacids. Examples of photobases include, but are not limited to, the following acridine-core photobases:

35
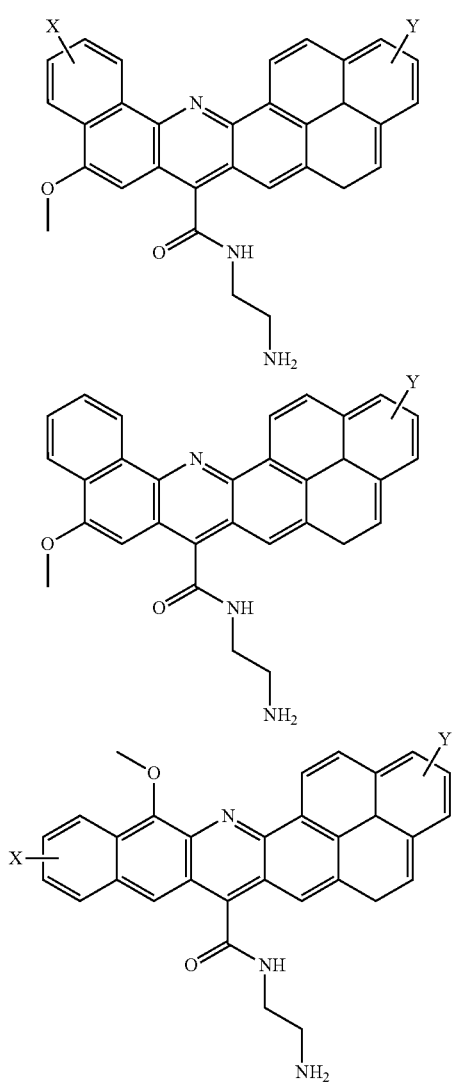
36
-continued
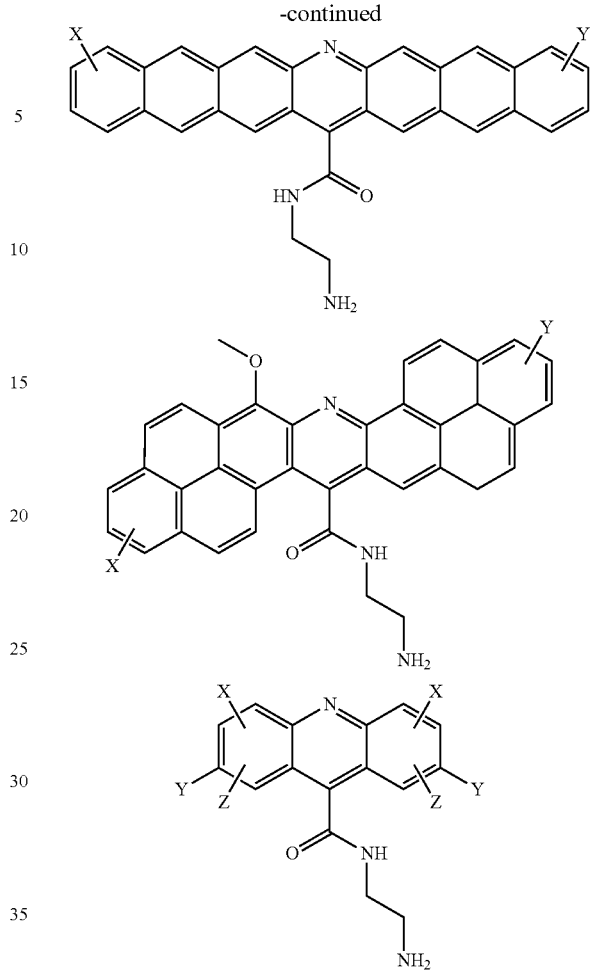
X, Y = —H, —CH₃, —OCH₃
In one embodiment, an acridine-core photobase may be synthesized according to the reaction shown in Scheme 7.
Scheme 7:
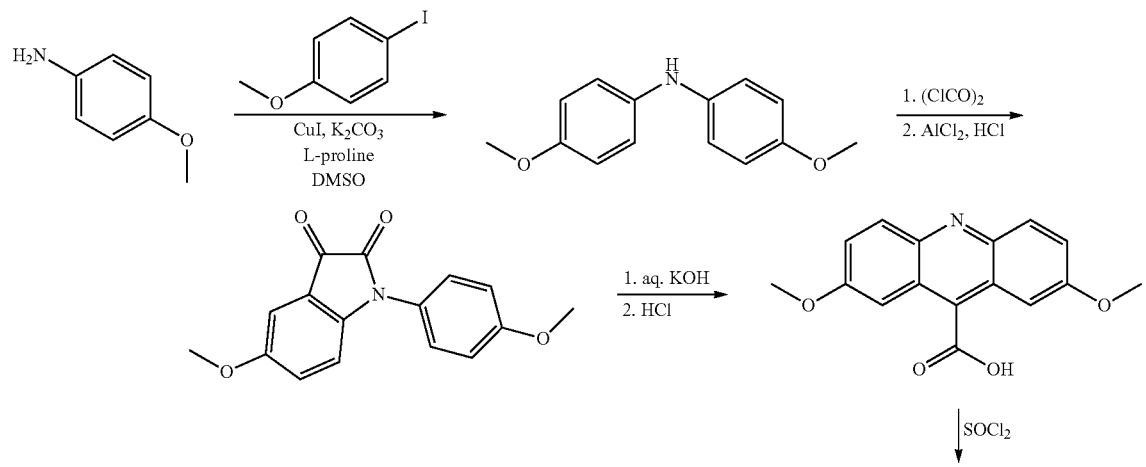

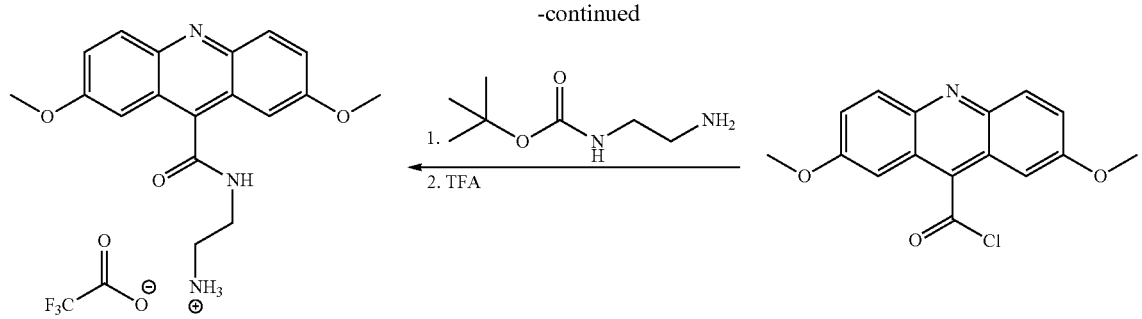

In alternative embodiments, the photobase may comprise a photobasic metal complex. In one embodiment, the photobasic metal complex may have the following structure:

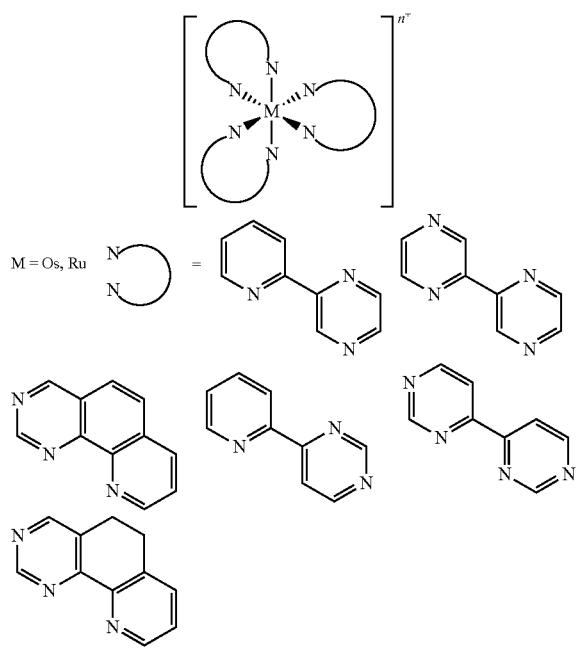

Finite-element device physics models were created and simulations performed on ideal light-driven ion pumps infiltrated with water whose properties were modeled as being the same as bulk water. Under solar-simulated conditions, the models show that the membranes can generate a photovoltage of −0.35 V. This may be a lower bound to the true maximum theoretical efficiency given that bulk water properties change in polymers. Irrespective, because of the energy requirements, the implementation of the three-compartment architecture for generation of acid, base, and desalinated water will require a more complex tandem light-absorbing membrane architecture in order to obtain the required voltage to drive the cell. This can be achieved using a membrane or architecture that has additional layers in a so-called tandem structure. That is, given photoactive one-layer, two-layer, three-layer or n-layer (where n is an integer) ion pumps, several of these can be stacked optically in series. As long as some light transmits to the bottom materials and there is a low-resistance contact between each photoactive material, each will generate a photocurrent. The overall observed photocurrent will be limited in the serial stack by the ion pump with the smallest photocurrent, but the photovoltage will be the sum of the photovoltages from each photoactive material. This architecture can generate larger voltages than a single unit and will allow a device architecture with acid, base, and desalinated water to operate. In fact, this architecture will be useful in general, which is described in greater detail below.

Using a single light-driven ion-pumping membrane that is not a tandem structure, there are two potential ways to overcome the voltage mismatch between the required voltage and the maximum attainable photovoltage in some embodiments, one option is to use a two-compartment cell (FIG. 1A or 1B) and a sodium-pumping and/or chloride-pumping membrane that does not generate acid or base and therefore only requires a minimum of ~0.1 V to desalinate brackish water and ~0.2 V to desalinate sea water, each to potable water. This voltage requirement is well within the theoretical photovoltage range of light-driven ion-pumping membranes. As such, an electrochemical cell and device that could mimic the best theoretical ion-pumping membrane were used to experimentally determine the feasibility of the present invention. In other embodiments, another option to overcome the voltage mismatch is to use a four-compartment cell (FIGS. 3A and 3B) where a gradient in alkaline proton concentration generates an asymmetry in the materials that is not as extreme as the case shown in FIG. 2A.

In some embodiments, the two-compartment cell is advantageous because it is simple, will have fewer resistive losses, and has no energetic penalty to overcome acid or base gradients. In some embodiments, the four-compartment cell is advantageous because it can use a light-driven proton pumping membrane, where light drives proton transport. The membrane required to operate with no acid/base gradient is already possible. As shown in FIG. 6C, most two-layer and some three-layer bipolar membranes exhibit efficient and ohmic ionic conduction irrespective of the direction of polarization bias, and some two-layer and most three-layer bipolar membranes rectify current like diodes and make effective light-driven ion pumps. By affixing these two membranes together, one has a single membrane that presents the same type of membrane on each side (i.e. cation-exchange or anion-exchange). As such, this stack can be immersed in a single pH condition and exhibit photovoltaic action as a light-driven ion pump that is very well suited for the arrangement shown in FIGS. 3A and 3B. Irrespective, while the four-compartment cell has advantages over the three-compartment cell, it still has some limitations to producing acid/base. The production of acid/base can be circumvented through use of a direct light-driven sodium or chloride pump. Chloride pumping proteins exist in nature, which suggests that it is possible to fabricate an artificial structure with this same function but using chloride analogs of photoacidic molecules. Analogous to photoacids, one way to accomplish this is to use light to alter the equilibrium binding constant of a Cl⁻ ion, or other anion/cation, to the dye molecules.

Two electrodes that perform Faradaic electron-transfer reactions t their interfaces at ~0 V overpotential on two faces of an insulating sheet of plastic are equivalent to an ion pumping membrane that does not drive any Faradaic chemistry. As such, the reversible hydrogen electrode ($2H^+ + 2e^- \rightarrow H_2$) was selected for the Faradaic reactions, as this reaction is catalytically facile at platinum and therefore swill exhibit small electrocatalytic overpotentials at low photon-flux-relevant current densities. This arrangement is presented in FIG. 7A for the two-compartment cell and FIG. 7B for the four-compartment cell.

In FIG. 7A, the electrode on the left removes protons from solution via $H_2$ evolution, and the electrode on the right adds protons to solution via $H_2$ oxidation. The net chemistry is equivalent to a membrane that pumps protons across it. This net change in charge distribution tomes a chloride through the anion-exchange membrane (AEM), deionizing the left chamber. NaCl was selected to replace HCl because the $H_2$ chemistry only changes local $H^+$ concentration and thus HCl is necessary to most accurately mimic the ion pumping behavior. Another embodiment could use an AG/AgCl electrode or an $Na^+$ intercalation material as a surrogate for generating and removing $Cl^-$ and $Na^+$, respectively. Use of $H^+$ instead of $Na^+$ makes the electrolyte substantially more conductive. In order to account for this difference in calculations, a correction factor was introduced that was based on the aqueous ionic conductivities of $H^+$ and $Na^+$ and the aqueous cation transference numbers of HCl and NaCl. Based on these numbers, in order to accurately predict how a sodium pumping membrane would behave in the presence of aqueous NaCl, instead of aqueous HCl, the current must be divided by 3.28. In order to minimize resistive losses in the electrolyte, a cell that was as small as was reasonable to make was fabricated. This allows the fastest desalination rate per unit volume of fresh water produced. For versatility, maximum efficiency, and with maximal surface area of light-powered membrane exposed, a device with small tubes that are easily fabricated (e.g. by electrospinning, by extrusion) were made using 3D printing or other methods.

EXAMPLES

The following are non-limiting examples of the present invention. It is to be understood that said example is not intended to limit the present invention in any way. Equivalents or substitutes are within the scope of the present invention.

Example 1: Two-Compartment System

Representative embodiments of two-compartment arrangements are shown in FIGS. 1A-1D. The embodiments in FIGS. 1C and 1D can be manufactured as two nested tubes. The two-compartment arrangements have the lowest energy requirements and thus the smallest voltage losses. In fact, only ion transport current losses and desalination energy requirements would be present. There is no loss for performing additional reactions as no other reactions occur. This requires a light-driven pump of directly $Cl^+$ or $Na^+$ or other ions that are present in high concentrations, and not H+/OH— which in water are present in low concentrations. This basic reactivity via a dye (example of structure shown below) that changes its binding affinity for $Cl^-$.

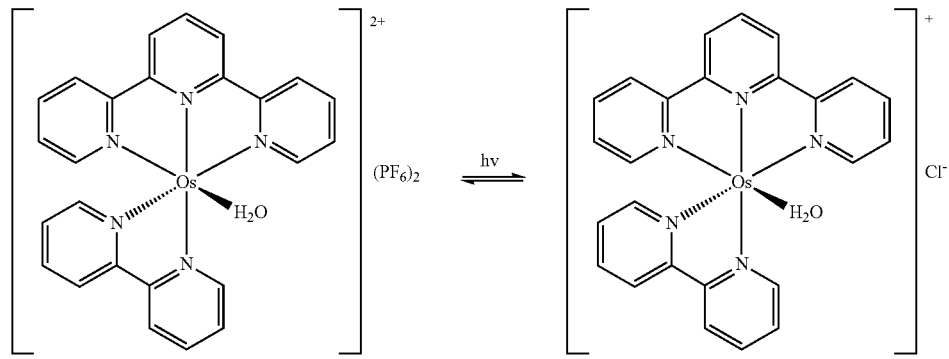

Figure 1D:
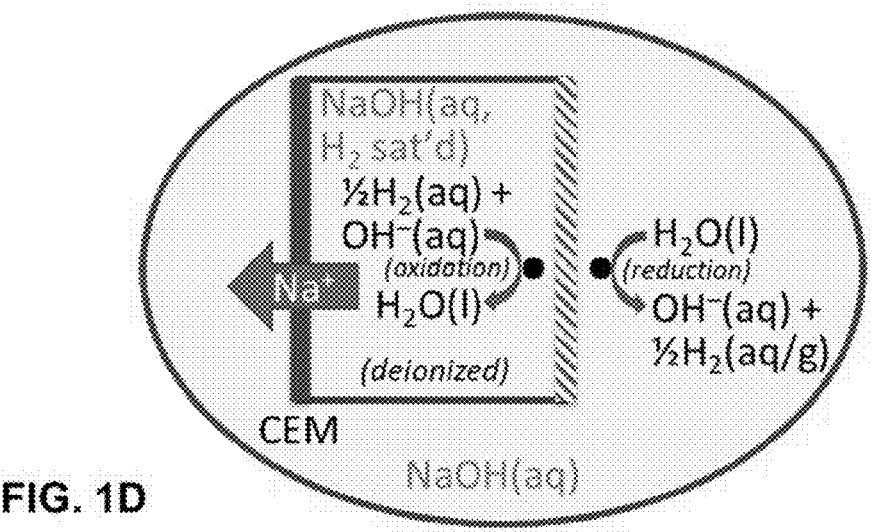

FIGS. 1A and 1B show how direct light-driven ion pumps of $Cl^-$ (FIG. 1A) or $Na^+$ (FIG. 1B) are able to drive oppositely charged ions with minimum energy requirement and no need for starting with, making, wasting energy for, or dangers associated with acid and/or base. Additional embodiments of the present invention may include other dyes that will bind/release ions other than $H^+$ after absorbing light. FIGS. 1C and 1D are designs only for measurement purposes of the processes during desalination as they generate/consume $H^+$ or $OH^-$ and thus require that the solution has those species in it, and not NaCl. In this sense, they do not perform desalination but rather analogous deionization as a completely reasonable model reaction for ultimate desalination with a light-driven ion pump. Electrochemical reactions cannot as easily generate/consume $Na^+/Cl^-$ in the present model cells to (tiredly mimic the light-driven ion pump concept. The reduction and oxidation reactions are in this case shown to switch locations between designs to demonstrate how in both cases deionization of the inner compartment can result.

Example 2: Three-Compartment System

Figure 2A:
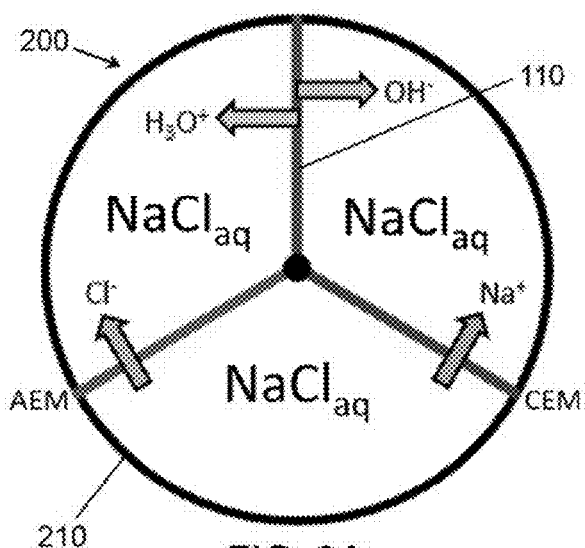
Figure 2B:
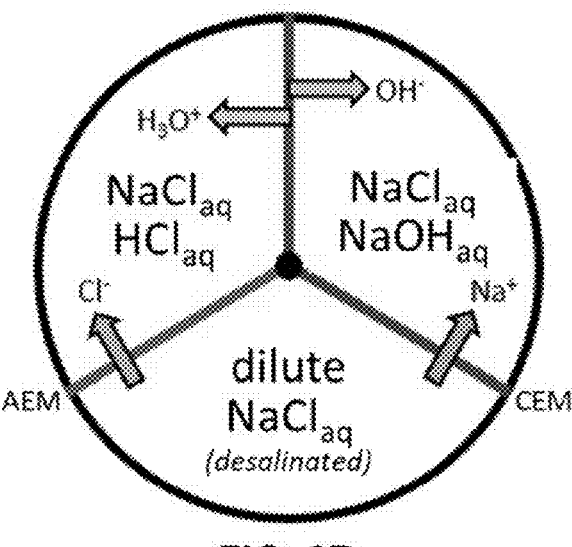
Figure 2C:
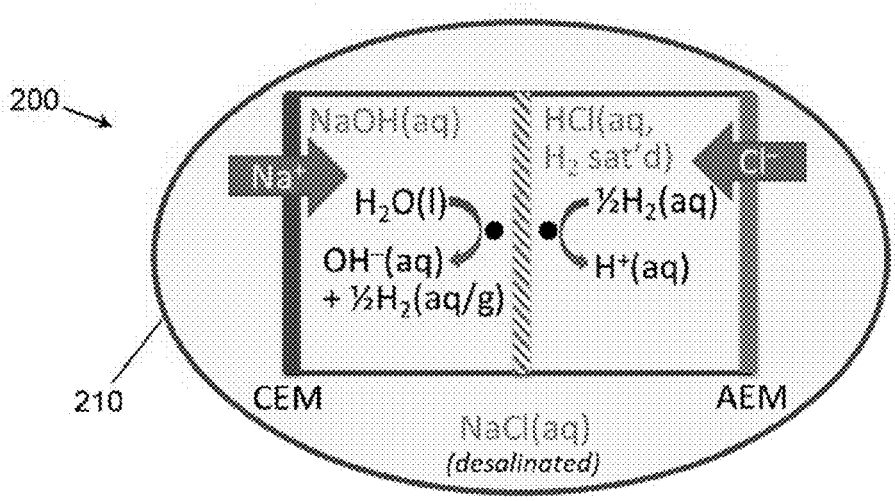
Figure 2D:
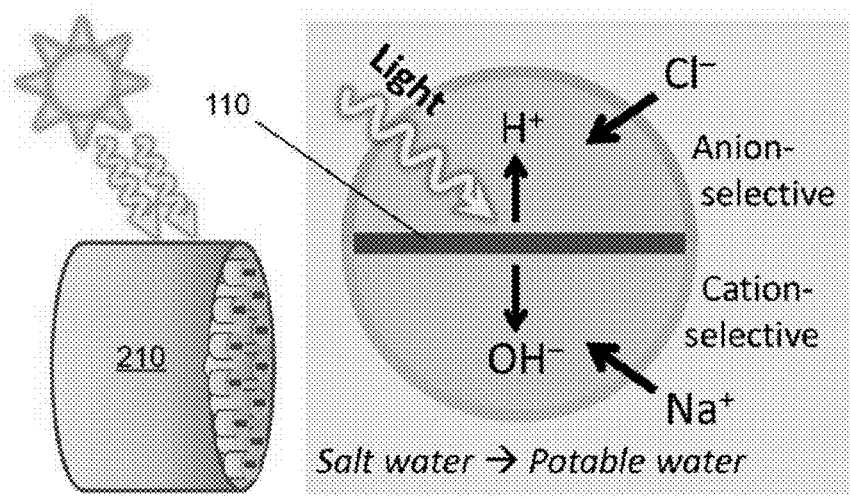

FIGS. 2A-2D show representative three-compartment arrangements. For the first ions desalinated, there is ever-so-slightly greater than zero voltage required because all of the NaCl chambers have the same concentration (FIG. 2A, initial state before desalination). Ideally after desalination (FIG. 2B), the product HCl and NaOH should be as dilute as possible. For example, at 1 M HCl and NaOH there is a 0.83 V potential requirement on top of that required for desalination which is ~0.1 V to take brackish water to potable water and ~0.2 V to take sea water to potable water; this acid/base value decreases by 0.12 V per order of magnitude decrease in HCl and NaOH concentration; thus, at 0.1 M HCl and NaOH, it requires 0.71 V on top of that required for desalination. All of these values and those in all of the calculations are based on room temperature (25° C.) operation where RT/F=0.059 V. The projected area of each compartment (volume in 3D) can be adjusted to result in less concentrated acid and/or base; however, larger compartments may have more losses due to ion transport and a smaller salt compartment means that it has to be changed/flowed more often to bring in new water to be desalinated. Notwithstanding, if NaCl starts at 0.1 M (brackish water) but the salt compartment is ten times smaller than each of the acid and base compartments, then once the salt compartment reaches 0.01 M NaCl (potable water), by removing 0.09 M NaCl, the acid and base compartments will only be 0.009 M NaOH and 0.009 M HCl due to the volumetric dilution. This would mean there is a 0.59 V voltage loss to pump the final ions into that acid and base, but recall that the voltage loss is zero for the first ions passed. Also, the voltage to desalinate the final ions is 0.12 V due to the single order-of-magnitude gradient in salt at the end. Thus, the voltage loss ranges from 0 to 0.71 V (0.59 V+0.12 V) during desalination of the 0.1 M NaCl to 0.01 M NaCl with making salty acid and salty base side products.

FIG. 2C is another embodiment of the three-compartment arrangement. This design uses nested tubes and can be more amenable to manufacturing and production than the design that trifurcates the inside of a small tube (as shown in FIGS. 2A-2B).

In some embodiments, cylinders or chambers may be flowed, the acid and base compartments could be flowed faster than the salt compartment(s) to minimize buildup of acid and base and minimize wasted voltage. In other embodiments, a photovoltage is generated with the light-driven ion pump when there is no acid/base gradient across the membrane; the initial state requires no acid base gradient. In other embodiments, the designs may have different area membranes such that if the dye-sensitized IX membrane is small then when a light-driven ion pump is used its current will be smaller than if it were the same size as the CEM and AEM. This means that smaller current (i) is passed through the CEM and AEM and electrolytes, which means that less voltage is wasted due to ion transport following Ohm's Law (V=iR). As the resistance (R) is dictated by the properties of the materials and solutions, only current is varied by the light-driven ion pump and so a smaller current means that the ohmic ionic voltage loss (V) is small. Smaller voltage losses indicate that the device will more effectively utilize the energy in light to drive desalination.

Example 3: Four-Compartment System

Representative images of two four-compartment arrangements operating with base (FIG. 3A) and acid (FIG. 3B), this design may be advantageous over the three-compartment arrangement because when one starts with more concentrated base in the top two compartments and at the same concentration so that moving the first ions incurs no voltage loss due to the add and base present, as was the case for the three-compartment arrangements (FIG. 2A), then when base is generated and lost during operation the initial concentration will not change much from the condition of the same amount of base and thus little voltage loss will be incurred due to gain or loss of base. As shown, during measurements all reduction reactions are in the top, left compartments and oxidation reactions in the top, right compartments and that is why the desalinated compartment switches places in the two designs. This arrangement can easily be flipped in measurements and in practice by switching the directional arrangement of the light-driven $H^+/OH^-$ pumping membrane. This embodiment also requires a light-driven $H^+/OH^-$ pump that operates with no acid/base gradient.

For example, assume all four compartments have the same projected area, even though this design can also benefit from having smaller salt compartments than the acid or base compartments. Then with 1 M NaOH in the top two compartments and 0.1 M NaCl (brackish water) in the bottom two compartments, initially there is no voltage loss to overcome in order to drive net desalination because the ion transport process reactions between the basic compartments have no initial concentration difference and drive the opposite reactions of gain of NaOH and loss of NaOH (left to right), and the ion transport process reactions between the salt compartments have no initial concentration difference and drive the opposite reactions of loss of NaCl and gain of NaCl (left to right). Once this design is desalinated to brackish water, the compartments would have 1.09 M NaOH (top, left), 0.91 M NaOH (top, right), 0.01 M NaCl (bottom, left), and 0.19 M NaCl (bottom, right). At that point, the voltage loss to drive one more series of ions through this circuit as ionic current would be 0.0046 V for the base/base transport process reactions (as RT/F log (1.09/0.91)) and 0.076 V for the salt/salt desalination transport process reactions (as RT/F log (0.19/0.01)). This means that the total voltage loss including desalination would equal 0.080 V at the end, which is small compared to (I) voltages required to generate 1 M acid and 1 M base in the three-compartment design, (ii) the 1.23 V required in an electrodialysis cell that drives water electrolysis, and (iii) most of the ionic ohmic ionic voltage losses at modest currents, and this 0.080 V total voltage loss is below the reasonable maximum photovoltages predicted from a light-driven ion pump of ~0.35 V.

While this design and the small voltage loss means that a light-driven $H^+/OH^-$ pump could be practical, a challenge with this design is that aqueous base needs to be supplied initially and replenished. However, since each base compartment becomes equally more basic and less basic over time, if the contents of the compartments are ultimately mixed they would revert back to their initial basic condition, assuming there was no parasitic base leakage elsewhere. This means that the initial base can be reused. One way to slow parasitic leakage of base is, for example, if the base compartments start at 0.1 M NaOH, which will be less leaky than if they started at 1 M NaOH as predicted by Donnan Exclusion Theory. In this case the initial voltage loss would be 0 V and the final loss once 0.1 M NaCl is desalinated to 0.01 M NaCl in the bottom, left compartment would be 0.15 V (as 0.076 V+0.076 V, for making each of NaOH and NaCl in the concentrated sides and losing each from the dilute sides), which is still a small voltage requirement.

Example 5: Experimental

Materials: Neasepta® anion-exchange membrane (Neosepta AHA), Sustainion anion-exchange membrane (Sustainion X37), Nafion NR212 (Ion Power), Pt wire, Pt mesh, Pt foil, lead acetate, chloroplatinic acid, poly(acrylonitrile-co-butadiene-co-styrene) (ABS), Parafilm, aqueous HCl, NaOH, MilliQ water, HM Digital electrical conductivity monitor model DM-2EC.

Fabrication of a two-compartment cell: The smaller compartment of this electrochemical cell was produced by 3D printing ABS plastic into a rectangular tube with a 2 mm×2 mm inner compartment that was 6 cm long. The walls of this compartment were 2 mm thick. An ABS cover was printed that matched the size of the front face of the tube. A Neosepta AHA membrane was attached to the tube by taping the top of the tube to the membrane. Next, the ABS cover was taped over the bottom of the tube, enclosing the membrane. Acetone was applied to the edges of the cover where they contacted the tube. The ABS dissolved and re-solidified around the membrane, creating an effective seal. The seal was confirmed by injecting excess electrolyte into the top of the tube. Electrolyte only entered or exited through the top of the tube, indicating that there were no holes where water can leak through via simply flowing. Since no pressure was applied to this cell, leaks from pressurization were not expected. It is important to apply the acetone such that the edge of application is angled downward. Otherwise, ABS will dissolve on the front face of the membrane and make the Neosepta AHA insulating. After the acetone dried, the top of the cell was cut, and the bottom section of tape was removed, leaving a tube with a Neosepta AHA face. The larger compartment was 3D printed from ABS and made large enough to house the smaller compartment.

Fabrication of a two-compartment cell with pumps: A multi-compartment device was fabricated as shown in FIG. 13A. The 2 outer plates were 3D printed in VeroClear plastic using an Objet Polyjet 3D printer. Sealing was provided with 4 Viton gaskets laser cut with the designs shown in the figure. Gasket 1 allowed the flow of acid and base through inlet and outlet holes, while providing contact of water with the respective membrane (CEM=Cation-Exchange Membrane, or AEM=Anion-Exchange Membrane). Gasket 2 allowed the flow of base and acid, while providing contact with the middle photoactive membrane that generates current. The device is designed to pump acid/base into the device using peristaltic tubing, while it is immersed in the desalinating water.

Fabrication of a four-compartment cell: The four-compartment cell was produced by 3D printing ABS into four separate quarter circle compartments that were held together with a worm clamp. Two Nation membranes were sandwiched individually between two sheets of Parafilm. A hole was punched in the Parafilm to expose the Nafion to the electrolyte in the contacting cell compartments. The Parafilm was used to improve the seal between Nation and the walls of the compartment. These membranes were placed in contact with the compartments containing electrodes. A Neosepta AHA membrane was sandwiched between Parafilm in a similar way and placed between the compartments that did not contain electrodes.

Platinum black electrode fabrication: Platinum wire, mesh, and foil electrodes were prepared by soldering the desired piece of platinum to a steel wire, enclosing the soldered section in a glass tube, and epoxying over the tube to seal the soldered section away from electrolyte. Platinization was performed via two-electrode chronoamperometry where a potential between −1 V and −4 V was applied to the platinum working electrode versus a platinum mesh counter electrode for 1 to 10 minutes.

Two-compartment cell cyclic voltammogram (CV): In a typical measurement, the 2 mm×2 mm tube was loaded with aqueous 50 mM, 30 mM, or 10 mM HCl via injection with a needle and syringe. About 1.5 cm of electrolyte was removed from the cell, leaving about 2.5 cm of electrolyte wetting the Neosepta AHA membrane. The cell was attached to a Pt black mesh electrode by wrapping the electrode around the top of the tube with Parafilm. The Pt was near the center of the wetted region of the membrane on the opposite side of the cell. A Pt black wire electrode was placed down the tube and served as the working electrode. The platinum mesh served as the counter electrode. This tube was hung through a Teflon lid into another compartment filled with aqueous 50 mM HCl. The lid had a hole in it that was larger than the tube and electrode but smaller than the Parafilm ring at the top of the tube. Thus, the device hung by the Parafilm into the larger compartment. A plastic tube attached to a hydrogen gas tank was fed to the bottom of the outer compartment and bubbled hydrogen into the cell. The water lines of the outer and inner compartments were approximately the same. CV scans were taken with a Biologic potentiostat, typically sweeping from +0.01 V to −0.4 V at 5 mV/s.

Two-compartment cell CV using the device with mechanical pumps: In a typical measurement, the device was put into a two-compartment arrangement. The setup allowed electrolyte to be flowed into a small chamber between Neosepta AHA and a Pt black foil working electrode. A Pt black foil counter electrode was placed on the opposite side of a Viton sheet from the working electrode and exposed to the outer chamber. CV measurements were taken exactly as those in the two-compartment tube.

Two-compartment cell CA: In a typical measurement, the device and container were setup in an idential way to the two-compartment tube CV with aqueous 50 mM HCl in the inner compartment, Potentiostatic chronoamperometry was performed at −0.35 V until the system passed −0.36 mA of current. This current value was chosen because it corresponded to the current that the device passed at −0.35 V when aqueous 10 mM HCl was loaded into the cell. After this current was reached, CV measurements were taken with the parameters typical of a two-compartment CV.

Four-compartment cell CA: In a typical measurement, aqueous 50 mM NaCl and aqueous 50 mM NaOH were loaded into the compartments labeled with these electrolytes in FIGS. 3A and 3B. Platinum black mesh electrodes were placed into the compartments containing basic solution and 5 V was applied between the electrodes for 2 hours. Then the electrolyte in the desalinated compartment was unloaded, its ion concentration was measured with a conductometer, and its pH was approximated with pH paper.

Results

Using the four-compartment cell, aqueous 50 mM NaCl was desalinated by applying a large voltage (5 V) across the cell for an extended period of time (2 hours). The major goal of this experiment was to determine whether it was possible to desalinate aqueous 50 mM NaCl and recover potable water. Leakage of base across the membrane from the concentrating base chamber into the desalination chamber was a concern due to the large concentration difference of OH⁻ across the Nafion membrane. If too much base leaks, the water will not be potable for drinking or usable for agricultural or other purposes. FIG. 8 shows potentiostatic chronoamperometry data measured using a four-compartment cell to desalinate aqueous 50 mM NaCl.

After desalination, the concentration of the desalinated compartment was determined to be 6 mM NaCl, based on measurements from an electrical conductivity monitor that had been calibrated for use with aqueous NaCl. The pH was initially 6 and after the experiment the pH was measured to be 8-9. This suggests that some base leaked from the concentrated base compartment. Because the four-compartment system is much more difficult to work with from a manufacturing and practicality perspective, the simpler two-compartment design was investigated, which most likely requires the use of a light-driven chloride or sodium pump.

FIG. 9A presents CVs of the two-compartment cell at different conditions during desalination. As is evidenced from the data, a decrease in the concentration of salt (ionic strength) results in an increase in the resistance of the electrolyte. To predict the amount of time it would take to desalinate water at 0.35 V, the current at 0.35 V for the CVs was averaged over at least three trials per concentration. A linear dependence of current on concentration was assumed and used to create an equation for current as a function of concentration/molarity. As molarity is dependent on amount of charge passed, which is the time integral of the current, the concentration as a function of time was calculated using a first-order differential equation created from the data. FIG. 9B shows an image of a smaller version of the inner compartment of the device of FIG. 7C, which is a miniaturized tube used to decrease resistive losses.

Deviation of Time to Desalinate 50 mM Salt to 10 mM.

The best fit line in FIG. 14 is: $i=3.68*10^{-7} M+6.56*10^{-10}=C_1 M+C_2$, where $C_1$ and $C_2$ are constants and M is concentration (M).

$$\text{Since } = \frac{dQ}{dt},$$

wherein Q is charge (C) and t is time (s), and $$\frac{Q}{V} = M_0 - M(t),$$

where V is volume (L), $M_0$ is initial concentration (M) and $M(t)$ is the concentration at any time, then $$\frac{1}{V}\frac{dQ}{dt} = -\frac{dM}{dt} = \frac{i}{V} = \frac{1}{V}(C_1 M + C_2), \text{ and } \frac{dM}{dt} + \frac{C_1}{V}M = -\frac{C_2}{V}.$$

Multiplying by an exponential term one gets $$\frac{dM}{dt}e^{\frac{C_1 t}{V}} + \frac{C_1}{V}Me^{\frac{C_1 t}{V}} = -\frac{C_2}{V}e^{\frac{C_1 t}{V}},$$

which simplifies to $$\frac{dMe^{\frac{C_1 t}{V}}}{dt} = -\frac{C_2}{V}e^{\frac{C_1 t}{V}}.$$

Integration yields $$Me^{\frac{C_1 t}{V}} = -\frac{C_2}{V}e^{\frac{C_1 t}{V}} + C_3,$$

which simplifies to $$M = -\frac{C_2}{C_1} + C_3 e^{\frac{C_1 t}{V}}.$$

For initial $M_0=50$ mM, $$0.05 = -\frac{C_2}{C_1} + C_3,$$

and given the best-fit line, $C_3=0.0518$, V=0.1 mL, and $M_{final}=10$ nM, $$0.01 = -0.0018 + 0.0518 e^{-3.68*10^{-3} t_{desal}},$$

and thus, $t_{desal}=402$ s.

After solving this equation for a total volume of 0.1 mL, it was calculated that it would take 402 seconds to deionize the chamber to aqueous 10 mM HCl. After correcting for the conversion of resistance to that expected for NaCl, 1 mL of water, and 1 cm² of active area, the desalination time was determined to be ~6600 seconds. This is ~2.7 times faster than the theoretical maximum for the solar thermal distillation process, and therefore a promising means to desalinate water of this salinity using sunlight.

It is known that even small amounts of NaCl can leak across IX membranes, so the rate of leakage between a 2 mm long chamber containing aqueous 10 mM NaCl in contact with a compartment containing aqueous 50 mM NaCl was numerically modeled and simulated. The leakage rate was determined to be slow enough that only a <4% change in salinity would occur over the course of the 1300 sec required to desalinate the chamber, therefore resulting in a chamber with aqueous 10.39 mM NaCl instead of aqueous 10.00 mM NaCl. Therefore, the leakage rate will be considerably smaller than the productive rate of desalination. FIG. 10A shows the normalized integral of NaCl concentration over the 2 mm chamber. The total of the integral is an important value that shows a nearly negligible rate of ion crossover (FIG. 10B).

FIGS. 11A and 11B show representative potentiostatic chronoamperometry data for desalination of the inner compartment. The experiment was terminated when the system passed 0.36 mA of current, which is the average current passed during a CV experiment when the inner compartment contained aqueous 10 mM HCl. As further evidence that the water was deionized, a CV of the system after performing a long-time potentiostatic chronoamperometry experiment clearly matches the CV data taken when aqueous 10 mM HCl was in the center compartment, indicating that aqueous ~10 mM HCl was in the center compartment after the chronoamperometry experiment. Given the complexities in loading the device with electrolyte, the total amount of charge passed during the experiment was used to compute the volume of electrolyte present instead of measuring it directly. After averaging over five trials, it was determined that ~0.10 mL of electrolyte was in the compartment. This took 430 seconds to desalinate, which implies that after converting to 1 mL of desalinated aqueous NaCl with 1 cm² of active area, it would take ~7000 seconds to desalinate 1 mL of water, which is ~2.5 times faster than the solar thermal distillation process. These results agree well with the predicted desalination time based on CV data.

Referring to FIGS. 12A and 12B, in order to demonstrate the importance of the size of the device, the resistance was tested as a function of path length for three different cells. Cells were loaded with aqueous 50 mM HCl and placed in a beaker filled with aqueous 50 mM HCl. CVs were taken as described in the previous two-compartment experiments. These data suggest that the resistance changes linearly with the path length.

FIG. 13B presents data collected on the device shown in FIGS. 13A and 13C, which includes pumps to circulate and collect water streams. Pumping could be achieved using excess solar energy (probably from infrared light) that is not utilized by the ion pump to heat the water anisotropically and create density gradients and convective flows. Since this device with pumps attached is larger than the previously measured device, the rate of desalination is slower with this device. Still, since the device that has pumps attached dearly passes current, it demonstrates that flow can be incorporated into smaller, more effective devices with small ionic ohmic ionic voltage losses.

CONCLUSIONS

The present invention demonstrates the feasibility of a solar-powered ion pump water desalination system. This system is ideally suited for tower salinity brackish water desalination where crossover of any salt ions is low and permselectivity is high. After testing a series of devices, a two-compartment, three-compartment, or four-compartment cell device may be used. In preferred embodiments, a simpler two-compartment cell architecture that can incorporate a light-driven sodium or chloride pump was configured to lower resistive losses in the cell and remove the use of caustic base or acid, which is a safety hazard when located near water for drinking or agriculture. In some embodiments, if a sodium or chloride pumping membrane has a near-ideal photovoltage and a modest photocurrent, or utilized a tandem structure, then aqueous 50 mM NaCl may be desalinated faster than from ideal solar thermal distillation.

Various modifications of the invention, in addition to those described herein, will be apparent to those skilled in the art from the foregoing description. Such modifications are also intended to fall within fire scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. The reference numbers recited in the below claims are solely for ease of examination of this patent application, and are exemplary, and are not intended in any way to limit the scope of the claims to the particular features having the corresponding reference numbers in the drawings. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A deionization system (200) for deionizing a fluid, said system comprising:
    a) a chamber (210) for containing said fluid; and
    b) two or more ion-exchange (IX) membranes (110) arranged in the chamber so as to partition the chamber into two or more chamber compartments,
    wherein at least one of the IX membranes comprises a photoactive dye covalently bound to said IX membrane, whereupon exposure to a photon source, said photoactive dye is configured to undergo a regenerative and reversible light-driven dissociation reaction or light-driven association reaction to generate or remove a positively-charged mobile ion and/or a negatively-charged mobile ion,
    wherein ions in the fluid are transported between chamber compartments to affect deionization of the fluid in at least one of the compartments.

2. The system of claim 1, wherein the IX membranes are comprised of one or more layers, wherein at least one of the layers is photoactive for light-driven ion pumping.

3. The system of claim 1, wherein said layers are stacked optically in series to create a tandem membrane structure.

4. The system of claim 1, wherein the IX membranes comprise a cation-exchange membrane, an anion-exchange membrane, a photoactive-dye-sensitized polymer membrane, or a combination thereof.

5. The system of claim 1, wherein the IX membrane comprises a photoactive ion pumping membrane that operates with symmetric ion distributions.

6. The system of claim 1, wherein the IX membrane comprises a photoactive ion pumping membrane that transports only positively-charged ions or only negatively-charged ions.

7. The system of claim 1, wherein the photon source is sunlight, ultraviolet light, visible light, near-infrared light, or combination thereof.

8. The system of claim 7, wherein the IX membranes divide the chamber into two-compartments such that an inner compartment is configured to be deionized, and an outer compartment is configured to be concentrated with ions, or vice versa.

9. The system of claim 1, wherein the photoactive dye is an organic photoacid, a photoacidic quantum dot, a photoacidic inorganic or organometallic metal complex, an organic photobase, a photobasic quantum dot, a photobasic inorganic or organometallic metal complex, or an analogous dye where any ion is released or bound due to photoexcitation.

10. The system of claim 9, wherein the photoactive dye is according to any one of the following compounds:

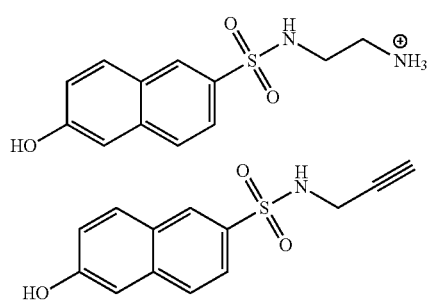

49
-continued
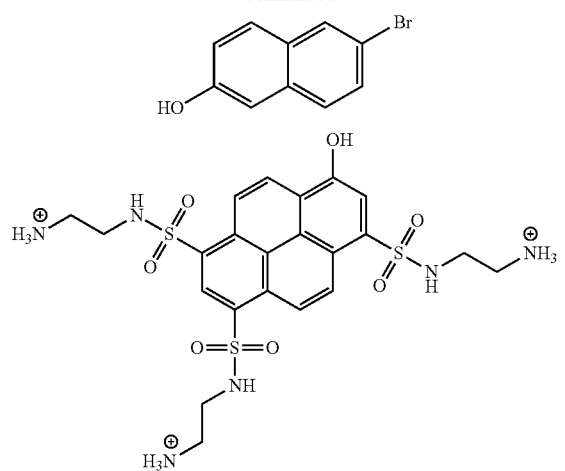
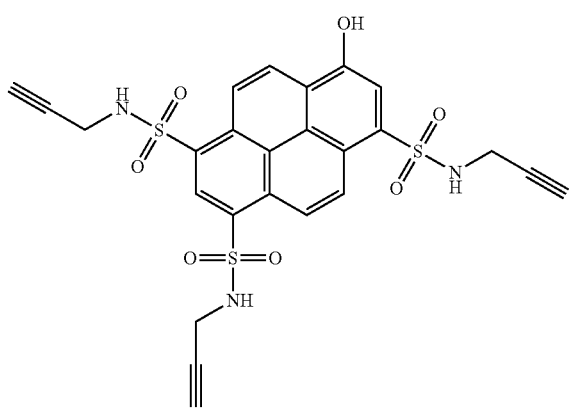
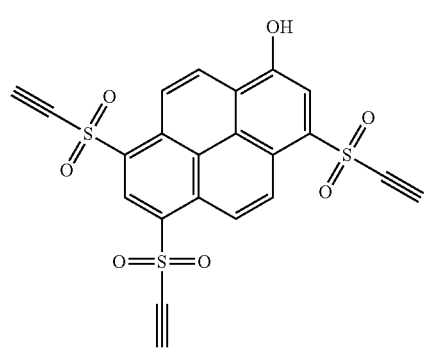
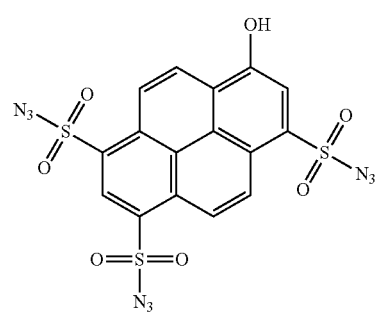
50
-continued
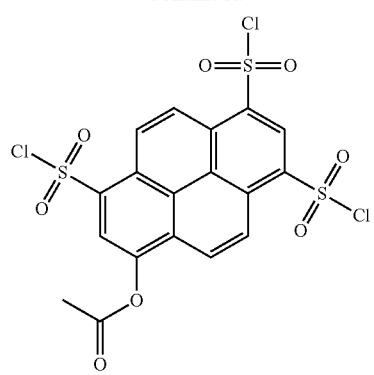
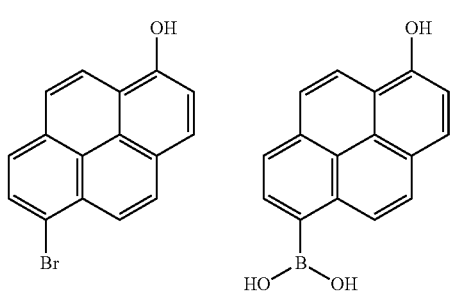
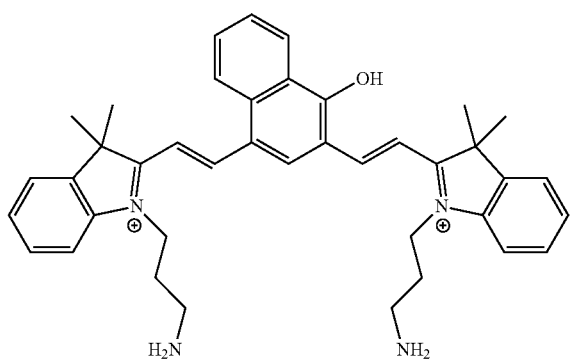
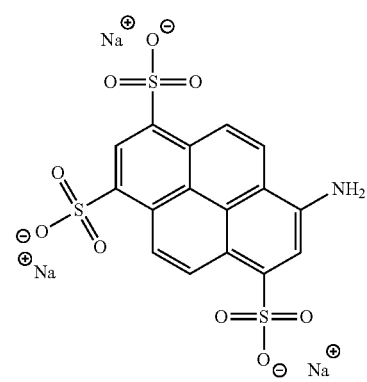

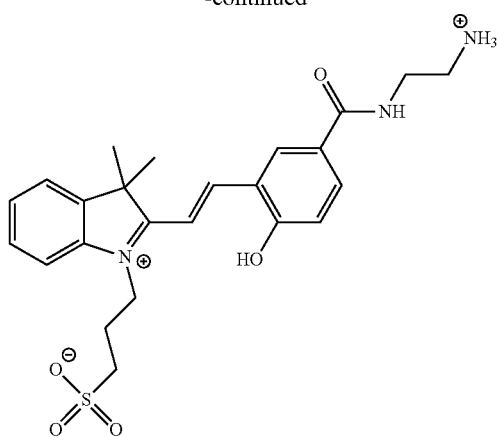
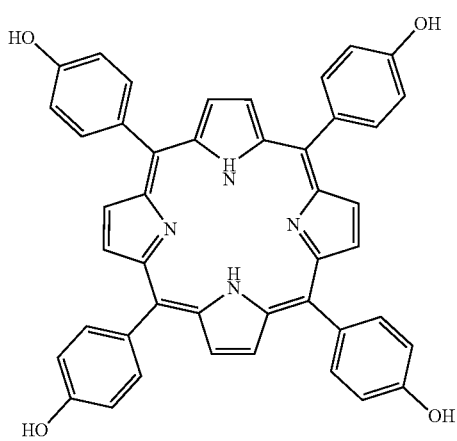
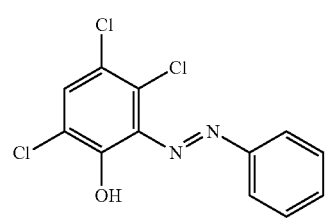
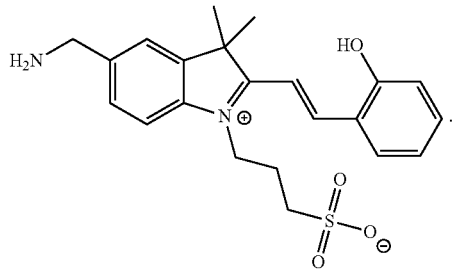
11. The system of claim 9, wherein the photoactive dye is a photoacid comprising a donor core and at least one acceptor component bound to the donor core.
12. The system of claim 11, wherein the acceptor component is according to any one of the following structures:
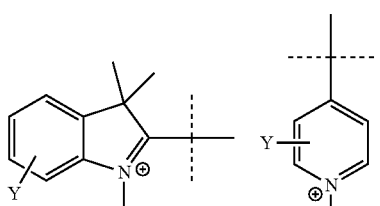
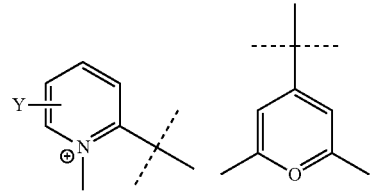
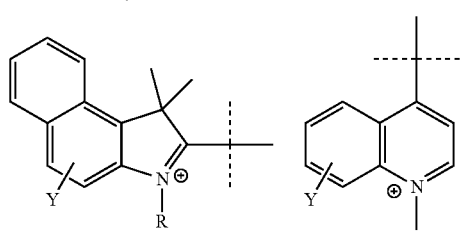
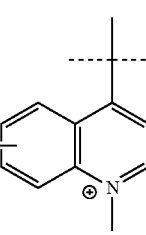
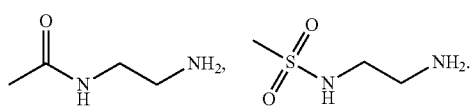
13. The system of claim 11, wherein the donor core is according to any one of the following structures:
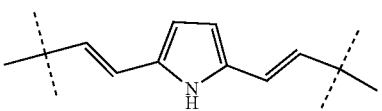
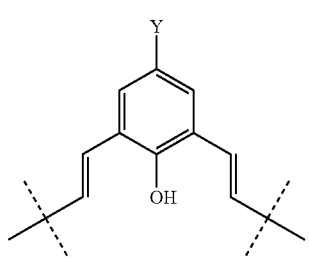

-continued
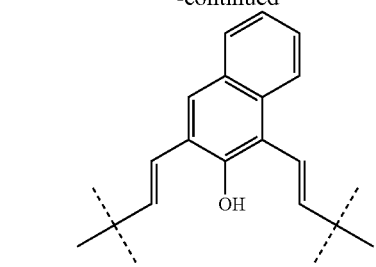
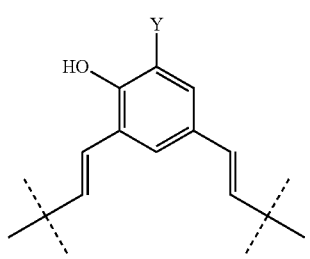
Y = —H,
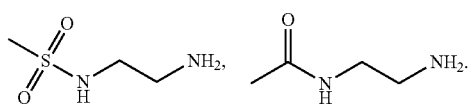
14. The system of claim 9, wherein the photoactive dye is a photoacidic quantum dot having a plurality of ligands.
15. The system of claim 14, wherein the photoacidic quantum dot is according to the following structure:
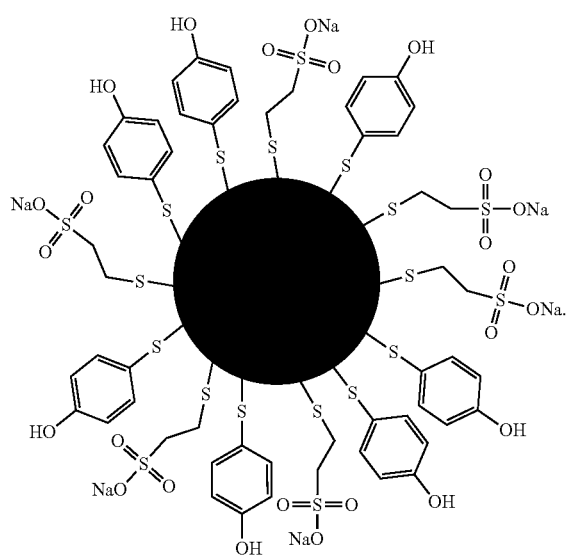
16. The system of claim 9, wherein the photoactive dye is a photobase according to any one of the following compounds:
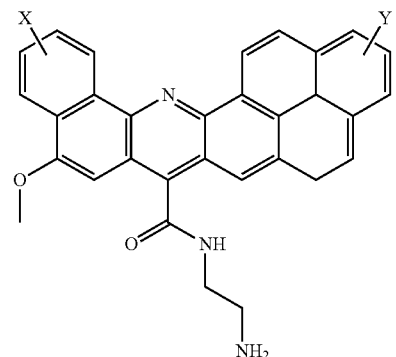
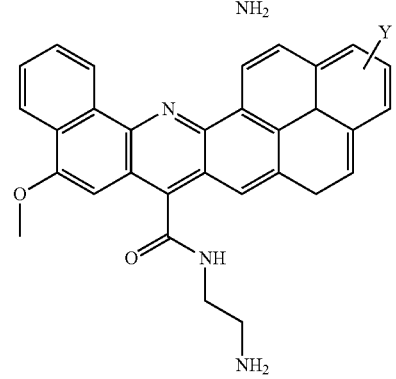
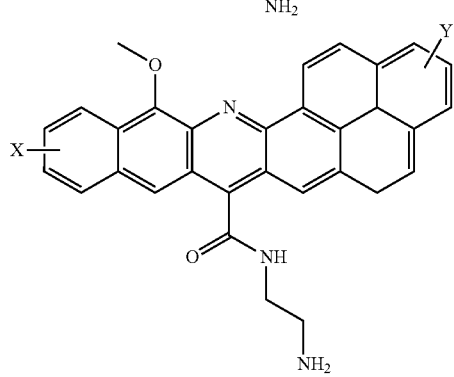
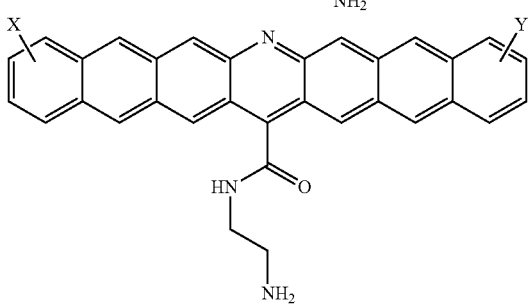
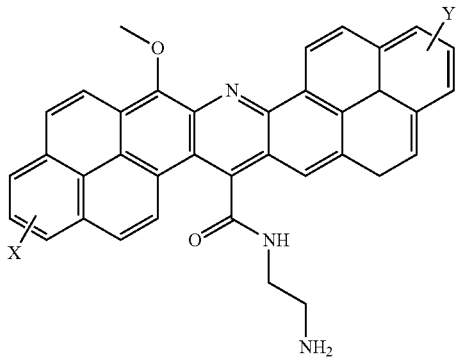

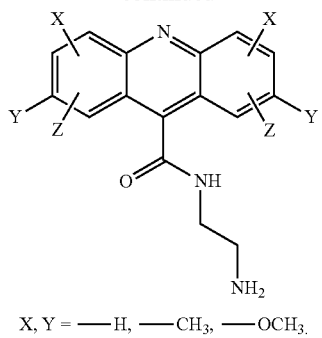

X, Y = —H, —CH₃, —OCH₃.

17. The system of claim 9, wherein the photoactive dye is a photoacidic inorganic metal complex according to any one of the following structures:

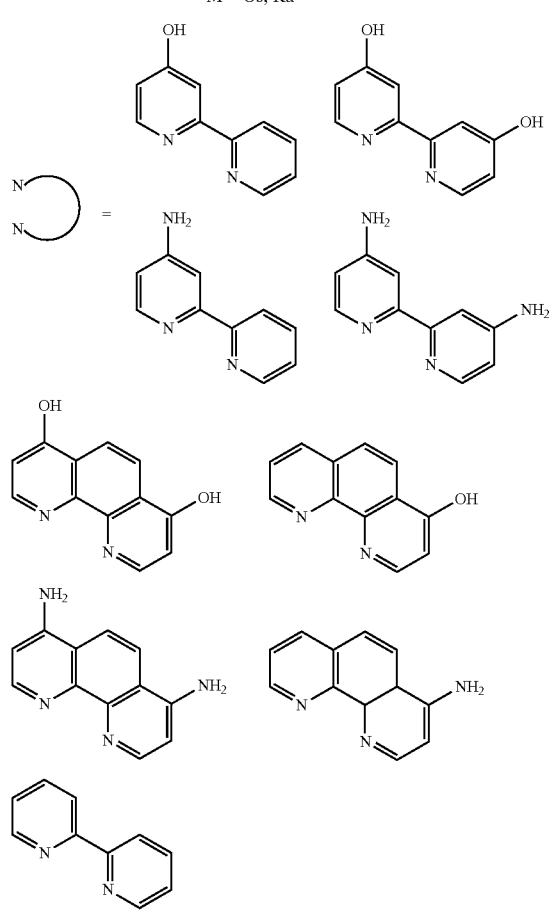

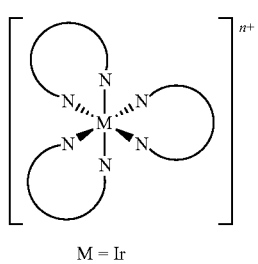

M = Ir

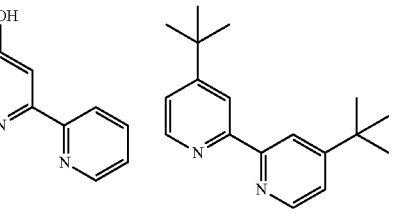

18. The system of claim 9, wherein the photoactive dye is a photoacidic inorganic metal complex comprising a metal group and a dithiol ligand modified with a protonated group.

19. The system of claim 9, wherein the photoactive dye is a photobasic inorganic metal complex according to any one of the following structures:

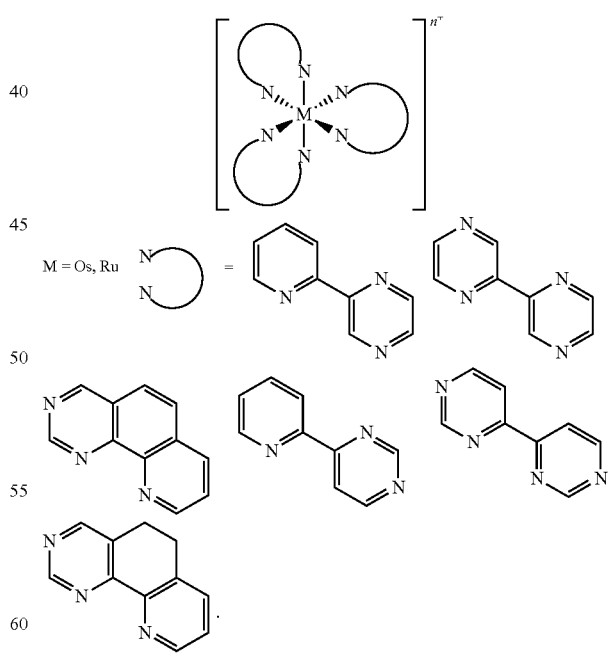

20. A method of deionizing a fluid stream containing ions, said method comprising:
 a) providing a deionization system according to claim 1 for deionizing a fluid;

b) adding said fluid stream to the deionization system provided in (a), wherein the fluid is disposed in the chamber of said system and is contacting the IX membranes; and c) exposing the IX membranes to a photon source, which causes the photoactive dye in the membrane to undergo a regenerative and reversible light-driven dissociation reaction or light-driven association reaction to generate or remove a positively-charged mobile ion and/or a negatively-charged mobile ion, that drive transport of the ions into or out of the fluid, thereby changing the ion content of the fluid.

* * * * *